US012539316B2

(12) United States Patent
Beard et al.

(10) Patent No.: US 12,539,316 B2
(45) Date of Patent: Feb. 3, 2026

(54) COMPOSITIONS AND METHODS FOR STEM CELL TRANSPLANT

(71) Applicants: Spacecraft Seven, LLC, Cranbury, NJ (US); Fundación para la Investigación Biomédica del Hospital Infantil Universitario Niño Jesús, Madrid (ES)

(72) Inventors: Brian Beard, New York, NY (US); Julian Sevilla Navarro, Madrid (ES); Gaurav Shah, New York, NY (US); Kinnari Patel, New York, NY (US); Raj Prabhakar, New York, NY (US)

(73) Assignees: Spacecraft Seven, LLC, Cranbury, NJ (US); Fundación para la Investigación Biomédica del Hospital Infantil Universitario Niño Jesús, Madrid (ES)

(*) Notice: Subject to any disclaimer, the term of this patent is extended or adjusted under 35 U.S.C. 154(b) by 1246 days.

(21) Appl. No.: 17/045,383

(22) PCT Filed: Apr. 11, 2019

(86) PCT No.: PCT/US2019/027083
§ 371 (c)(1),
(2) Date: Oct. 5, 2020

(87) PCT Pub. No.: WO2019/200167
PCT Pub. Date: Oct. 17, 2019

(65) Prior Publication Data
US 2021/0154237 A1 May 27, 2021

Related U.S. Application Data

(60) Provisional application No. 62/656,292, filed on Apr. 11, 2018.

(51) Int. Cl.
*A61K 35/28* (2015.01)
*A61K 35/14* (2015.01)
*A61P 7/06* (2006.01)
*C12N 15/11* (2006.01)

(52) U.S. Cl.
CPC ............. *A61K 35/28* (2013.01); *A61K 35/14* (2013.01); *A61P 7/06* (2018.01); *C12N 15/11* (2013.01); *C12N 2310/20* (2017.05); *C12N 2800/80* (2013.01)

(58) Field of Classification Search
CPC ................................. A61K 35/28; C12N 15/11
See application file for complete search history.

(56) References Cited

U.S. PATENT DOCUMENTS

| | | |
|---|---|---|
| 5,126,260 A | 6/1992 | Tuan et al. |
| 5,278,056 A | 1/1994 | Bank et al. |
| 5,633,156 A | 5/1997 | Wurm et al. |
| 5,952,190 A | 9/1999 | Joenje et al. |
| 5,994,136 A | 11/1999 | Naldini et al. |
| 6,013,516 A | 1/2000 | Verma et al. |
| 6,027,721 A | 2/2000 | Hammang et al. |
| 6,136,597 A | 10/2000 | Hope et al. |
| 7,198,950 B2 | 4/2007 | Trono et al. |
| 7,575,924 B2 | 8/2009 | Trono et al. |
| 7,629,153 B2 | 12/2009 | Trono et al. |
| 8,093,042 B2 | 1/2012 | Charneau et al. |
| 8,137,959 B2 | 3/2012 | Castillo Fernandez |
| 8,329,462 B2 | 12/2012 | Trono et al. |
| 8,597,939 B2 | 12/2013 | Castillo Fernandez |
| 8,727,132 B2 | 5/2014 | Miltenyi et al. |
| 8,748,169 B2 | 6/2014 | Trono et al. |
| 8,900,858 B2 | 12/2014 | Trono et al. |
| 9,109,012 B2 | 8/2015 | Williams |
| 9,175,077 B2 | 11/2015 | Gallo et al. |
| 9,340,798 B2 | 5/2016 | Trono et al. |
| 9,737,620 B2 | 8/2017 | Williams |
| 9,771,599 B2 | 9/2017 | Anastasov et al. |
| 10,363,269 B2 | 7/2019 | Tareen |
| 2002/0065236 A1 | 5/2002 | Yew et al. |
| 2004/0053870 A1 | 3/2004 | Yew et al. |
| 2006/0200869 A1 | 9/2006 | Naldini et al. |
| 2006/0247214 A1 | 11/2006 | DeLong et al. |
| 2008/0248552 A1 | 10/2008 | Castillo Fernandez |
| 2009/0088398 A1 | 4/2009 | Gregory et al. |

(Continued)

FOREIGN PATENT DOCUMENTS

| | | |
|---|---|---|
| CN | 104419683 A | 3/2015 |
| DE | 102008063606 A1 | 6/2010 |

(Continued)

OTHER PUBLICATIONS

Becker et al. (2010) "Preclinical correction of human Fanconi anemia complementation group A bone marrow cells using a safety-modified lentiviral vector" Gene therapy, 17(10), 1244-1252. (Year: 2010).*
Nadeau et al. (2015) "Plerixafor as a salvage mobilization strategy for haploidentical peripheral blood allogeneic stem cell transplantation" Clinical Case Reports, 3(9), 728. (Year: 2015).*
Kelly et al. (2007) "Stem cell collection and gene transfer in Fanconi anemia" Molecular Therapy, 15(1), 211-219. (Year: 2007).*
Leong et al. (2008) "Isolation of purified autologous peripheral blood CD34+ cells with low T cell content using CliniMACS device—a local experience" Malaysian Journal of Pathology, 30(1), 31-36. (Year: 2008).*
González-Murillo et al. (2010) "Development of lentiviral vectors with optimized transcriptional activity for the gene therapy of patients with Fanconi anemia" Human gene therapy, 21(5), 623-630. (Year: 2010).*

(Continued)

*Primary Examiner* — James Joseph Graber
(74) *Attorney, Agent, or Firm* — COOLEY LLP

(57) ABSTRACT

The present invention provides systems and methods for manufacturing and using gene corrected stem cells for gene therapy. In particular, herein provided are methods for treating Fanconi anemia in which a subject's stem cells are selected by a combination of high stringency CD34+ selection and low stringency CD34+ selection, genetically modified using a gene therapy vector encoding a FANC protein or a gene editing system, and administered to the subject.

14 Claims, 1 Drawing Sheet
Specification includes a Sequence Listing.

(56) References Cited

U.S. PATENT DOCUMENTS

| | | |
|---|---|---|
| 2009/0111106 A1 | 4/2009 | Mitrophanous et al. |
| 2010/0284990 A1 | 11/2010 | Kaemmerer et al. |
| 2010/0303775 A1 | 12/2010 | Raya et al. |
| 2012/0071859 A1 | 3/2012 | Morgan et al. |
| 2012/0172418 A1 | 7/2012 | Schambach et al. |
| 2012/0283318 A1 | 11/2012 | Mei et al. |
| 2014/0220678 A1 | 8/2014 | Trono et al. |
| 2015/0031134 A1 | 1/2015 | Zhang et al. |
| 2015/0203852 A1 | 7/2015 | Arora |
| 2015/0291966 A1 | 10/2015 | Zhang et al. |
| 2016/0108430 A1 | 4/2016 | Carrier et al. |
| 2016/0194660 A1 | 7/2016 | Ye |
| 2017/0051309 A1 | 2/2017 | Lesch et al. |
| 2017/0183654 A1* | 6/2017 | Wong et al. ......... C12N 15/113 |
| 2018/0169148 A1 | 6/2018 | Adair et al. |
| 2018/0195048 A1 | 7/2018 | Rao |
| 2018/0326022 A1 | 11/2018 | Prosser et al. |
| 2018/0360992 A1 | 12/2018 | Patel et al. |
| 2019/0032058 A1 | 1/2019 | Arora |
| 2019/0038773 A1 | 2/2019 | Esteves et al. |
| 2019/0203225 A1 | 7/2019 | Roncero et al. |
| 2021/0290685 A1 | 9/2021 | Beard et al. |

FOREIGN PATENT DOCUMENTS

| | | | |
|---|---|---|---|
| JP | 2006524051 A | 10/2006 | |
| JP | 2007054069 A | 3/2007 | |
| JP | 2014513727 A | 6/2014 | |
| RU | 2233333 C2 | 7/2004 | |
| RU | 2280074 C2 | 7/2006 | |
| RU | 2539112 C2 | 1/2015 | |
| WO | WO-9419478 A1 | 9/1994 | |
| WO | WO-0112596 A1 | 2/2001 | |
| WO | WO-0188088 A2 | 11/2001 | |
| WO | WO-03/088910 A2 | 10/2003 | |
| WO | WO-03/088910 A3 | 10/2003 | |
| WO | WO-03092612 A2 | 11/2003 | |
| WO | WO-2008/136670 A2 | 11/2008 | |
| WO | WO-2008/136670 A3 | 11/2008 | |
| WO | WO-2014093444 A1 | 6/2014 | |
| WO | WO-2015056014 A1 | 4/2015 | |
| WO | WO-2015/179540 A1 | 11/2015 | |
| WO | WO-2015168547 A2 | 11/2015 | |
| WO | WO-2015/188191 A1 | 12/2015 | |
| WO | WO-2016/118780 A1 | 7/2016 | |
| WO | WO-2016145217 A1 | 9/2016 | |
| WO | WO-2016183593 A2 | 11/2016 | |
| WO | WO-2017127565 A1 | 7/2017 | |
| WO | WO-2017139576 A1 | 8/2017 | |
| WO | WO2017184903 A1 * | 10/2017 | ............ A61K 48/00 |
| WO | WO-2017218519 A1 | 12/2017 | |
| WO | WO-2017218948 A2 | 12/2017 | |
| WO | WO-2018007873 A1 | 1/2018 | |
| WO | WO2018049273 A1 * | 3/2018 | ............ C12N 15/85 |
| WO | WO-2018106807 A1 | 6/2018 | |
| WO | WO-2018106821 A1 | 6/2018 | |
| WO | WO-2018/201065 A1 | 11/2018 | |
| WO | WO-2019079338 A1 | 4/2019 | |
| WO | WO-2019200167 A1 | 10/2019 | |
| WO | WO-2019210325 A1 | 10/2019 | |
| WO | WO-2020014523 A1 | 1/2020 | |
| WO | WO-2020028430 A1 | 2/2020 | |
| WO | WO-2020037249 A1 | 2/2020 | |
| WO | WO-2020167996 A1 | 8/2020 | |
| WO | WO-2020237219 A1 | 11/2020 | |
| WO | WO-2021236981 A2 | 11/2021 | |
| WO | WO-2022017630 A1 | 1/2022 | |
| WO | WO-2022018171 A1 | 1/2022 | |
| WO | WO-2022031756 A1 | 2/2022 | |
| WO | WO-2022031760 A1 | 2/2022 | |
| WO | WO-2022032226 A1 | 2/2022 | |
| WO | WO-2022125489 A1 | 6/2022 | |
| WO | WO-2023108029 A2 | 6/2023 | |
| WO | WO-2023108129 A1 | 6/2023 | |
| WO | WO-2023154763 A2 | 8/2023 | |
| WO | WO-2023205767 A2 | 10/2023 | |

OTHER PUBLICATIONS

GenBank X99226 "H.sapiens mRNA for FAA protein", entered: Nov. 7, 1996, available from: National Library of Medicine (US), National Center for Biotechnology Information, https://www.ncbi.nlm.nih.gov/nuccore/X99226. (Year: 1996).*

Río et al. (Aug. 11, 2017) "Engraftment and in vivo proliferation advantage of gene-corrected mobilized CD34+ cells from Fanconi anemia patients" Blood, The Journal of the American Society of Hematology, 130(13), 1535-1542. (Year: 2017).*

Polouckova et al. (2001) "Comparison of two different methods for CD34+ selection and T cell depletion in peripheral blood stem cell grafts—our experiences with CellPro, E resetting and CliniMACS technique" Neoplasma 48(5):374-381. (Year: 2001).*

Czechowicz et al. "Lentiviral-Mediated Gene Therapy for Patients with Fanconi Anemia [Group A]: Updated Results from Global RP-L102 Clinical Trials" 26th Annual Meeting of the American Society of Gene and Cell Therapy, May 18, 2023, slide deck, 14 slides. (Year: 2023).*

Abdul-Sater, Z et al., "*Homo sapiens* Fanconi anemia complementation group A (FANCA), transcript variant I, mRNA" NCBI Reference Sequence: NM_000135.2, publication date: Aug. 25, 2016. 4 pages.

Adair et al., "191. Optimizing Engraftment of FANCA Gene-Modified Bone Marrow Cells in a Mouse Model of Fanconi's Anemia," Molecular Therapy vol. 19, Supplement 1, May 2011. 1 page.

Adair et al., "Novel Lineage Depletion and Manufacturing Allows for Unprecedented Preservation of Autologous Blood Stem Cells for Gene Therapy of Fanconi Anemia Complementation Group A" Blood (2017) 130 (Supplement 1):2451. 2 pages.

Aiuti, A. et al. (2013). "Lentiviral hematopoietic stem cell gene therapy in patients with Wiskott-Aldrich syndrome," Science 341:1233151. 29 pages.

Almarza, E. et al. (2011). "Correction of SCID-X1 using an enhancerless Vav promoter," Hum. Gene Ther. 22:263-270.

Biffi, A. et al. (2013). "Lentiviral hematopoietic stem cell gene therapy benefits metachromatic leukodystrophy," Science 341:1233158. 14 pages.

Braun, C.J. et al. (2014). "Gene therapy for Wiskott-Aldrich syndrome-long-term efficacy and genotoxicity," Sci. Transl. Med. 6:227ra33. 15 pages.

Breda, L. et al. (2012). "Therapeutic hemoglobin levels after gene transfer in β-thalassemia mice and in hematopoietic cells of β-thalassemia and sickle cells disease patients," PLoS One 7:e32345. 16 pages.

Cartier, N, et al. (2009). "Hematopoietic stem cell gene therapy with a lentiviral vector in X-linked adrenoleukodystrophy," Science 326:818-823.

Cartier, N. et al. (2012). "Lentiviral hematopoietic cell gene therapy for X-linked adrenoleukodystrophy," Methods Enzymol. 507:187-198.

Cavazzana-Calvo, M. et al. (2010). "Transfusion independence and HMGA2 activation after gene therapy of human β-thalassaemia," Nature 467:318-322.

Charrier et al. (2011). "Quantification of lentiviral vector copy numbers in individual hematopoietic colony-forming cells shows vector dose-dependent effects on the frequency and level of transduction," Gene Ther. 18:479-487.

Charrier, S. et al. (2005). "A lentiviral vector encoding the human Wiskott-Aldrich syndrome protein corrects immune and cytoskeletal defects in WASP knockout mice," Gene Ther. 12:597-606.

Cronin J., et al., (2005). "Altering the Tropism of Lentiviral Vectors through Pseudotyping," Curr. Gene Ther. 5:387-398.

Cutler, C. et al., "Prostaglandin-modulated umbilical cord blood hematopoietic stem cell transplantation," 2013, Blood, vol. 122(17), pp. 3074-3081.

(56) References Cited

OTHER PUBLICATIONS

Delville, M. et al., "A Nontoxic Transduction Enhancer Enables Highly Efficient Lentiviral Transduction of Primary Murine T Cells and Hematopoietic Stem Cells," Mol. Ther.—Methods Clin. Dev. (2018) vol. 10, pp. 341-347.
Denning et al., "Optimization of the Transductional Efficiency of Lentiviral Vectors: Effect of Sera and Polycations", Mol Biotechnol (2013), 53:308-314.
Diez et al., "Therapeutic gene editing in CD34+hematopoietic progenitors from Fanconi anemia patients," EMBO Molecular Medicine (2017) vol. 9, No. 11, pp. 1574-1588.
Dipersio et al. (2009). "Phase III prospective randomized double-blind placebo-controlled trial of plerixafor plus granulocyte colony-stimulating factor compared with placebo plus granulocyte colony-stimulating factor for autologous stem-cell mobilization and transplantation for patients with non-Hodgkin's lymphoma," J. Clin. Oncol. 27:4767-4773.
Donello, J.E. et al. (1998). "Woodchuck hepatitis virus contains a tripartite posttranscriptional regulatory element," J. Virol. 72:5085-5092.
Dull et al., "A Third-Generation Lentivirus Vector with a Conditional Packaging System," Journal of Virology, Nov. 1998, 72(11), pp. 8463-8471.
Ebens et al., "Hematopoietic cell transplantation in Fanconi anemia: current evidence, challenges and recommendations" Expert Rev Hematol. Jan. 2017; 10(1):81-97.
Ellis, J. (2005). "Silencing and variegation of gammaretrovirus and lentivirus vectors," Hum. Gene Ther. 16:1241-1246.
Extended European Search Report in EP Patent Application No. 19849869.3, mailed Apr. 19, 2022, 7 pages.
Extended European Search Report mailed on Apr. 4, 2022, for EP Application No. 19844952.2, filed on Jul. 30, 2019, 6 pages.
Foe, Lo Ten, et al., "Expression cloning of a cDNA for the major *Fanconi anaemia* gene, FAA," Nat. Genet. 14(3):320-323 (1996).
Foe, Lo Ten et al., "Fanconi anemia complementation group A protein [*Homo sapiens*]", GenBank: CAA67610.1, Nov. 7, 1996, 2 pages.
Galibert, F et al., "Woodchuck hepatitis virus, complete genome," GenBank: J02442.1, publication date: Aug. 3, 1993. 2 pages.
Gerolami, R. et al. (2000). "Gene transfer to hepatocellular carcinoma: transduction efficacy and transgene expression kinetics by using retroviral and lentiviral vectors," Cancer Gene Ther. 7:1286-1292.
Ginn, S.L. et al. (2003). "Promoter interference mediated by the U3 region in early-generation HIV-1-derived lentivirus vectors can influence detection of transgene expression in a cell-type and species-specific manner," Hum. Gene Ther. 14:1127-1137.
Goessling et al., "Prostaglandin E2 Enhances Human Cord Blood Stem Cell Xenotransplants and Shows Long-Term Safety in Preclinical Nonhuman Primate Transplant Models," Cell Stem Cell (2011), 8:445-458.
Hacein-Bey-Abina, S. et al. (2008). "Insertional oncogenesis in 4 patients after retrovirus-mediated gene therapy of SCID-X1," J. Clin. Invest. 118:3132-3142.
Hauber et al. (2018). "Improving lentiviral transduction of CD34+ hematopoietic stem and progenitor cells," Hum. Gene Ther. Methods 29:104-113.
Heffner et al., (2018). "Prostaglandin E2 Increases Lentiviral Vector Transduction Efficiency of Adult Human Hematopoietic Stem and Progenitor Cells," Mol Ther. 3:26:320-328.
Hlavaty, J. et al. (2005). "Effect of posttranscriptional regulatory elements on transgene expression and virus production in the context of retrovirus vectors," Virology 341:1-11.
Hoban et al., "CRISPR/Cas9-Mediated Correction of the Sickle Mutation in Human CD34+ cells" Molecular Therapy (2016) 24(9):1561-1569.
Hofig et al., "Poloxamer synperonic F108 improves cellular transduction with lentiviral vectors," J Gene Med. (2012) 14(8):549-560.
Howe, S.J. et al. (2008). "Insertional mutagenesis combined with acquired somatic mutations causes leukemogenesis following gene therapy of SCID-X1 patients," J. Clin. Invest. 118:3143-3150.
International Search Report mailed on Dec. 2, 2019, for PCT Application No. PCT/US2019/044237, filed on Jul. 30, 2019, 6 pages.
International Search Report mailed on Oct. 29, 2019, for PCT application No. PCT/US2019/046890, filed on Aug. 16, 2019, 3 pages.
Iwakuma, T. et al. (1999). "Self-inactivating lentiviral vectors with U3 and U5 modifications," Virology 261:120-132.
Lofvall et al., "Regulation and function of lentiviral-mediated TCIRG1 expression in osteoclasts from infantile malignant osteopetrosis patients" Abstract P192 in Bone Abstracts (2016) vol. 5, 7 pages.
Matrai, J. et al. (2010). "Preclinical and clinical progress in hemophilia gene therapy" Curr Opin Hematol. 17:387-392.
Merten, O-W: "State-of-the-art of the production of retroviral vectors," The Journal of Gene Medicine, John Wiley & Sons, Inc., US, vol. 6, No. Suppl. 1, Feb. 1, 2004, pp. S105-S124.
Mesa-Núñez, C. et al., "Preclinical safety and efficacy of lentiviral-mediated gene therapy for leukocyte adhesion deficiency type I," (2022) Molecular Therapy Methods and Clinical Development, vol. 26, pp. 459-470.
Miller, "Human gene therapy comes of age," Nature. Jun. 11, 1992; 357(6378):455-460.
Miyoshi, H. et al. (1998). "Development of a self-inactivating lentivirus vector," J. Virol. 72:8150-8157.
Molina-Estevez, F., et al., "Lentiviral-Mediated Gene Therapy in Fanconi Anemia—A Mice Reveals Long-Term Engraftment and Continuous Turnover of Corrected HSCs," Current Gene Therapy (2015)15:550-562.
Morris, J.C. et al. (2004). "Induction of cytotoxic T-lymphocyte response to enhanced green and yellow fluorescent proteins after myeloablative conditioning" Blood 103:492-499.
Moscatelli et al., "Targeting NSG Mice Engrafting Cells with a Clinically Applicable Lentiviral Vector Corrects Osteoclasts in Infantile Malignant Osteopetrosis" Hum Gene Ther. Aug. 2018; 29(8):938-949.
Moscatelli, I. et al. (2013). "Lentiviral gene transfer of TCIRG1 into peripheral blood CD34+ cells restores osteoclast function in infantile malignant osteopetrosis," Bone 57:1-9.
Mothy et al., "The Role of Plerixafor in Optimizing Peripheral Blood Stem Cell Mobilization for Autologous Stem Cell Transplantaion," Leukemia (2011) 25, 1-6.
Muller., et al., "Rapid Lentiviral Transduction Preserves the Engraftment Potential of Fanca Hematopoietic Stem cells," Mol Ther. (2008) 16(6):1154-1160.
Mulroney-Cousins et al., "Primary seronegative but molecularly evident hepadnaviral infection engages liver and induces hepatocarcinoma in the woodchuck model of hepatitis B," PLoS. Pathog. 10 (8), E1004332 (2014). 13 pages.
Naldini, L. (1998). "Lentiviruses as gene transfer agents for delivery to non-dividing cells," Curr. Opin. Biotechnol. 9:457-463.
Naldini, L. et al. (1996). "Efficient transfer, integration, and sustained long-term expression of the transgene in adult rat brains injected with a lentiviral vector," PNAS 93:11382-11388.
Naldini, L. et al. (1996). "In vivo gene delivery and stable transduction of nondividing cells by a lentiviral vector," Science 272:263-267.
Oh, T. et al. (2007). "Lentiviral vector design using alternative RNA export elements," Retrovirology 4:38. 10 pages.
Osborn Mark J et al., "CRISPR/Cas9-Based Cellular Engineering for Targeted Gene Overexpression," Int J Mol Sci. (2018) 19(4):946. 20 pages.
Ott, M.G. et al. (2006). "Correction of X-linked chronic granulomatous disease by gene therapy, augmented by insertional activation of MDS1-EVI1, PRDM16 or SETBP1," Nat. Med. 12:401-409.
Paruzynski, A. et al. (2010). "Genome—wide high-throughput integrome analyses by nrLAM-PCR and next-generation sequencing," Nat. Protoc. 5:1379-1395.
Pestina, T.I. et al. (2009). "Correction of murine sickle cell disease using gamma-globin lentiviral vectors to mediate high-level expression of fetal hemoglobin," Mol. Ther. 17:245-252.

(56) References Cited

OTHER PUBLICATIONS

Pfeifer, A. et al. (2002). "Transgenesis by lentiviral vectors: Lack of gene silencing in mammalian embryonic stem cells and preimplementation embryos," PNAS 99:2140-2145.
Pfeifer et al, "Genomic sequencing and methylation analysis by ligation mediated PCR," Science 246 (4931), 810-813 (1989).
Pfeifer G.P et al., "*Homo sapiens* phosphoglycerate kinase 1 (PGK1) gene, partial cds," GenBank: M60581.1, publication date: Jul. 26, 2016. 1 page.
Powell, S.K. et al. (2015). "Viral Expression Cassette Elements to Enhance Transgene Target Specificity and Expression in Gene Therapy," Discov. Med. 19:49-57.
Pulliam et al., "AMD3100 synergizes with G-CSF to mobilize repopulating stem cells in Fanconi anemia knockout mice" Exp Hematol. Sep. 2008; 36(9):1084-1090.
Rio et al., "Engraftment and in vivo proliferation advantage of gene-corrected mobilized CD34+ cells from Fanconi anemia patients" Blood (2017) 130(13):1535-1542.
Rio et al., "Successful engraftment of gene-corrected hematopoietic stem cells in non-conditioned patients with Fanconi anemia" Nature Medicine (2019) 25:1396-1401.
Rio et al., DNA Repair and Human Health, (2011), Chapter 12, "From the Molecular Biology to the Gene Therapy of a DNA Repair Syndrome: Fanconi Anemia", pp. 349-372.
Salmon, P. et al. (2000). "High-level transgene expression in human hematopoietic progenitors and differentiated blood lineages after transduction with improved lentiviral vectors," Blood 96:3392-3398.
Sarma, N.J. et al. (2010). "Colony forming cell (CFC) assay for human hematopoietic cells," J. Vis. Exp. 18:2195, 6 total pages.
Schambach, A. et al. (2006). "Overcoming promoter competition in packaging cells improves production of self-inactivating retroviral vectors" Gene Ther. 13:1524-1533.
Schlabach, M.R. et al. (2010). "Synthetic design of strong promoters," PNAS 107:2538-2543.
Sevilla., et al., "Improved collection of hematopoietic stem cells and progenitors from Fanconi anemia patients for gene therapy purposes" Mol Ther Methods Clin Dev. Jun. 12, 2021; 22:66-75.
Socolovsky, M. et al. (2001). "Ineffective erythropoiesis in Stat5a(−/−)5b(−/−) mice due to decreased survival of early erythroblasts," Blood 98:3261-3273.
Stein, S. et al. (2010). "Genomic instability and myelodysplasia with monosomy 7 consequent to EVI1 activation after gene therapy for chronic granulomatous disease," Nat. Med. 16:198-204.
Stripecke, R. et al. (1999). "Immune response to green fluorescent protein: Implications for gene therapy" Gene Ther. 6:1305-1312.
Takeshita, F. et al. "Muscle creatine kinase/SV40 hybrid promoter for muscle-targeted long-term transgene expression." International Journal of Molecular Medicine, vol. 19.2 (2007): pp. 309-315, 7 pages.
Thudium et al., "Regulation and Function of Lentiviral Vector-Mediated TCIRG1 Expression in Osteoclasts from Patients with Infantile Malignant Osteopetrosis: Implications for Gene Therapy" Calcif Tissue Int. Dec. 2016; 99(6):638-648.
Tolar J., et al., "Gene Therapy for Fanconi Anemia: One Step Closer to the Clinic," Human Gene Therapy (2012) 23:141-144.
Valkama, A.J. et al. (2018). "Optimization of lentiviral vector production for scale-up in fixed-bed bioreactor," Gene Therapy 25:39-46.
Written Opinion of the International Searching Authority mailed on Dec. 2, 2019, for PCT Application No. PCT/US2019/044237, filed on Jul. 30, 2019, 9 pages.
Written Opinion of the International Searching Authority mailed on Oct. 29, 2019, for PCT application No. PCT/US2019/046890, filed on Aug. 16, 2019, 5 pages.
Zaiss, A-K. et al. (2002). "RNA 3' readthrough of oncoretrovirus and lentivirus: Implications for vector safety and efficacy," J. Virol. 76:7209-7219.
Zaucha, J.M. et al. (2001). "Effects of extending the duration of postgrafting immunosuppression and substituting granulocyte-colony-stimulating factor-mobilized peripheral blood mononuclear cells for marrow in allogeneic engraftment in a nonmyeloablative canine transplantation model" Biol Blood Marrow Transplant. 7:513-516.
Zonari, E. et al., "Efficient Ex Vivo Engineering and Expansion of Highly Purified Human Hematopoietic Stem and Progenitor Cell Populations for Gene Therapy," Stem Cell Reports, 8(4):977-990 (2017).
Zufferey, R. et al. (1997). "Multiply attenuated lentiviral vector achieves efficient gene delivery in vivo," Nat. Biotechnol. 15:871-875.
Zychlinski, D et al. (2008). "Physiological promoters reduce the genetoxic risk of integrating gene vectors" Mol Ther. 16:718-725.
Extended European Search Report mailed on Dec. 10, 2021, for EP Application No. 19785212.2, filed on Apr. 11, 2019, 7 pages.
Albrechtsen, B. et al. (1991). Transcriptional termination sequence at the end of the *Escherichia coli* ribosomal RNA G operon: Complex terminators and antitermination, Nucl. Acids Res. 19:1845-1852.
Atschul, S.F. et al. (1990). Basic local alignment search tool, J. Mol. Biol. 215:403-410.
Becker, P.S. et al. (2010). Preclinical correction of human fanconi anemia complementation group a bone marrow cells using a safety-modified lentiviral vector, Gene Therapy 17:1244-1252.
Berge, S.M. et al. (1977). Pharmaceutical Salts, J. Pharma Sci. 66:1-19.
Bouchard, M.J. et al. (2004). The Enigmatic X Gene Of Hepatitis B Virus, J. Virol. 78:12725-12734.
Bueren, J. et al. (2019). Advances in the Gene Therapy of Monogenic Blood Cell Diseases, Clin Genet., with Tables I-II, 46 total pages.
Butturini A, et al. (1994). Hematologic abnormalities in Fanconi anemia: An international Fanconi anemia registry study, Blood 84:1650-1655.
Casado, J.A. et al. (2007). A comprehensive strategy for the subtyping of patients with Fanconi anaemia: Conclusions from the Spanish Fanconi anemia research network, J. Med. Genet. 44:241-249.
Cid-Arregui, A. et al. (2003). A synthetic E7 gene of human papillomavirus type 16 that yields enhanced expression of the protein in mammalian cells and is useful for DNA immunization studies, J. Virol. 77:4928.
ClinicalTrials.Gov (2017). FANCA gene transfer for Fanconi anemia using a high-safety, high-efficiency, self-inactivating Lentiviral vector, ClinicalTrials.Gov identifier: NCT03351868, Shenzhen Geno-Immune Medical Institute, located at https://clinicaltrials.gov/ct2/show/NCT03351868, retrieved on Jul. 9, 2019, 6 total pages.
ClinicalTrials.Gov (2019). A clinical trial to evaluate the safety of RP-L102 in pediatric subjects with Fanconi anemia subtype A, ClinicalTrials.Gov identifier: NCT03814408, Rocket Pharmaceuticals, Inc., located at https://clinicaltrials.gov/ct2/show/NCT03814408, retrieved on Jul. 9, 2019, 7 total pages.
ClinicalTrials.Gov (2011). Gene therapy for Fanconi anemia, ClinicalTrials.Gov identifier: NCT01331018, Fred Hutchinson Cancer Research Center, located at https://clinicaltrials.gov/ct2/show/NCT01331018, retrieved on Jul. 9, 2019, 12 total pages.
ClinicalTrials.Gov (2016). Clinical phase II trial to evaluate CD34+ cells mobilization and collection in patients with Fanconi anemia for subsequent transduction with a Lentiviral vector carring FANCA gene. FANCOSTEM-1, ClinicalTrials.Gov identifier: NCT02931071, Hospital Universitari Vall d'Hebron Research Institute, located at https://clinicaltrials.gov/ct2/show/NCT02931071, retrieved on Jul. 9, 2019, 7 total pages.
ClinicalTrials.Gov (2017). Lentiviral-mediated gene therapy of Fanconi anemia patients subtype A (FANCOLEN-1), ClinicalTrials.Gov identifier: NCT03157804, Hospital Infantil Universitario Nino Jesus, Madrid, Spain, located at https://clinicaltrials.gov/ct2/show/NCT03157804, retrieved on Jul. 9, 2019, 8 total pages.
ClinicalTrials.Gov (1999). Gene therapy for the treatment of Fanconi's anemia type C, ClinicalTrials.Gov identifier: NCT00001399, National Heart, Lung, and Blood Institute (NHLBI), located at https://clinicaltrials.gov/ct2/show/NCT00001399, retrieved on Jul. 9, 2019, 7 total pages.
Council Decision (2012): Summary Notification Information Format for the Release of Genetically Modified Organisms Other Than

(56) References Cited

OTHER PUBLICATIONS

Higher Plants in Accordance With Article 11 of Directive 2001/18/EC, located at https://gmoinfo.jrc.ec.europa.eu/bsnifs-gmo/B-ES-12-37-en.pdf.
Craddock, C.F. et al. (1997). Antibodies to VLA4 integrin mobilize long-term repopulating cells and augment cytokine-induced mobilization in primates and mice, Blood 90:4779-4788.
D'Andrea, A.D. et al. (1997). Molecular biology of Fanconi anemia: Implications for diagnosis and therapy, Blood 90:1725-1736.
Devereux, J. et al. (1984). A comprehensive set of sequence analysis programs for the VAX, Nucleic Acids Res. 12:387-395.
Dufour, C. et al. (2008). Fanconi anaemia: New strategies, Bone Marrow Transplantation 41(Suppl):S90-95.
Extended European Search Report mailed on Jan. 20, 2020, for EP Application No. 17 849 687.3, filed on Sep. 8, 2017, 10 pages.
EuroFancolen: Phase I/II Gene Therapy Trial of Fanconi Anemia Patients with a New Orphan Drug Consisting of a Lentiviral Vector Carrying the FANCA Gene: A Coordinated International Action (EuroFancolen), Human Gene Therapy Clinical Development 26:81-82.
European Medicines Agency—Science Medicines Health (2015). Public summary of opinion on orphan designation. Lentiviral vector carrying the Fanconi anaemia-A (FANCA) gene for the treatment of Fanconi anaemia type A, 5 total pages.
Follenzi, A. et al. (2000). Gene transfer by lentiviral vectos is limited by nuclear translocation and rescued by HIV-1 pol sequences, Nat. Genet. 25:217-222.
Good, N.E. et al. (1966). Hydrogen ion buffers for biological research, Biochemistry 5:467-477.
Gonzalez-Murillo, A. et al. (2008). Unaltered repopulation properties of mouse hematopoietic stem cells transduced with lentiviral vectors, Blood 112:3138-3147.
Gonzalez-Murillo, A. et al. (2010). Development of Lentiviral Vectors with Optimized Transcriptional Activity for the Gene Therapy of Patients with Fanconi Anemia, Human Gene Therapy 21:623-630.
International Search Report mailed on Dec. 11, 2017, for PCT Application No. PCT/US2017/050837, filed on Sep. 8, 2017, 4 pages.
International Search Report mailed on Jul. 10, 2019, for PCT Application No. PCT/US2019/027083, filed on Apr. 11, 2019, 4 pages.
Jacome, A. et al. (2006). A simplified approach to improve the efficiency and safety of Ex Vivo hematopoietic gene therapy in Fanconi anemia patients, Hum. Gene Ther. 17:245-250.
Jacome, A. et al. (2009). Lintiviral-mediated genetic correction of hematopoietic and mesenchymal progenitor cells from Fanconi anemia patients, Mol. Ther. 17:1083-1092.
Jin, P. et al. (2008). Differentiation of two types of mobilized peripheral blood stem sells by microRNA and cDNA expression analysis, J. Translational Med. 6:39.
Kelly, P.F. et al. (2007). Stem cell collection and gene transfer in Fanconi anemia, Mol Ther 15:211-219.
Kingsman, S.M. et al. (2005). Potential oncogene activity of the Woodchuck Hepatitis post-transcriptional regulatory element (WPRE), Gene Ther. 12:3-4.
Koda, H. et al. (1984). Antibody synthesis by bone marrow cells in vitro following primary and booster tetanus toxoid immunization in humans, J. Clin. Invest. 73:1377-1384.
Kutler, D.I. et al. (2003). A 20-year perspective on the international Fanconi anemia registry (IFAR), Blood 101:1249-1256.
Larghero, J. et al. (2002). Hematopoietic Progenitor Cell Harvest and Functionality in Fanconi Anemia Patients, Blood 100:3051.
Levitus, M. et al. (2004). Heterogeneity in Fanconi anemia: Evidence for 2 new genetic subtypes, Blood 103:2498-2503.
Liu, J.M. et al. (1999). Engraftment of hematopoietic progenitor cells transduced with the Fanconi anemia group C gene (FANCC), Hum. Gene Ther. 10:2337-2346.

Mitchell, R.S. et al. (2004). Retroviral DNA integration: ASLV, HIV, and MLV show distinct target site preferences, PLoS Biol. 2:E234.
Modlich, U. et al. (2009). Insertional Transformation of Hematopoietic Cells by Self-Inactivating Lentiviral And Gammaretroviral Vectors, Mol Ther. 17:1919-1928.
Montini, E. et al. (2006). Hematopoietic stem cell gene transfer in a tumor-prone mouse model uncovers low genotoxicity of lentiviral vector integration, Nat Biotechnol. 24:687-696.
Montini, E. et al. (2009). The genotoxic potential of retroviral vectors is strongly modulated by vector design and integration site selection in a mouse model of HSC gene therapy, J. Clin. Invest. 119:964-975.
Naldini, L. (2011). Ex vivo gene transfer and correction for cell-based therapies, Nature Reviews Genetics 12:301-315.
Osborn, M.J. et al. (2016). CRISPR/Cas9 targeted gene editing and cellular engineering in Fanconi anemia, Stem Cells Dev. 25:1591-1603.
Osborn, M.J. et al. (2015). Fanconi anemia gene editing by the CRISPR/Cas9 system, Hum. Gene Ther. 26:114-126.
Papayannopoulou, T. et al. (1998). Anti-VLA4/VCAM-1-induced mobilization requires cooperative signaling through the kit/mkit ligand pathway, Blood 91:2231-2239.
Pelus, L.M. (2008). Peripheral blood stream cell mobilization: New regimens, new cells, where do we stand, Curr. Opin. Hematol. 15:285-292.
Rio, P. et al. (2002). In vitro phenotypic correction of hematopoietic progenitors from Fanconi anemia group A knockout mice, Gene Therapy 100:2032-2039.
Rosenberg, P.S. et al. (2003). Cancer incidence in persons with Fanconi anemia, Blood 101:822-826.
Schambach, A. et al. (2006). Woodchuck hepatitis virus post-transcriptional regulatory element deleted from X protein and promoter sequences enhances retroviral vector titer and expression, Gene Ther. 13:641-645.
Schambach, A. et al. (2007). Improving transcriptional termination of self-inactivating Gamma-retroviral and lentiviral vectors, Mol Ther. 15:1167-1173.
Schroder, A.R.W. et al. (2002). HIV-1 integration in the human genome favors active genes and local hotspots, Cell 110:521-529.
Sevilla, J. et al. (2016). Immunomagnetic T cell depletion: An analysis of variables affecting final cell yield, Clin. Lab. 62:1243-1248.
Tamary, H. et al. (2004). Molecular characterization of three novel Fanconi anemia mutations in Israel Arabs, Eur J. Haematol. 72:330-335.
Taniguchi, T. et al. (2006). Molecular pathogeneis of Fanconi anemia: Recent progress, Blood 107:4223-4233.
Tatusova, T.A. et al. (1999). BLAST 2 sequences, a new tool for comparing protein and nucleotide sequences, FEMS Microbiol. Letters 174:247-250.
Tischkowitz, M. et al. (2004). Fanconi anaemia and leukaemia—clinical and molecular aspects, Br. J. Haematol. 126:176-191.
Tolar, J. et al. (2011). Stem Cell Gene Therapy for Fanconi Anemia: Report from the 1st International Fanconi Anemia Gene Therapy Working Group Meeting, Molecular Therapy: The Journal of the American Society Of Gene Therapy 19:1193-1198.
Tricot, G. et al. (2008). Mobilization of peripheral blood stem cells in myeloma with either pegfilgrastim or filgrastim following chemotherapy, Haematologica 93:1739-1742.
Wang, W. (2007). Emergence of a DNA-damage response network consisting of Fanconi anaemia and BRCA proteins, Nat. Rev. Genet. 8:735-748.
Weaver, C.H. et al. (2001). Mobilization of peripheral blood stem cells following myelosuppressive chemotherapy: A randomized comparison of filgrastim, sargramostim, or sequential sargramostim and filgrastim, Bone Marrow Transplantation 27:S23-S29.
Written Opinion of the International Searching Authority mailed on Dec. 11, 2017, for PCT Application No. PCT/US2017/050837, filed on Sep. 8, 2017, 9 pages.
Written Opinion of the International Searching Authority mailed on Jul. 10, 2019, for PCT Application No. PCT/US2019/027083, filed on Apr. 11, 2019, 10 pages.

(56) References Cited

OTHER PUBLICATIONS

Zanta-Boussif, M.A. et al. (2009). Validation of a mutated PRE sequence allowing high and sustained transgene expression while abrogating WHV-X protein synthesis: Application to the gene therapy of WAS, Gene Ther. 16:605-619.

Zennou, V. et al. (2000). HIV-1 genome nuclear import is mediated by a central DNA flap, Cell 101:173-185.

Zufferey, R. et al. (1999). Woodchuck Hepatitis Virus Post-transcriptional Regulatory Element Enhances Expression of Trans genes Delivered by Retroviral Vectors, J. Virol. 73:2886-2892.

Zufferey, R. et al. (1998). Self-inflicting lentivirus vector for safe and efficient In Vivo gene delivery, J. Virol. 72:9873-9880.

Adair et al., "Lessons Learned from Two Decades of Clinical Trial Experience in Gene Therapy for Fanconi Anemia" Curr Gene Ther. (2017) 16(5):338-348.

Adair et al., "Novel lineage depletion preserves autologous blood stem cells for gene therapy of Fanconi anemia complementation group A" Haematologica. (2018) Nov; 103(11):1806-1814.

Lasaga et al., "Gene therapy restores the transcriptional program of hematopoietic stem cells in Fanconi anemia" Haematologica. Oct 1, 2023; 108(10):2652-2663.

NIH National Library of Medicine, National Center for Biotechnology Information. FANCA FA complementation group A [*Homo sapiens* (human)]. Provided by NCBI reference sequences (refSeq), Jul. 2008. https://www.ncbi.nlm.nih.gov/gene/2175#gene-expression. Consulted on Jul. 25, 2024. 8 pages.

Polouckova et al., "Comparison of two different methods for CD34+ selection and T cell depletion in peripheral blood stem cell grafts—our experiences with CellPro, E rosetting and CliniMACS technique" Neoplasma. (2001) 48(5):374-381.

Richel et al., "Highly purified CD34+ cells isolated using magnetically activated cell selection provide rapid engraftment following high-dose chemotherapy in breast cancer patients" Bone Marrow Transplant. Feb. 2000; 25(3):243-249.

Gratama et al., "Loss of CD34(+) hematopoietic progenitor cells due to washing can be reduced by the use of fixative-free erythrocyte lysing reagents" J Immunol Methods. (2000) May 26; 239(1-2)13-23.

Hildenbrandt et al., "Immunomagnetic selection of CD34+ cells: factors influencing component purity and yield" Transfusion. (2000) May; 40(5):507-512.

Muller et al., "Finding the needle in the hay stack: hematopoietic stem cells in Fanconi anemia" Mutat Res. (2009) Jul. 31; 668(1-2):141-149.

\* cited by examiner

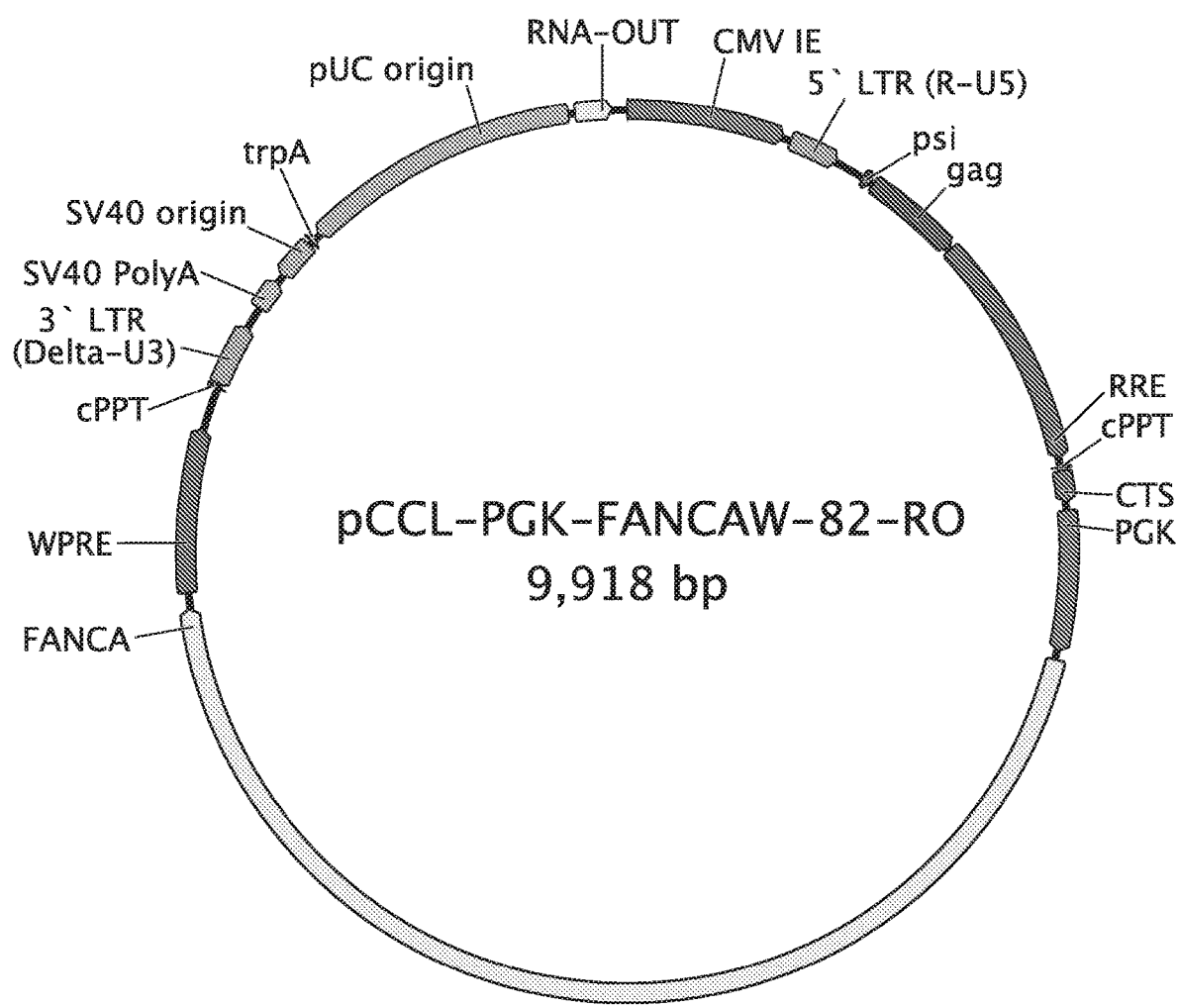

```
                             SEQUENCE LISTING

<160> NUMBER OF SEQ ID NOS: 37

<210> SEQ ID NO 1
<211> LENGTH: 234
<212> TYPE: DNA
<213> ORGANISM: Artificial Sequence
<220> FEATURE:
<223> OTHER INFORMATION: Recombinant Rev response element

<400> SEQUENCE: 1
aggagctttg ttccttgggt tcttgggagc agcaggaagc actatgggcg cagcgtcaat      60
gacgctgacg gtacaggcca gacaattatt gtctggtata gtgcagcagc agaacaattt    120
gctgagggct attgaggcgc aacagcatct gttgcaactc acagtctggg gcatcaagca    180
gctccaggca agaatcctgg ctgtggaaag atacctaaag gatcaacagc tcct          234

<210> SEQ ID NO 2
<211> LENGTH: 126
<212> TYPE: DNA
<213> ORGANISM: Artificial Sequence
<220> FEATURE:
<223> OTHER INFORMATION: Recombinant packaging signal sequence

<400> SEQUENCE: 2
ctctctcgac gcaggactcg gcttgctgaa gcgcgcacgg caagaggcga ggggcggcga     60
ctggtgagta cgccaaaaat tttgactagc ggaggctaga aggagagaga tgggtgcgag    120
agcgtc                                                               126

<210> SEQ ID NO 3
<211> LENGTH: 181
<212> TYPE: DNA
<213> ORGANISM: Artificial Sequence
<220> FEATURE:
<223> OTHER INFORMATION: Recombinant truncated HIV-1 5 prime LTR
      sequence

<400> SEQUENCE: 3
gggtctctct ggttagacca gatctgagcc tgggagctct ctggctaact agggaaccca     60
ctgcttaagc ctcaataaag cttgccttga gtgcttcaag tagtgtgtgc ccgtctgttg    120
tgtgactctg gtaactagag atccctcaga ccctttagt cagtgtggaa aatctctagc    180
a                                                                    181

<210> SEQ ID NO 4
<211> LENGTH: 234
<212> TYPE: DNA
<213> ORGANISM: Artificial Sequence
<220> FEATURE:
<223> OTHER INFORMATION: Recombinant HIV-1 self-inactivating 3 prime LTR
      sequence

<400> SEQUENCE: 4
tggaagggct aattcactcc caacgaagac aagatctgct ttttgcttgt actgggtctc     60
tctggttaga ccagatctga gcctgggagc tctctggcta actagggaac ccactgctta   120
agcctcaata aagcttgcct tgagtgcttc aagtagtgtg tgcccgtctg ttgtgtgact   180
ctggtaacta gagatccctc agaccctttt agtcagtgtg gaaaatctct agca          234
```

```
<210> SEQ ID NO 5
<211> LENGTH: 204
<212> TYPE: DNA
<213> ORGANISM: Artificial Sequence
<220> FEATURE:
<223> OTHER INFORMATION: Recombinant human cytomegalovirus immediate
      early promoter

<400> SEQUENCE: 5
gtgatgcggt tttggcagta catcaatggg cgtggatagc ggtttgactc acggggattt    60
ccaagtctcc accccattga cgtcaatggg agtttgtttt ggcaccaaaa tcaacgggac   120
tttccaaaat gtcgtaacaa ctccgcccca ttgacgcaaa tgggcggtag gcgtgtacgg   180
tgggaggtct atataagcag agct                                          204

<210> SEQ ID NO 6
<211> LENGTH: 118
<212> TYPE: DNA
<213> ORGANISM: Artificial Sequence
<220> FEATURE:
<223> OTHER INFORMATION: Recombinant HIV-1 central polypurine tract and
      central termination sequence

<400> SEQUENCE: 6
ttttaaaaga aaggggggga ttggggggta cagtgcaggg gaaagaatag tagacataat    60
agcaacagac atacaaacta agaattaca aaaacaaatt acaaaaattc aaaattt       118

<210> SEQ ID NO 7
<211> LENGTH: 511
<212> TYPE: DNA
<213> ORGANISM: Artificial Sequence
<220> FEATURE:
<223> OTHER INFORMATION: Recombinant human phosphoglycerate kinase 1
      promoter sequence

<400> SEQUENCE: 7
ggggttgggg ttgcgccttt tccaaggcag ccctgggttt gcgcagggac gcggctgctc    60
tgggcgtggt tccgggaaac gcagcggcgc cgaccctggg tctcgcacat tcttcacgtc   120
cgttcgcagc gtcacccgga tcttcgccgc tacccttgtg ggcccccccgg cgacgcttcc   180 tgctccgccc ctaagtcggg aaggttcctt gcggttcgcg gcgtgccgga cgtgacaaac   240
ggaagccgca cgtctcacta gtaccctcgc agacggacag cgccagggag caatggcagc   300
gcgccgaccg cgatgggctg tggccaatag cggctgctca gcagggcgcg ccgagagcag   360
cggccgggaa ggggcggtgc gggaggcggg gtgtgggcg gtagtgtggg ccctgttcct   420
gcccgcgcgg tgttccgcat tctgcaagcc tccggagcgc acgtcggcag tcggctccct   480
cgttgaccga atcaccgacc tctctccccca g                                  511

<210> SEQ ID NO 8
<211> LENGTH: 4368
<212> TYPE: DNA
<213> ORGANISM: Artificial Sequence
<220> FEATURE:
<223> OTHER INFORMATION: Codon optimized FANCA sequence

<400> SEQUENCE: 8
atgtccgact cgtgggtccc gaactccgcc tcgggccagg acccaggggg ccgccggagg    60
gcctgggccg agctgctggc gggaaggggtc aagagggaaa aatataatcc tgaaagggca   120
cagaaattaa aggaatcagc tgtgcgcctc ctgcgaagcc atcaggacct gaatgccctt   180
```

```
ttgcttgagg tagaaggtcc actgtgtaaa aaattgtctc tcagcaaagt gattgactgt      240
gacagttctg aggcctatgc taatcattct agttcattta taggctctgc tttgcaggat      300
caagcctcaa ggctgggggt tcccgtgggt attctctcag ccgggatggt tgcctctagc      360
gtgggacaga tctgcacggc tccagcggag accagtcacc ctgtgctgct gactgtggag      420
cagagaaaga agctgtcttc cctgttagag tttgctcagt atttattggc acacagtatg      480
ttctcccgtc tttccttctg tcaagaatta tggaaaatac agagttcttt gttgcttgaa      540
gcggtgtggc atcttcacgt acaaggcatt gtgagcctgc aagagctgct ggaaagccat      600
cccgacatga tgctgtggg atcgtggctc ttcaggaatc tgtgctgcct ttgtgaacag       660
atggaagcat cctgccagca tgctgacgtc gccagggcca tgctttctga ttttgttcaa      720
atgtttgttt tgaggggatt tcagaaaaac tcagatctga aagaactgt ggagcctgaa       780 aaaatgccgc aggtcacggt tgatgtactg cagagaatgc tgattttgc acttgacgct       840 ttggctgctg gagtacagga ggagtcctcc actcacaaga tcgtgaggtg ctggttcgga      900
gtgttcagtg gacacacgct tggcagtgta atttccacag atcctctgaa gaggttcttc      960
agtcataccc tgactcagat actcactcac agccctgtgc tgaaagcatc tgatgctgtt     1020
cagatgcaga gagagtggag cttttgcgcgg acacaccctc tgctcacctc actgtaccgc    1080
aggctctttg tgatgctgag tgcagaggag ttggttggcc atttgcaaga agttctggaa     1140
acgcaggagg ttcactggca gagagtgctc tcctttgtgt ctgccctggt tgtctgcttt     1200
ccagaagcgc agcagctgct tgaagactgg gtggcgcgtt tgatggccca ggcattcgag     1260
agctgccagc tggacagcat ggtcactgcg ttcctggttg tgcgccaggc agcactggag     1320
ggcccctctg cgttcctgtc atatgcagac tggttcaagg cctccttggg agcacacga      1380 ggctaccatg gctgcagcaa gaaggccctg gtcttcctgt ttacgttctt gtcagaactc     1440
gtgccttttg agtctccccg gtacctgcag gtgcacattc tccacccacc cctggttccc    1500
agcaagtacc gctccctcct cacagactac atctcattgg ccaagacacg gctggccgac    1560
ctcaaggttt ctatagaaaa catgggactc tacgaggatt tgtcatcagc tggggacatt     1620
actgagcccc cagccaagc tcttcaggat gttgaaaagg ccatcatggt gtttgagcat      1680
acggggaaca tcccagtcac cgtcatggag gccagcatat tcaggaggcc ttactacgtg     1740
tcccacttcc tccccgccct gctcacacct cgagtgctcc ccaaagtccc tgactcccgt     1800
gtggcgttta tagagtctct gaagagagca gataaaatcc cccatctct gtactccacc      1860 tactgccagg cctgctctgc tgctgaagag aagccagaag atgcagccct gggagtgagg     1920
gcagaaccca actctgctga ggagcccctg ggacagctca cagctgcact gggagagctg     1980
agagcctcca tgacagaccc cagccagcgt gatgttatat cggcacaggt ggcagtgatt     2040
tctgaaagac tgagggctgt cctgggccac aatgaggatg acagcagcgt tgagatatca     2100
aagattcagc tcagcatcaa cacgccgaga ctggagccac gggaacacat tgctgtggac     2160
ctcctgctga cgtctttctg tcagaacctg atggctgcct ccagtgtcgc tccccggag     2220 aggcagggtc cctgggctgc cctcttcgtg aggaccatgt gtggacgtgt gctccctgca     2280
gtgctcaccc ggctctgcca gctgctccgt caccagggcc cgagcctgag tgccccacat     2340
gtgctggggt tggctgccct ggccgtgcac ctgggtgagt ccaggtctgc gctcccagag     2400
gtggatgtgg gtcctcctgc acctggtgct ggccttcctg tccctgcgct ctttgacagc     2460
ctcctgacct gtaggacgag ggattccttg ttcttctgcc tgaaattttg tacagcagca     2520
```

```
atttcttact ctctctgcaa gttttcttcc cagtcacgag atactttgtg cagctgctta      2580
tctccaggcc ttattaaaaa gtttcagttc ctcatgttca gattgttctc agaggcccga      2640
cagcctcttt ctgaggagga cgtagccagc cttcctgga gacccttgca ccttccttct       2700
gcagactggc agagagctgc cctctctctc tggacacaca gaaccttccg agaggtgttg      2760
aaagaggaag atgttcactt aacttaccaa gactggttac acctggagct ggaaattcaa      2820
cctgaagctg atgctctttc agatactgaa cggcaggact tccaccagtg ggcgatccat      2880
gagcactttc tccctgagtc ctcggcttca gggggctgtg acggagacct gcaggctgcg      2940
tgtaccattc ttgtcaacgc actgatggat ttccaccaaa gctcaaggag ttatgaccac      3000
tcagaaaatt ctgatttggt ctttggtggc cgcacaggaa atgaggatat tatttccaga      3060
ttgcaggaga tggtagctga cctggagctg cagcaagacc tcatagtgcc tctcggccac      3120
accccttccc aggagcactt cctctttgag attttccgca gacggctcca ggctctgaca      3180
agcgggtgga gcgtggctgc cagccttcag agacagaggg agctgctaat gtacaaacgg      3240
atcctcctcc gcctgccttc gtctgtcctc tgcggcagca gcttccaggc agaacagccc      3300
atcactgcca gatgcgagca gttcttccac ttggtcaact ctgagatgag aaacttctgc      3360
tcccacggag gtgccctgac acaggacatc actgcccact tcttcagggg cctcctgaac      3420
gcctgtctgc ggagcagaga ccccctccct gatggtcgact tcatactggc caagtgccag      3480
acgaaatgcc ccttaatttt gacctctgct ctggtgtggt ggccgagcct ggagcctgtg      3540
ctgctctgcc ggtggaggag acactgccag agcccgctgc cccgggaact gcagaagcta      3600
caagaaggcc ggcagtttgc cagcgatttc ctctcccctg aggctgcctc cccagcaccc      3660
aacccggact ggctctcagc tgctgcactg cactttgcga ttcaacaagt cagggaagaa      3720
aacatcagga agcagctaaa gaagctggac tgcgagagag aggagctatt ggttttcctt      3780
ttcttcttct ccttgatggg cctgctgtcg tcacatctga cctcaaatag caccacagac      3840
ctgccaaagg ctttccacgt ttgtgcagca atcctcgagt gtttagagaa gaggaagata      3900
tcctggctgg cactctttca gttgacagag agtgacctca ggctggggcg gctcctcctc      3960
cgtgtggccc cggatcagca caccaggctg ctgccttcg cttttttacag tcttctctcc      4020 tacttccatg aagacgcggc catcagggaa gaggccttcc tgcatgttgc tgtggacatg      4080
tacttgaagc tggtccagct cttcgtggct ggggatacaa gcacagtttc acctccagct      4140
ggcaggagcc tggagctcaa gggtcagggc aaccccgtgg aactgataac aaaagctcgt      4200 cttttttctgc tgcagttaat acctcggtgc ccgaaaaaga gcttctcaca cgtggcagag      4260
ctgctggctg atcgtgggga ctgcgaccca gaggtgagcg ccgccctcca gagcagacag      4320
caggctgccc ctgacgctga cctgtcccag gagcctcatc tcttctga                 4368
```

<210> SEQ ID NO 9
<211> LENGTH: 380
<212> TYPE: DNA
<213> ORGANISM: Artificial Sequence
<220> FEATURE:
<223> OTHER INFORMATION: Recombinant human CMV enhancer sequence

<400> SEQUENCE: 9

```
gacattgatt attgactagt tattaatagt aatcaattac ggggtcatta gttcatagcc       60
catatatgga gttccgcgtt acataactta cggtaaatgg cccgcctggc tgaccgccca      120
acgacccccg cccattgacg tcaataatga cgtatgttcc catagtaacg ccaataggga      180
ctttccattg acgtcaatgg gtggagtatt tacggtaaac tgcccacttg gcagtacatc      240
```

```
aagtgtatca tatgccaagt acgcccccta ttgacgtcaa tgacggtaaa tggcccgcct     300
ggcattatgc ccagtacatg acctthatggg actttcctac ttggcagtac atctacgtat     360
tagtcatcgc tattaccatg                                                    380
```

```
<210> SEQ ID NO 10
<211> LENGTH: 122
<212> TYPE: DNA
<213> ORGANISM: Artificial Sequence
<220> FEATURE:
<223> OTHER INFORMATION: Recombinant Simian virus 40 polyA signal
      sequence

<400> SEQUENCE: 10
aacttgttta ttgcagctta taatggttac aaataaagca atagcatcac aaatttcaca     60
aataaagcat ttttttcact gcattctagt tgtggtttgt ccaaactcat caatgtatct    120
ta                                                                      122
```

```
<210> SEQ ID NO 11
<211> LENGTH: 136
<212> TYPE: DNA
<213> ORGANISM: Artificial Sequence
<220> FEATURE:
<223> OTHER INFORMATION: Recombinant Simian virus 40 origin of
      replication sequence

<400> SEQUENCE: 11
atcccgcccc taactccgcc cagttccgcc cattctccgc cccatggctg actaattttt     60
tttatttatg cagaggccga ggccgcctcg gcctctgagc tattccagaa gtagtgagga    120
ggcttttttg gaggcc                                                       136
```

```
<210> SEQ ID NO 12
<211> LENGTH: 28
<212> TYPE: DNA
<213> ORGANISM: Artificial Sequence
<220> FEATURE:
<223> OTHER INFORMATION: Recombinant HIV-1 central polypurine tract and
      central termination sequence

<400> SEQUENCE: 12
tttaaaagaa aagggggat tgggggggt                                           28
```

```
<210> SEQ ID NO 13
<211> LENGTH: 83
<212> TYPE: DNA
<213> ORGANISM: Artificial Sequence
<220> FEATURE:
<223> OTHER INFORMATION: Recombinant dNEF signal sequence

<400> SEQUENCE: 13
gaattcgagc tcggtacctt taagaccaat gacttacaag gcagctgtag atcttagcca     60 cttttttaaaa gaaaaggggg gac                                              83
```

```
<210> SEQ ID NO 14
<211> LENGTH: 795
<212> TYPE: DNA
<213> ORGANISM: Artificial Sequence
<220> FEATURE:
<223> OTHER INFORMATION: Recombinant KanR sequence

<400> SEQUENCE: 14
atgattgaac aagatggatt gcacgcaggt tctccggccg cttgggtgga gaggctattc     60
```

```
ggctatgact gggcacaaca gacaatcggc tgctctgatg ccgccgtgtt ccggctgtca    120
gcgcaggggc gtccggttct ttttgtcaag accgacctgt ccggtgccct gaatgaactg    180
caagacgagg cagcgcggct atcgtggctg gcgacgacgg gcgttccttg cgcggctgtg    240
ctcgacgttg tcactgaagc gggaagggac tggctgctat gggcgaagt gccggggcag    300 gatctcctgt catctcacct tgctcctgcc gagaaagtat ccatcatggc tgatgcaatg    360
cggcggctgc atacgcttga tccggctacc tgcccattcg accaccaagc gaaacatcgc    420
atcgagcgag cacgtactcg gatggaagcc ggtcttgtcg atcaggatga tctggacgaa    480
gagcatcagg ggctcgcgcc agccgaactg ttcgccaggc tcaaggcgtc tatgcccgac    540
ggcgaggatc tcgtcgtgac ccacggcgat gcctgcttgc cgaatatcat ggtggaaaat    600
ggccgctttt ctggattcat cgactgtggc cgtctgggtg tggcggaccg ctatcaggac    660
atagcgttgg ctacccgtga tattgctgaa gagcttggcg gcgaatgggc tgaccgcttc    720
cttgtgcttt acggtatcgc cgcgcccgat tcgcagcgca tcgccttcta tcgccttctt    780
gacgagttct tctga                                                    795

<210> SEQ ID NO 15
<211> LENGTH: 137
<212> TYPE: DNA
<213> ORGANISM: Artificial Sequence
<220> FEATURE:
<223> OTHER INFORMATION: Recombinant rrnG terminator sequence

<400> SEQUENCE: 15
gcattggcgc agaaaaaaat gcctgatgcg acgctgcgcg tcttatactc ccacatatgc     60
cagattcagc aacggatacg gcttccccaa cttgcccact tccatacgtg tcctccttac    120
cagaaattta tccttaa                                                  137

<210> SEQ ID NO 16
<211> LENGTH: 589
<212> TYPE: DNA
<213> ORGANISM: Artificial Sequence
<220> FEATURE:
<223> OTHER INFORMATION: Recombinant high-copy-number ColE1, pMB1,
      pBR322, pUC origin of replication

<400> SEQUENCE: 16
ttgagatcct ttttttctgc gcgtaatctg ctgcttgcaa acaaaaaaac caccgctacc     60
agcggtggtt tgtttgccgg atcaagagct accaactctt tttccgaagg taactggctt    120
cagcagagcg cagataccaa atactgttct tctagtgtag ccgtagttag gccaccactt    180
caagaactct gtagcaccgc ctacatacct cgctctgcta atcctgttac cagtggctgc    240
tgccagtggc gataagtcgt gtcttaccgg gttggactca agacgatagt taccggataa    300
ggcgcagcgg tcgggctgaa cggggggttc gtgcacacag cccagcttgg agcgaacgac    360
ctacaccgaa ctgagatacc tacagcgtga gctatgagaa agcgccacgc ttcccgaagg    420
gagaaaggcg gacaggtatc cggtaagcgg cagggtcgga acaggagagc gcacgaggga    480
gcttccaggg ggaaacgcct ggtatcttta tagtcctgtc gggtttcgcc acctctgact    540
tgagcgtcga ttttttgtgat gctcgtcagg ggggcggagc ctatggaaa              589

<210> SEQ ID NO 17
<211> LENGTH: 22
<212> TYPE: DNA
<213> ORGANISM: Artificial Sequence
```

```
<220> FEATURE:
<223> OTHER INFORMATION: Recombinant CAP binding site

<400> SEQUENCE: 17
taatgtgagt tagctcactc at                                              22

<210> SEQ ID NO 18
<211> LENGTH: 31
<212> TYPE: DNA
<213> ORGANISM: Artificial Sequence
<220> FEATURE:
<223> OTHER INFORMATION: Recombinant lac promoter sequence

<400> SEQUENCE: 18 tttacactttt atgcttccgg ctcgtatgtt g                                    31

<210> SEQ ID NO 19
<211> LENGTH: 17
<212> TYPE: DNA
<213> ORGANISM: Artificial Sequence
<220> FEATURE:
<223> OTHER INFORMATION: Recombinant lac operator sequence

<400> SEQUENCE: 19
ttgtgagcgg ataacaa                                                    17

<210> SEQ ID NO 20
<211> LENGTH: 19
<212> TYPE: DNA
<213> ORGANISM: Artificial Sequence
<220> FEATURE:
<223> OTHER INFORMATION: Recombinant T3 promoter sequence

<400> SEQUENCE: 20
aattaaccct cactaaagg                                                  19

<210> SEQ ID NO 21
<211> LENGTH: 19
<212> TYPE: DNA
<213> ORGANISM: Artificial Sequence
<220> FEATURE:
<223> OTHER INFORMATION: Recombinant T7 promoter sequence

<400> SEQUENCE: 21
cctatagtga gtcgtatta                                                  19

<210> SEQ ID NO 22
<211> LENGTH: 429
<212> TYPE: DNA
<213> ORGANISM: Artificial Sequence
<220> FEATURE:
<223> OTHER INFORMATION: Recombinant f1 bacteriophage origin of
      replication sequence

<400> SEQUENCE: 22
acgcgccctg tagcggcgca ttaagcgcgg cgggtgtggt ggttacgcgc agcgtgaccg      60
ctacacttgc cagcgcccta gcgcccgctc ctttcgcttt cttcccttcc tttctcgcca     120
cgttcgccgg ctttccccgt caagctctaa atcgggggct cccttaggg ttccgattta      180 gtgctttacg gcacctcgac cccaaaaaac ttgattaggg tgatggttca cgtagtgggc    240
catcgccctg atagacggtt tttcgccctt tgacgttgga gtccacgttc tttaatagtg    300
gactcttgtt ccaaactgga acaacactca accctatctc ggtctattct ttgatttat    360 aagggatttt gccgatttcg gcctattggt taaaaaatga gctgatttaa caaaaattta    420
``` acgcgaatt                                                                    429

<210> SEQ ID NO 23
<211> LENGTH: 677
<212> TYPE: DNA
<213> ORGANISM: Artificial Sequence
<220> FEATURE:
<223> OTHER INFORMATION: Chimeric wPRE sequence

<400> SEQUENCE: 23
cgagcatctt accgccattt attcccatat tgttctgtt tttcttgatt tgggtataca     60
tttaaatgtt aataaaacaa aatggtgggg caatcattta catttttagg gatatgtaat   120
tactagttca ggtgtattgc cacaagacaa acatgttaag aaactttccc gttatttacg   180
ctctgttcct gttaatcaac ctctggatta caaaatttgt gaaagattga ctgatattct   240
taactatgtt gctccttta cgctgtgtgg atatgctgct ttaatgcctc tgtatcatgc    300
tattgcttcc cgtacggctt tcgttttctc ctccttgtat aaatcctggt tgctgtctct   360
ttatgaggag ttgtggcccg ttgtccgtca acgtggcgtg gtgtgctctg tgtttgctga   420
cgcaaccccc actggctggg gcattgccac cacctgtcaa ctccttctg gactttcgc     480
tttcccctc ccgatcgcca cggcagaact catcgccgcc tgccttgccc gctgctggac    540
aggggctagg ttgctgggca ctgataattc cgtggtgttg tcggggaagg gcctgctgcc   600
ggctctgcgg cctcttccgc gtcttcgcct tcgccctcag acgagtcgga tctccctttg   660
ggccgcctcc ccgcctg                                                  677

<210> SEQ ID NO 24
<211> LENGTH: 11433
<212> TYPE: DNA
<213> ORGANISM: Artificial Sequence
<220> FEATURE:
<223> OTHER INFORMATION: pCCL-PGK-FANCA-WPRE or pCCL-SIN-cPPT CTS-hPGK-
      hFANCA-WPRE

<400> SEQUENCE: 24
catgaccaaa atcccttaac gtgagttttc gttccactga gcgtcagacc ccgtagaaaa     60
gatcaaagga tcttcttgag atcctttttt tctgcgcgta atctgctgct tgcaaacaaa   120
aaaaccaccg ctaccagcgg tggtttgttt gccggatcaa gagctaccaa ctcttttcc    180
gaaggtaact ggcttcagca gagcgcagat accaaatact gttcttctag tgtagccgta   240
gttaggccac cacttcaaga actctgtagc accgcctaca tacctcgctc tgctaatcct   300
gttaccagtg gctgctgcca gtggcgataa gtcgtgtctt accgggttgg actcaagacg   360
atagttaccg gataaggcgc agcggtcggg ctgaacgggg ggttcgtgca cacagcccag   420
cttggagcga acgacctaca ccgaactgag atacctacag cgtgagctat gagaaagcgc   480
cacgcttccc gaagggagaa aggcggacag gtatccggta agcggcaggg tcggaacagg   540
agagcgcacg agggagcttc cagggggaaa cgcctggtat ctttatagtc ctgtcgggtt   600
tcgccacctc tgacttgagc gtcgattttt gtgatgctcg tcaggggggc ggagcctatg   660
gaaaaacgcc agcaacgcgg ccttttttacg gttcctggcc ttttgctggc cttttgctca   720
catgttcttt cctgcgttat cccctgattc tgtggataac cgtattaccg cctttgagtg   780
agctgatacc gctcgccgca gccgaacgac cgagcgcagc gagtcagtga gcgaggaagc   840
ggaagagcgc ccaatacgca aaccgcctct ccccgcgcgt tggccgattc attaatgcag   900
ctggcacgac aggtttcccg actggaaagc gggcagtgag cgcaacgcaa ttaatgtgag   960

```
ttagctcact cattaggcac cccaggcttt acactttatg cttccggctc gtatgttgtg   1020
tggaattgtg agcggataac aatttcacac aggaaacagc tatgaccatg attacgccaa   1080
gcgcgcaatt aaccctcact aaagggaaca aaagctggag ctgcaagctt ggccattgca   1140
tacgttgtat ccatatcata atatgtacat ttatattggc tcatgtccaa cattaccgcc   1200
atgttgacat tgattattga ctagttatta atagtaatca attacggggt cattagttca   1260
tagcccatat atggagttcc gcgttacata acttacggta atggcccgc ctggctgacc    1320 gcccaacgac ccccgcccat tgacgtcaat aatgacgtat gttcccatag taacgccaat   1380
agggactttc cattgacgtc aatgggtgga gtatttacgg taaactgccc acttggcagt   1440
acatcaagtg tatcatatgc caagtacgcc ccctattgac gtcaatgacg gtaaatggcc   1500
cgcctggcat tatgcccagt acatgacctt atgggacttt cctacttggc agtacatcta   1560
cgtattagtc atcgctatta ccatggtgat gcggttttgg cagtacatca atgggcgtgg   1620
atagcggttt gactcacggg gatttccaag tctccacccc attgacgtca atgggagttt   1680
gttttggcac caaaatcaac gggactttcc aaaatgtcgt aacaactccg ccccattgac   1740
gcaaatgggc ggtaggcgtg tacggtggga ggtctatata agcagagctc gtttagtgaa   1800
ccggggtctc tctggttaga ccagatctga gcctgggagc tctctggcta actagggaac   1860
ccactgctta agcctcaata aagcttgcct tgagtgcttc aagtagtgtg tgcccgtctg   1920
ttgtgtgact ctggtaacta gagatccctc agaccctttt agtcagtgtg gaaaatctct   1980
agcagtggcg cccgaacagg gacttgaaag cgaaagggaa accagaggag ctctctcgac   2040
gcaggactcg gcttgctgaa gcgcgcacgg caagaggcga ggggcggcga ctggtgagta   2100
cgccaaaaat tttgactagc ggaggctaga aggagagaga tgggtgcgag agcgtcagta   2160
ttaagcgggg gagaattaga tcgcgatggg aaaaaattcg gttaaggcca gggggaaaga   2220
aaaaatataa attaaaacat atagtatggg caagcaggga gctagaacga ttcgcagtta   2280
atcctggcct gttagaaaca tcagaaggct gtagacaaat actgggacag ctacaaccat   2340
cccttcagac aggatcagaa gaacttagat cattatataa tacagtagca accctctatt   2400
gtgtgcatca aaggatagag ataaaagaca ccaaggaagc tttagacaag atagaggaag   2460
agcaaaacaa aagtaagacc accgcacagc aagcggccgc tgatcttcag acctggagga   2520
ggagatatga gggacaattg gagaagtgaa ttatataaat ataaagtagt aaaaattgaa   2580
ccattaggag tagcacccac caaggcaaag agaagagtgg tgcagagaga aaaagagca    2640 gtgggaatag gagctttgtt ccttgggttc ttgggagcag caggaagcac tatgggcgca   2700
gcgtcaatga cgctgacggt acaggccaga caattattgt ctggtatagt gcagcagcag   2760
aacaatttgc tgagggctat tgaggcgcaa cagcatctgt tgcaactcac agtctggggc   2820
atcaagcagc tccaggcaag aatcctggct gtggaaagat acctaaagga tcaacagctc   2880
ctggggattt ggggttgctc tggaaaactc atttgcacca ctgctgtgcc ttggaatgct   2940
agttggagta ataaatctct ggaacagatt tggaatcaca cgacctggat ggagtgggac   3000
agagaaatta acaattacac aagcttaata cactccttaa ttgaagaatc gcaaaaccag   3060
caagaaaaga atgaacaaga attattggaa ttagataaat gggcaagttt gtggaattgg   3120
tttaacataa caaattggct gtggtatata aaattattca taatgatagt aggaggcttg   3180
gtaggtttaa gaatagtttt tgctgtactt tctatagtga atagagttag gcagggatat   3240
tcaccattat cgtttcagac ccacctccca accccgaggg gacccgacag gcccgaagga   3300
```

```
atagaagaag aaggtggaga gagagacaga gacagatcca ttcgattagt gaacggatct    3360
cgacggtatc ggttaacttt taaaagaaaa gggggggattg gggggtacag tgcaggggaa    3420
agaatagtag acataatagc aacagacata caaactaaag aattacaaaa acaaattaca    3480
aaaattcaaa attttatcga tcacgagact agcctcgaga agcttgatat cgaattccac    3540
ggggttgggg ttgcgccttt tccaaggcag ccctgggttt gcgcagggac gcggctgctc    3600
tgggcgtggt tccgggaaac gcagcggcgc cgaccctggg tctcgcacat tcttcacgtc    3660
cgttcgcagc gtcacccgga tcttcgccgc tacccttgtg ggcccccgg cgacgcttcc     3720
tgctccgccc ctaagtcggg aaggttcctt gcggttcgcg gcgtgccgga cgtgacaaac    3780
ggaagccgca cgtctcacta gtaccctcgc agacggacag cgccagggag caatggcagc    3840
gcgccgaccg cgatgggctg tggccaatag cggctgctca gcagggcgcg ccgagagcag    3900
cggccgggaa ggggcggtgc gggaggcggg gtgtggggcg gtagtgtggg ccctgttcct    3960
gcccgcgcgg tgttccgcat tctgcaagcc tccggagcgc acgtcggcag tcggctccct    4020
cgttgaccga atcaccgacc tctctcccca ggggatccc ccgggctgca ggaattcatg      4080
tccgactcgt gggtcccgaa ctccgcctcg gccaggacc caggggggccg ccggagggcc    4140
tgggccgagc tgctggcggg aagggtcaag agggaaaaat ataatcctga aagggcacag    4200
aaattaaagg aatcagctgt gcgcctcctg cgaagccatc aggacctgaa tgccccttttg   4260
cttgaggtag aaggtccact gtgtaaaaaa ttgtctctca gcaaagtgat tgactgtgac    4320
agttctgagg cctatgctaa tcattctagt tcatttatag gctctgcttt gcaggatcaa    4380
gcctcaaggc tgggggttcc cgtgggtatt ctctcagccg ggatggttgc ctctagcgtg    4440
ggacagatct gcacggctcc agcggagacc agtcaccctg tgctgctgac tgtggagcag    4500
agaaagaagc tgtcttccct gttagagttt gctcagtatt tattggcaca cagtatgttc    4560
tcccgtcttt ccttctgtca agaattatgg aaaatacaga gttctttgtt gcttgaagcg    4620
gtgtggcatc ttcacgtaca aggcattgtg agcctgcaag agctgctgga aagccatccc    4680
gacatgcatg ctgtgggatc gtggctcttc aggaatctgt gctgcctttg tgaacagatg    4740
gaagcatcct gccagcatgc tgacgtcgcc agggccatgc tttctgattt tgttcaaatg    4800
tttgttttga ggggatttca gaaaaactca gatctgagaa gaactgtgga gcctgaaaaa    4860
atgccgcagg tcacggttga tgtactgcag agaatgctga tttttgcact tgacgctttg    4920
gctgctggag tacaggagga gtcctccact cacaagatcg tgaggtgctg gttcggagtg    4980
ttcagtggac acacgcttgg cagtgtaatt tccacagatc ctctgaagag gttcttcagt    5040
cataccctga ctcagatact cactcacagc cctgtgctga aagcatctga tgctgttcag    5100
atgcagagag agtggagctt tgcgcggaca caccctctgc tcacctcact gtaccgcagg    5160
ctctttgtga tgctgagtgc agaggagttg gttggccatt gcaagaagt tctggaaacg     5220
caggaggttc actggcagag agtgctctcc tttgtgtctg ccctggttgt ctgctttcca    5280
gaagcgcagc agctgcttga agactgggtg gcgcgtttga tggcccaggc attcgagagc    5340
tgccagctgg acagcatggt cactgcgttc ctggttgtgc ccaggcagc actggagggc    5400
ccctctgcgt tcctgtcata tgcagactgg ttcaaggcct cctttgggag cacacgaggc    5460
taccatggct gcagcaagaa ggccctggtc ttcctgttta cgttcttgtc agaactcgtg    5520
cctttttgagt ctccccggta cctgcaggtg cacattctcc acccacccct ggttcccagc   5580
aagtaccgct ccctcctcac agactacatc tcattggcca agacacggct ggccgacctc    5640
aaggtttcta tagaaaacat gggactctac gaggatttgt catcagctgg ggacattact    5700
```

```
gagccccaca gccaagctct tcaggatgtt gaaaaggcca tcatggtgtt tgagcatacg    5760
gggaacatcc cagtcaccgt catggaggcc agcatattca ggaggcctta ctacgtgtcc    5820
cacttcctcc ccgccctgct cacacctcga gtgctcccca aagtccctga ctcccgtgtg    5880
gcgtttatag agtctctgaa gagagcagat aaaatccccc catctctgta ctccacctac    5940
tgccaggcct gctctgctgc tgaagagaag ccagaagatg cagccctggg agtgagggca    6000
gaacccaact ctgctgagga gcccctggga cagctcacag ctgcactggg agagctgaga    6060
gcctccatga cagaccccag ccagcgtgat gttatatcgg cacaggtggc agtgatttct    6120
gaaagactga gggctgtcct gggccacaat gaggatgaca gcagcgttga gatatcaaag    6180
attcagctca gcatcaacac gccgagactg gagccacggg aacacattgc tgtggacctc    6240
ctgctgacgt ctttctgtca gaacctgatg gctgcctcca gtgtcgctcc ccggagagg    6300 cagggtccct gggctgccct cttcgtgagg accatgtgtg gacgtgtgct ccctgcagtg    6360
ctcacccggc tctgccagct gctccgtcac cagggcccga gcctgagtgc cccacatgtg    6420
ctggggttgg ctgccctggc cgtgcacctg ggtgagtcca ggtctgcgct cccagaggtg    6480
gatgtgggtc ctcctgcacc tggtgctggc cttcctgtcc ctgcgctctt tgacagcctc    6540
ctgacctgta ggacgaggga ttccttgttc ttctgcctga aattttgtac agcagcaatt    6600
tcttactctc tctgcaagtt ttcttcccag tcacgagata ctttgtgcag ctgcttatct    6660
ccaggcctta ttaaaaagtt tcagttcctc atgttcagat tgttctcaga ggcccgacag    6720
cctctttctg aggaggacgt agccagcctt tcctggagac ccttgcacct tccttctgca    6780
gactggcaga gagctgccct ctctctctgg acacacagaa ccttccgaga ggtgttgaaa    6840
gaggaagatg ttcacttaac ttaccaagac tggttacacc tggagctgga aattcaacct    6900
gaagctgatg ctctttcaga tactgaacgg caggacttcc accagtgggc gatccatgag    6960
cactttctcc ctgagtcctc ggcttcaggg gctgtgacg gagacctgca ggctgcgtgt    7020
accattcttg tcaacgcact gatggatttc caccaaagct caaggagtta tgaccactca    7080
gaaaattctg atttggtctt tggtggccgc acaggaaatg aggatattat ttccagattg    7140
caggagatgg tagctgacct ggagctgcag caagacctca tagtgcctct cggccacacc    7200
ccttcccagg agcacttcct ctttgagatt ttccgcagac ggctccaggc tctgacaagc    7260
gggtggagcg tggctgccag ccttcagaga cagagggagc tgctaatgta caaacggatc    7320
ctcctccgcc tgccttcgtc tgtcctctgc ggcagcagct tccaggcaga acagcccatc    7380
actgccagat gcgagcagtt cttccacttg gtcaactctg agatgagaaa cttctgctcc    7440
cacggaggtg ccctgacaca ggacatcact gcccacttct tcaggggcct cctgaacgcc    7500
tgtctgcgga gcagagaccc ctccctgatg gtcgacttca tactggccaa gtgccagacg    7560
aaatgcccct taattttgac ctctgctctg tgtggtggc cgagcctgga gcctgtgctg    7620
ctctgccggt ggaggagaca ctgccagagc ccgctgcccc gggaactgca gaagctacaa    7680
gaaggccggc agtttgccag cgatttcctc tcccctgagg ctgcctcccc agcacccaac    7740
ccggactggc tctcagctgc tgcactgcac tttgcgattc aacaagtcag ggaagaaaac    7800
atcaggaagc agctaaagaa gctggactgc gagagagagg agctattggt tttccttttc    7860
ttcttctcct tgatgggcct gctgtcgtca catctgacct caaatagcac cacagacctg    7920
ccaaaggctt tccacgtttg tgcagcaatc ctcgagtgtt tagagaagag gaagatatcc    7980
tggctggcac tctttcagtt gacagagagt gacctcaggc tggggcggct cctcctccgt    8040
```

```
gtggccccgg atcagcacac caggctgctg cctttcgctt tttacagtct tctctcctac    8100
ttccatgaag acgcggccat cagggaagag gccttcctgc atgttgctgt ggacatgtac    8160
ttgaagctgg tccagctctt cgtggctggg gatacaagca cagtttcacc tccagctggc    8220
aggagcctga agctcaaggg tcagggcaac cccgtggaac tgataacaaa agctcgtctt    8280
tttctgctgc agttaatacc tcggtgcccg aaaaagagct tctcacacgt ggcagagctg    8340
ctggctgatc gtggggactg cgacccagag gtgagcgccg ccctccagag cagacagcag    8400
gctgcccctg acgctgacct gtcccaggag cctcatctct tctgatgaga attcgatatc    8460
aagcttatcg ataccgtcga atcccccggg ctgcaggaat tcgagcatct taccgccatt    8520
tattcccata tttgttctgt ttttcttgat ttgggtatac atttaaatgt taataaaaca    8580
aaatggtggg gcaatcattt acatttttag ggatatgtaa ttactagttc aggtgtattg    8640
ccacaagaca aacatgttaa gaaactttcc cgttatttac gctctgttcc tgttaatcaa    8700
cctctggatt acaaaatttg tgaaagattg actgatattc ttaactatgt tgctccttt t   8760 acgctgtgtg gatatgctgc tttaatgcct ctgtatcatg ctattgcttc ccgtacggct    8820
ttcgttttct cctccttgta taaatcctgg ttgctgtctc tttatgagga gttgtggccc    8880
gttgtccgtc aacgtggcgt ggtgtgctct gtgtttgctg acgcaacccc cactggctgg    8940
ggcattgcca ccacctgtca actcctttct gggactttcg ctttcccccct cccgatcgcc    9000 acggcagaac tcatcgccgc ctgccttgcc cgctgctgga caggggctag gttgctgggc    9060
actgataatt ccgtggtgtt gtcggggaag ggcctgctgc cggctctgcg gcctcttccg    9120
cgtcttcgcc ttcgccctca gacgagtcgg atctcccttt gggccgcctc cccgcctgga    9180
attcgagctc ggtacccttta agaccaatga cttacaaggc agctgtagat cttagccact    9240
ttttaaaaga aaggggggga ctggaagggc taattcactc ccaacgaaga caagatctgc    9300
tttttgcttg tactgggtct ctctggttag accagatctg agcctgggag ctctctggct    9360
aactagggaa cccactgctt aagcctcaat aaagcttgcc ttgagtgctt caagtagtgt    9420
gtgcccgtct gttgtgtgac tctggtaact agagatccct cagaccctt t tagtcagtgt    9480 ggaaaatctc tagcagtagt agttcatgtc atcttattat tcagtattta aacttgcaa    9540 agaaatgaat atcagagagt gagaggaact tgtttattgc agcttataat ggttacaaat    9600
aaagcaatag catcacaaat ttcacaaata agcatttttt tcactgcat tctagttgtg    9660 gtttgtccaa actcatcaat gtatcttatc atgtctggct ctagctatcc cgcccctaac    9720
tccgcccatc ccgcccctaa ctccgcccag ttccgcccat tctccgcccc atggctgact    9780 aattttttt atttatgcag aggccgaggc cgcctcggcc tctgagctat tccagaagta    9840
gtgaggaggc ttttttggag gcctagggac gtacccaatt cgccctatag tgagtcgtat    9900
tacgcgcgct cactggccgt cgttttacaa cgtcgtgact gggaaaaccc tggcgttacc    9960
caacttaatc gccttgcagc acatccccct ttcgccagct ggcgtaatag cgaagaggcc   10020
cgcaccgatc gcccttccca acagttgcgc agcctgaatg gcgaatggga cgcgccctgt   10080
agcggcgcat taagcgcggc gggtgtggtg gttacgcgca gcgtgaccgc tacacttgcc   10140
agcgccctag cgcccgctcc tttcgctttc ttcccttcct ttctcgccac gttcgccggc   10200
tttccccgtc aagctctaaa tcgggggctc cctttagggt tccgatttag tgctttacgg   10260
cacctcgacc ccaaaaaact tgattagggt gatggttcac gtagtgggcc atcgccctga   10320
tagacggttt ttcgcccttt gacgttggag tccacgttct ttaatagtgg actcttgttc   10380
caaactggaa caacactcaa ccctatctcg gtctattctt ttgatttata agggattttg   10440
```

```
ccgatttcgg cctattggtt aaaaaatgag ctgatttaac aaaaatttaa cgcgaatttt    10500
aacaaaatat taacgcttac aatttaggtg gcacttttcg gggaaatgtg cgcggaaccc    10560
ctatttgttt attttttctaa atacattcaa atatgtatcc gctcatgaga caataaccct   10620
gataaatgct tcaataatag cacctagatc aagagacagg atgaggatcg tttcgcatga    10680
ttgaacaaga tggattgcac gcaggttctc cggccgcttg ggtggagagg ctattcggct    10740
atgactgggc acaacagaca atcggctgct ctgatgccgc cgtgttccgg ctgtcagcgc    10800
aggggcgccc ggttctttttt gtcaagaccg acctgtccgg tgccctgaat gaactgcaag    10860
acgaggcagc gcggctatcg tggctggcca cgacgggcgt tccttgcgca gctgtgctcg    10920
acgttgtcac tgaagcggga agggactggc tgctattggg cgaagtgccg gggcaggatc    10980
tcctgtcatc tcaccttgct cctgccgaga aagtatccat catggctgat gcaatgcggc    11040
ggctgcatac gcttgatccg gctacctgcc cattcgacca ccaagcgaaa catcgcatcg    11100
agcgagcacg tactcggatg aagccggtc ttgtcgatca ggatgatctg gacgaagagc     11160
atcaggggct cgcgccagcc gaactgttcg ccaggctcaa ggcgagcatg cccgacggcg    11220
aggatctcgt cgtgacccat ggcgatgcct gcttgccgaa tatcatggtg gaaaatggcc    11280
gcttttctgg attcatcgac tgtggccggc tgggtgtggc ggaccgctat caggacatag    11340
cgttggctac ccgtgatatt gctgaagagc ttggcggcga atgggctgac cgcttcctcg    11400
tgctttacgg tatcgccgct cccgattcgc agc                                 11433

<210> SEQ ID NO 25
<211> LENGTH: 5554
<212> TYPE: DNA
<213> ORGANISM: Artificial Sequence
<220> FEATURE:
<223> OTHER INFORMATION: pCCL-PGK-FANCAW-82-RO

<400> SEQUENCE: 25
ggggttgggg ttgcgccttt tccaaggcag ccctgggttt gcgcagggac gcggctgctc       60
tgggcgtggt tccgggaaac gcagcggcgc cgaccctggg tctcgcacat tcttcacgtc      120
cgttcgcagc gtcacccgga tcttcgccgc taccttgtg ggccccccgg cgacgcttcc       180
tgctccgccc ctaagtcggg aaggttcctt gcggttcgcg gcgtgccgga cgtgacaaac      240
ggaagccgca cgtctcacta gtaccctcgc agacggacag cgccagggag caatggcagc      300
gcgccgaccg cgatgggctg tggccaatag cggctgctca gcagggcgcg ccgagagcag      360
cggccgggaa ggggcggtgc gggaggcggg gtgtggggcg gtagtgtggg ccctgttcct      420
gcccgcgcgg tgttccgcat tctgcaagcc tccggagcgc acgtcggcag tcggctccct      480
cgttgaccga atcaccgacc tctctcccca ggggatccc ccgggctgca ggaattcatg       540
tccgactcgt gggtcccgaa ctccgcctcg ggccaggacc cagggggccg ccgagggcc       600 tgggccgagc tgctggcggg aagggtcaag agggaaaaat ataatcctga aagggcacag      660
aaattaaagg aatcagctgt gcgcctcctg cgaagccatc aggacctgaa tgccctttg       720 cttgaggtag aaggtccact gtgtaaaaaa ttgtctctca gcaaagtgat tgactgtgac      780
agttctgagg cctatgctaa tcattctagt tcatttatag gctctgcttt gcaggatcaa     840
gcctcaaggc tggggggttcc cgtgggtatt ctctcagccg ggatggttgc ctctagcgtg     900
ggacagatct gcacggctcc agcggagacc agtcaccctg tgctgctgac tgtggagcag      960
agaaagaagc tgtcttccct gttagagttt gctcagtatt tattggcaca cagtatgttc     1020
```

```
tcccgtcttt ccttctgtca agaattatgg aaaatacaga gttctttgtt gcttgaagcg    1080
gtgtggcatc ttcacgtaca aggcattgtg agcctgcaag agctgctgga aagccatccc    1140
gacatgcatg ctgtgggatc gtggctcttc aggaatctgt gctgcctttg tgaacagatg    1200
gaagcatcct gccagcatgc tgacgtcgcc agggccatgc tttctgattt tgttcaaatg    1260
tttgttttga ggggatttca gaaaaactca gatctgagaa gaactgtgga gcctgaaaaa    1320
atgccgcagg tcacggttga tgtactgcag agaatgctga ttttgcact tgacgctttg      1380 gctgctggag tacaggagga gtcctccact cacaagatcg tgaggtgctg gttcggagtg    1440
ttcagtggac acacgcttgg cagtgtaatt tccacagatc ctctgaagag gttcttcagt    1500 catacccctga ctcagatact cactcacagc cctgtgctga aagcatctga tgctgttcag    1560
atgcagagag agtggagctt tgcgcggaca caccctctgc tcacctcact gtaccgcagg    1620
ctctttgtga tgctgagtgc agaggagttg gttggccatt gcaagaagt tctggaaacg    1680 caggaggttc actggcagag agtgctctcc tttgtgtctg ccctggttgt ctgctttcca    1740
gaagcgcagc agctgcttga agactgggtg gcgcgtttga tggcccaggc attcgagagc    1800
tgccagctgg acagcatggt cactgcgttc ctggttgtgc gccaggcagc actggagggc    1860
ccctctgcgt tcctgtcata tgcagactgg ttcaaggcct cctttgggag cacacgaggc    1920
taccatggct gcagcaagaa ggccctggtc ttcctgttta cgttcttgtc agaactcgtg    1980 cctttttgagt ctccccggta cctgcaggtg cacattctcc acccacccct ggttcccagc    2040
aagtaccgct ccctcctcac agactacatc tcattggcca agacacggct ggccgacctc    2100
aaggtttcta tagaaaacat gggactctac gaggatttgt catcagctgg ggacattact    2160
gagccccaca gccaagctct tcaggatgtt gaaaaggcca tcatggtgtt tgagcatacg    2220
gggaacatcc cagtcaccgt catggaggcc agcatattca ggaggcctta ctacgtgtcc    2280
cacttcctcc ccgccctgct cacacctcga gtgctcccca aagtccctga ctcccgtgtg    2340
gcgtttatag agtctctgaa gagagcagat aaaatccccc catctctgta ctccacctac    2400
tgccaggcct gctctgctgc tgaagagaag ccagaagatg cagccctggg agtgagggca    2460
gaacccaact ctgctgagga gcccctggga cagctcacag ctgcactggg agagctgaga    2520
gcctccatga cagaccccag ccagcgtgat gttatatcgg cacaggtggc agtgatttct    2580
gaaagactga gggctgtcct gggccacaat gaggatgaca gcagcgttga gatatcaaag    2640
attcagctca gcatcaacac gccgagactg gagccacggg aacacattgc tgtggacctc    2700
ctgctgacgt ctttctgtca gaacctgatg gctgcctcca gtgtcgctcc cccggagagg    2760
cagggtccct gggctgccct cttcgtgagg accatgtgtg gacgtgtgct ccctgcagtg    2820
ctcacccggc tctgccagct gctccgtcac cagggcccga gcctgagtgc cccacatgtg    2880 ctgggggttgg ctgccctggc cgtgcacctg ggtgagtcca ggtctgcgct cccagaggtg    2940
gatgtgggtc ctcctgcacc tggtgctggc cttcctgtcc ctgcgctctt tgacagcctc    3000
ctgacctgta ggacgaggga ttccttgttc ttctgcctga aatttgtgtac agcagcaatt    3060 tcttactctc tctgcaagtt ttcttcccag tcacgagata cttttgtgcag ctgcttatct    3120 ccaggcctta ttaaaaagtt tcagttcctc atgttcagat tgttctcaga ggcccgacag    3180 cctcttctg aggaggacgt agccagcctt tcctggagac ccttgcacct tccttctgca    3240
gactggcaga gagctgccct ctctctctgg acacacagaa ccttccgaga ggtgttgaaa    3300
gaggaagatg ttcacttaac ttaccaagac tggttacacc tggagctgga aattcaacct    3360
gaagctgatg ctctttcaga tactgaacgg caggacttcc accagtgggc gatccatgag    3420
```

```
cactttctcc ctgagtcctc ggcttcaggg ggctgtgacg gagacctgca ggctgcgtgt    3480
accattcttg tcaacgcact gatggatttc caccaaagct caaggagtta tgaccactca    3540
gaaaattctg atttggtctt tggtggccgc acaggaaatg aggatattat ttccagattg    3600
caggagatgg tagctgacct ggagctgcag caagacctca tagtgcctct cggccacacc    3660
ccttcccagg agcacttcct ctttgagatt ttccgcagac ggctccaggc tctgacaagc    3720
gggtggagcg tggctgccag ccttcagaga cagagggagc tgctaatgta caaacggatc    3780
ctcctccgcc tgccttcgtc tgtcctctgc ggcagcagct tccaggcaga acagcccatc    3840
actgccagat gcgagcagtt cttccacttg gtcaactctg agatgagaaa cttctgctcc    3900
cacggaggtg ccctgacaca ggacatcact gcccacttct caggggcct cctgaacgcc    3960 tgtctgcgga gcagagaccc ctccctgatg gtcgacttca tactggccaa gtgccagacg    4020
aaatgcccct aattttgac ctctgctctg gtgtggtggc cgagcctgga gcctgtgctg    4080
ctctgccggt ggaggagaca ctgccagagc ccgctgcccc gggaactgca gaagctacaa    4140
gaaggccggc agtttgccag cgatttcctc tcccctgagg ctgcctcccc agcacccaac    4200
ccggactggc tctcagctgc tgcactgcac tttgcgattc aacaagtcag ggaagaaaac    4260
atcaggaagc agctaaagaa gctggactgc gagagagagg agctattggt tttccttttc    4320
ttcttctcct tgatgggcct gctgtcgtca catctgacct caaatagcac cacagacctg    4380
ccaaaggctt ccacgtttg tgcagcaatc ctcgagtgtt tagagaagag gaagatatcc    4440
tggctggcac tctttcagtt gacagagagt gacctcaggc tggggcggct cctcctccgt    4500 gtggcccgg atcagcacac caggctgctg cctttcgctt tttacagtct tctctcctac    4560
ttccatgaag acgcggccat cagggaagag gccttcctgc atgttgctgt ggacatgtac    4620
ttgaagctgg tccagctctt cgtggctggg gatacaagca cagtttcacc tccagctggc    4680
aggagcctgg agctcaaggg tcagggcaac cccgtggaac tgataacaaa agctcgtctt    4740
tttctgctgc agttaatacc tcggtgcccg aaaaagagct tctcacacgt ggcagagctg    4800
ctggctgatc gtgggactg cgacccagag gtgagcgccg ccctccagag cagacagcag    4860
gctgcccctg acgctgacct gtcccaggag cctcatctct tctgatgaga attcgatatc    4920
aagcttatcg ataccgtcga atccccggg ctgcaggaat tcgagcatct taccgccatt    4980
tattcccata tttgttctgt ttttcttgat ttgggtatac atttaaatgt taataaaaca    5040
aaatggtggg gcaatcattt acattttag ggatatgtaa ttactagttc aggtgtattg    5100
ccacaagaca aacatgttaa gaaacttttcc cgttatttac gctctgttcc tgttaatcaa    5160
cctctggatt acaaaatttg tgaaagattg actgatattc ttaactatgt tgctcctttt    5220
acgctgtgtg gatatgctgc tttaatgcct ctgtatcatg ctattgcttc ccgtacggct    5280
ttcgttttct cctccttgta taaatcctgg ttgctgtctc tttatgagga gttgtggccc    5340
gttgtccgtc aacgtggcgt ggtgtgctct gtgtttgctg acgcaacccc cactggctgg    5400
ggcattgcca ccacctgtca actcctttct gggactttcg ctttccccct cccgatcgcc    5460
acggcagaac tcatcgccgc ctgccttgcc cgctgctgga caggggctag gttgctgggc    5520
actgataatt ccgtggtgtt gtcggggaag ggcc                                5554
```

<210> SEQ ID NO 26
<211> LENGTH: 858
<212> TYPE: DNA
<213> ORGANISM: Artificial Sequence
<220> FEATURE:

<223> OTHER INFORMATION: Recombinant Rev response element

<400> SEQUENCE: 26

| | |
|---|---|
| gatcttcaga cctggaggag gagatatgag ggacaattgg agaagtgaat tatataaata | 60 |
| taaagtagta aaaattgaac cattaggagt agcacccacc aaggcaaaga gaagagtggt | 120 |
| gcagagagaa aaaagagcag tgggaatagg agctttgttc cttgggttct ggggagcagc | 180 |
| aggaagcact atgggcgcag cgtcaatgac gctgacggta caggccagac aattattgtc | 240 |
| tggtatagtg cagcagcaga acaatttgct gagggctatt gaggcgcaac agcatctgtt | 300 |
| gcaactcaca gtctggggca tcaagcagct ccaggcaaga atcctggctg tggaaagata | 360 |
| cctaaaggat caacagctcc tggggatttg gggttgctct ggaaaactca tttgcaccac | 420 |
| tgctgtgcct tggaatgcta gttggagtaa taaatctctg gaacagattt ggaatcacac | 480 |
| gacctggatg gagtgggaca gagaaattaa caattacaca gcttaatac actccttaat | 540 |
| tgaagaatcg caaaaccagc aagaaaagaa tgaacaagaa ttattggaat tagataaatg | 600 |
| ggcaagtttg tggaattggt ttaacataac aaattggctg tggtatataa aattattcat | 660 |
| aatgatagta ggaggcttgg taggtttaag aatagttttt gctgtacttt ctatagtgaa | 720 |
| tagagttagg cagggatatt caccattatc gtttcagacc cacctcccaa ccccgagggg | 780 |
| acccgacagg cccgaaggaa tagaagaaga aggtggagag agagacagag acagatccat | 840 |
| tcgattagtg aacggatc | 858 |

<210> SEQ ID NO 27
<211> LENGTH: 44
<212> TYPE: DNA
<213> ORGANISM: Artificial Sequence
<220> FEATURE:
<223> OTHER INFORMATION: Recombinant packaging signal sequence

<400> SEQUENCE: 27

| | |
|---|---|
| tgagtacgcc aaaaattttg actagcggag gctagaagga gaga | 44 |

<210> SEQ ID NO 28
<211> LENGTH: 188
<212> TYPE: DNA
<213> ORGANISM: Artificial Sequence
<220> FEATURE:
<223> OTHER INFORMATION: Recombinant truncated HIV-1 5 prime LTR
      sequence

<400> SEQUENCE: 28

| | |
|---|---|
| gtctctctgg ttagaccaga tctgagcctg ggagctctct ggctaactag ggaacccact | 60 |
| gcttaagcct caataaagct tgccttgagt gcttcaagta gtgtgtgccc gtctgttgtg | 120 |
| tgactctggt aactagagat ccctcagacc cttttagtca gtgtggaaaa tctctagcag | 180 |
| tggcgccc | 188 |

<210> SEQ ID NO 29
<211> LENGTH: 234
<212> TYPE: DNA
<213> ORGANISM: Artificial Sequence
<220> FEATURE:
<223> OTHER INFORMATION: Recombinant HIV-1 self-inactivating 3 prime LTR
      sequence

<400> SEQUENCE: 29

| | |
|---|---|
| tggaagggct aattcactcc caacgaagac aagatctgct ttttgcttgt actgggtctc | 60 |
| tctggttaga ccagatctga gcctgggagc tctctggcta actagggaac ccactgctta | 120 | agcctcaata aagcttgcct tgagtgcttc aagtagtgtg tgcccgtctg ttgtgtgact      180 ctggtaacta gagatccctc agacccttt agtcagtgtg gaaaatctct agca            234

<210> SEQ ID NO 30
<211> LENGTH: 577
<212> TYPE: DNA
<213> ORGANISM: Artificial Sequence
<220> FEATURE:
<223> OTHER INFORMATION: Recombinant human cytomegalovirus immediate
      early promoter sequence

<400> SEQUENCE: 30
acattgatta ttgactagtt attaatagta atcaattacg gggtcattag ttcatagccc      60
atatatggag ttccgcgtta cataacttac ggtaaatggc ccgcctggct gaccgcccaa     120
cgacccccgc ccattgacgt caataatgac gtatgttccc atagtaacgc caatagggac     180
tttccattga cgtcaatggg tggagtattt acggtaaact gcccacttgg cagtacatca     240
agtgtatcat atgccaagta cgccccctat tgacgtcaat gacggtaaat ggcccgcctg     300
gcattatgcc cagtacatga ccttatggga ctttcctact tggcagtaca tctacgtatt     360
agtcatcgct attaccatgg tgatgcggtt ttggcagtac atcaatgggc gtggatagcg     420
gtttgactca cggggatttc caagtctcca ccccattgac gtcaatggga gtttgttttg     480
gcaccaaaat caacgggact ttccaaaatg tcgtaacaac tccgcccat tgacgcaaat     540 gggcggtagg cgtgtacggt gggaggtcta tataagc                              577

<210> SEQ ID NO 31
<211> LENGTH: 233
<212> TYPE: DNA
<213> ORGANISM: Artificial Sequence
<220> FEATURE:
<223> OTHER INFORMATION: Recombinant Rous sarcoma virus promoter
      sequence

<400> SEQUENCE: 31
ttaatgtagt cttatgcaat actcttgtag tcttgcaaca tggtaacgat gagttagcaa      60
catgccttac aaggagagaa aaagcaccgt gcatgccgat tggtggaagt aaggtggtac     120
gatcgtgcct tattaggaag gcaacagacg ggtctgacat ggattggacg aaccactgaa     180
ttgccgcatt gcagagatat tgtatttaag tgcctagctc gatacaataa acg            233

<210> SEQ ID NO 32
<211> LENGTH: 16
<212> TYPE: DNA
<213> ORGANISM: Artificial Sequence
<220> FEATURE:
<223> OTHER INFORMATION: Recombinant HIV-1 central polypurine tract and
      central termination sequence

<400> SEQUENCE: 32
aaaagaaaag ggggga                                                      16

<210> SEQ ID NO 33
<211> LENGTH: 121
<212> TYPE: DNA
<213> ORGANISM: Artificial Sequence
<220> FEATURE:
<223> OTHER INFORMATION: Recombinant HIV-1 central polypurine tract and
      central termination sequence

<400> SEQUENCE: 33

| | |
|---|---|
| ttgggggta cagtgcaggg gaaagaatag tagacataat agcaacagac atacaaacta | 60 |
| aagaattaca aaacaaatt acaaaaattc aaaattttat cgatcacgag actagcctcg | 120 |
| a | 121 |

<210> SEQ ID NO 34
<211> LENGTH: 156
<212> TYPE: DNA
<213> ORGANISM: Artificial Sequence
<220> FEATURE:
<223> OTHER INFORMATION: Recombinant Simian virus 40 origin of
      replication sequence

<400> SEQUENCE: 34

| | |
|---|---|
| ggcctccaaa aaagcctcct cactacttct ggaatagctc agaggccgag gcggcctcgg | 60 |
| cctctgcata ataaaaaaaa attagtcagc catgggcgg agaatgggcg gaactgggcg | 120 |
| gagttagggg cgggatgggc ggagttaggg gcggga | 156 |

<210> SEQ ID NO 35
<211> LENGTH: 141
<212> TYPE: DNA
<213> ORGANISM: Artificial Sequence
<220> FEATURE:
<223> OTHER INFORMATION: Recombinant RNA-OUT sequence

<400> SEQUENCE: 35

| | |
|---|---|
| gtagaattgg taaagagagt cgtgtaaaat atcgagttcg cacatcttgt tgtctgatta | 60 |
| ttgattttg gcgaaaccat ttgatcatat gacaagatgt gtatctacct taacttaatg | 120 |
| attttgataa aaatcattag g | 141 |

<210> SEQ ID NO 36
<211> LENGTH: 4371
<212> TYPE: DNA
<213> ORGANISM: Artificial Sequence
<220> FEATURE:
<223> OTHER INFORMATION: Codon optimized FANCA sequence

<400> SEQUENCE: 36

| | |
|---|---|
| atgtccgact cgtgggtccc gaactccgcc tcgggccagg acccaggggg ccgccggagg | 60 |
| gcctgggccg agctgctggc gggaagggtc aagagggaaa aatataatcc tgaaagggca | 120 |
| cagaaattaa aggaatcagc tgtgcgcctc ctgcgaagcc atcaggacct gaatgccctt | 180 |
| ttgcttgagg tagaaggtcc actgtgtaaa aaattgtctc tcagcaaagt gattgactgt | 240 |
| gacagttctg aggcctatgc taatcattct agttcattta taggctctgc tttgcaggat | 300 |
| caagcctcaa ggctggggt tcccgtgggt attctctcag ccgggatggt tgcctctagc | 360 |
| gtgggacaga tctgcacggc tccagcgag accagtcacc ctgtgctgct gactgtggag | 420 |
| cagagaaaga agctgtcttc cctgttagag tttgctcagt atttattggc acacagtatg | 480 |
| ttctcccgtc tttccttctg tcaagaatta tggaaaatac agttctttt gttgcttgaa | 540 |
| gcggtgtggc atcttcacgt acaaggcatt gtgagcctgc aagagctgct ggaaagccat | 600 |
| cccgacatgc atgctgtggg atcgtggctc ttcaggaatc tgtgctgcct ttgtgaacag | 660 |
| atggaagcat cctgccagca tgctgacgtc gccagggcca tgcttttctga ttttgttcaa | 720 |
| atgtttgttt tgaggggatt tcagaaaaac tcagatctga agaactgt ggagcctgaa | 780 |
| aaatgccgc aggtcacggt tgatgtactg cagagaatgc tgattttgc acttgacgct | 840 |
| ttggctgctg gagtacagga ggagtcctcc actcacaaga tcgtgaggtg ctggttcgga | 900 |

```
gtgttcagtg gacacacgct tggcagtgta atttccacag atcctctgaa gaggttcttc    960
agtcatacccc tgactcagat actcactcac agccctgtgc tgaaagcatc tgatgctgtt   1020
cagatgcaga gagagtggag cttttgcgcgg acacaccctc tgctcacctc actgtaccgc   1080
aggctctttg tgatgctgag tgcagaggag ttggttggcc atttgcaaga agttctggaa    1140
acgcaggagg ttcactggca gagagtgctc tcctttgtgt ctgccctggt tgtctgcttt    1200
ccagaagcgc agcagctgct tgaagactgg gtggcgcgtt tgatgggcca ggcattcgag    1260
agctgccagc tggacagcat ggtcactgcg ttcctggttg tgcgccaggc agcactggag    1320
ggcccctctg cgttcctgtc atatgcagac tggttcaagg cctcctttgg gagcacacga    1380
ggctaccatg gctgcagcaa aaggccctg gtcttcctgt ttacgttctt gtcagaactc     1440
gtgccttttg agtctcccg gtacctgcag gtgcacattc tccacccacc cctggttccc     1500
agcaagtacc gctccctcct cacagactac atctcattgg ccaagacacg gctggccgac    1560
ctcaaggttt ctatagaaaa catgggactc tacgaggatt tgtcatcagc tgggacatt     1620
actgagcccc acagccaagc tcttcaggat gttgaaaagg ccatcatggt gtttgagcat    1680
acggggaaca tcccagtcac cgtcatggag gccagcatat tcaggaggcc ttactacgtg    1740
tcccacttcc tccccgccct gctcacacct cgagtgctcc ccaaagtccc tgactcccgt    1800
gtggcgttta tagagtctct gaagagagca gataaaatcc cccatctct gtactccacc     1860
tactgccagg cctgctctgc tgctgaagag aagccagaag atgcagccct gggagtgagg    1920
gcagaaccca actctgctga ggagcccctg gacagctca cagctgcact gggagagctg     1980
agagcctcca tgacagaccc cagccagcgt gatgttatat cggcacaggt ggcagtgatt    2040
tctgaaagac tgagggctgt cctgggccac aatgaggatg acagcagcgt tgagatatca    2100
aagattcagc tcagcatcaa cacgccgaga ctggagccac gggaacacat tgctgtggac    2160
ctcctgctga cgtctttctg tcagaacctg atggctgcct ccagtgtcgc tccccggag    2220
aggcagggtc cctgggctgc cctcttcgtg aggaccatgt gtggacgtgt gctccctgca    2280
gtgctcaccc ggctctgcca gctgctccgt caccagggcc cgagcctgag tgccccacat    2340
gtgctggggt tggctgccct ggccgtgcac ctgggtgagt ccaggtctgc gctcccagag    2400
gtggatgtgg gtcctcctgc acctggtgct ggccttcctg tccctgcgct ctttgacagc    2460
ctcctgacct gtaggacgag ggattccttg ttcttctgcc tgaaattttg tacagcagca    2520
atttcttact ctctctgcaa gttttcttcc cagtcacgag atactttgtg cagctgctta    2580
tctccaggcc ttattaaaaa gtttcagttc tcatgttca gattgttctc agaggcccga     2640
cagcctcttt ctgaggagga cgtagccagc cttttcctgga gacccttgca ccttccttct   2700
gcagactggc agagagctgc cctctctctc tggacacaca gaaccttccg agaggtgttg    2760
aaagaggaag atgttcactt aacttaccaa gactggttac acctggagct ggaaattcaa    2820
cctgaagctg atgctctttc agatactgaa cggcaggact tccaccagtg ggcgatccat    2880
gagcactttc tccctgagtc ctcggcttca gggggctgtg acggagacct gcaggctgcg    2940
tgtaccattc ttgtcaacgc actgatggat ttccaccaaa gctcaaggag ttatgaccac    3000
tcagaaaatt ctgatttggt ctttggtggc cgcacaggaa atgaggatat tatttccaga    3060
ttgcaggaga tggtagctga cctggagctg cagcaagacc tcatagtgcc tctcggccac    3120
acccccttccc aggagcactt cctctttgag attttccgca gacggctcca ggctctgaca    3180
agcgggtgga gcgtggctgc cagccttcag agacagaggg agctgctaat gtacaaacgg    3240
atcctcctcc gcctgccttc gtctgtcctc tgcggcagca gcttccaggc agaacagccc    3300
```

```
atcactgcca gatgcgagca gttcttccac ttggtcaact ctgagatgag aaacttctgc    3360
tcccacggag gtgccctgac acaggacatc actgcccact tcttcagggg cctcctgaac    3420
gcctgtctgc ggagcagaga cccctccctg atggtcgact tcatactggc caagtgccag    3480
acgaaatgcc ccttaatttt gacctctgct ctggtgtggt ggccgagcct ggagcctgtg    3540
ctgctctgcc ggtggaggag acactgccag agcccgctgc cccgggaact gcagaagcta    3600
caagaaggcc ggcagtttgc cagcgatttc ctctcccctg aggctgcctc cccagcaccc    3660
aacccggact ggctctcagc tgctgcactg cactttgcga ttcaacaagt cagggaagaa    3720
aacatcagga agcagctaaa gaagctggac tgcgagagag aggagctatt ggttttcctt    3780
ttcttcttct ccttgatggg cctgctgtcg tcacatctga cctcaaatag caccacagac    3840
ctgccaaagg ctttccacgt ttgtgcagca atcctcgagt gtttagagaa gaggaagata    3900
tcctggctgg cactctttca gttgacagag agtgacctca ggctggggcg ctcctcctc    3960 cgtgtggccc cggatcagca caccaggctg ctgccttcg cttttacag tcttctctcc    4020 tacttccatg aagacgcggc catcagggaa gaggccttcc tgcatgttgc tgtggacatg    4080
tacttgaagc tggtccagct cttcgtggct ggggatacaa gcacagtttc acctccagct    4140
ggcaggagcc tggagctcaa gggtcagggc aaccccgtgg aactgataac aaaagctcgt    4200 cttttctgc tgcagttaat acctcggtgc ccgaaaaaga gcttctcaca cgtggcagag    4260
ctgctggctg atcgtgggga ctgcgaccca gaggtgagcg ccgccctcca gagcagacag    4320
caggctgccc ctgacgctga cctgtcccag gagcctcatc tcttctgatg a              4371
```

<210> SEQ ID NO 37
<211> LENGTH: 1015
<212> TYPE: DNA
<213> ORGANISM: Artificial Sequence
<220> FEATURE:
<223> OTHER INFORMATION: Recombinant high copy number ColE1, pMB1,
      pBR322, pUC origin of replication sequence

<400> SEQUENCE: 37

```
ggagtcaggc aactatggat gaacgaaata gacagatcgc tgagataggt gcctcactga      60
ttaagcattg gtaactgtca gaccaagttt actcatatat actttagatt gatttaaaac     120 ttcatttta atttaaaagg atctaggtga agatcctttt tgataatctc atgaccaaaa     180
tcccttaacg tgagttttcg ttccactgag cgtcagaccc cgtagaaaag atcaaaggat     240
cttcttgaga tccttttttt ctgcgcgtaa tctgctgctt gcaaacaaaa aaaccaccgc     300
taccagcggt ggtttgtttg ccggatcaag agctaccaac tcttttccg aaggtaactg     360 gcttcagcag agcgcagata ccaaatactg ttcttctagt gtagccgtag ttaggccacc     420
acttcaagaa ctctgtagca ccgcctacat acctcgctct gctaatcctg ttaccagtgg     480
ctgctgccag tggcgataag tcgtgtctta ccgggttgga ctcaagacga tagttaccgg     540
ataaggcgca gcggtcgggc tgaacggggg gttcgtgcac acagcccagc ttggagcgaa     600
cgacctacac cgaactgaga tacctacagc gtgagctatg agaaagcgcc acgcttcccg     660
aagggagaaa ggcggacagg tatccggtaa gcggcagggt cggaacagga gagcgcacga     720
gggagcttcc aggggggaaac gcctggtatc tttatagtcc tgtcgggttt cgccacctct     780
gacttgagcg tcgatttttg tgatgctcgt caggggggcg gagcctatgg aaaaacgcca     840
```

```
gcaacgcggc cttttttacgg ttcctggcct tttgctggcc ttttgctcac atgttctttc    900
ctgcgttatc ccctgattct gtggataacc gtattaccgc ctttgagtga gctgataccg    960
ctcgccgcag ccgaacgacc gagcgcagcg agtcagtgag cgaggaagcg gaaga         1015
```

COMPOSITIONS AND METHODS FOR STEM CELL TRANSPLANT

CROSS-REFERENCE TO RELATED APPLICATIONS

This application is a National Stage application under 35 U.S.C. § 371 of International Application No. PCT/US2019/027083, filed Apr. 11, 2019, which claims priority to U.S. Provisional Application No. 62/656,292, filed on Apr. 11, 2018, which is incorporated by reference herein in its entirety.

FIELD OF THE INVENTION

The present invention relates generally to methods of preparing populations of hematopoietic cells comprising gene-modified hematopoietic stem cells (HSC) for use in HSC transplant, including for the treatment of Fanconi anemia (FA).

DESCRIPTION OF THE TEXT FILE SUBMITTED ELECTRONICALLY

The contents of the text file submitted electronically herewith are incorporated herein by reference in their entirety: A computer readable format copy of the Sequence Listing (filename: ROPA_008_01WO_SeqList ST25, date recorded: Apr. 11, 2019, file size ~52 kilobytes).

BACKGROUND OF THE INVENTION

Ex vivo mediated gene transfer into target cells is a clinically applied method for cell and gene therapy. The isolation and ex vivo genetic modification of HSC containing CD34-enriched populations provides two major benefits: reduction of gene transfer to non-target cells; and, thereby, reducing the need/amount of genetic modifiers, e.g., gene therapy vectors, which in turn reduces costs associated with clinical production of gene-modified HSCs. A model system for transplant of genetically modified HSCs is FA. Methods developed in the context of FA are also applicable to other disorders and conditions.

FA is an autosomal recessive disease (except for complementation group FA-B, which is X-linked), where the median survival of patients is around 24 years (Butturini A, et al. (1994) Blood 84:1650-1655; Kutler D I, et al. (2003) Blood 101:1249-1256). At birth, the blood count of these patients is generally normal. Macrocytosis is often the first hematological abnormality detected in these patients. This usually evolves with thrombocytopenia, anemia and pancytopenia. Bone marrow failure (BMF) is usually observed in these patients after 5-10 years, with an average age of hematologic disease onset of 7 years. About 80% of patients with FA will develop evidence of BMF in the first decade of life. Based on epidemiological studies to date, if malignant episodes do not appear before aplasia, virtually all patients with FA will develop BMF by 40 years of age (Butturini A, et al. (1994) Blood 84:1650-1655; Kutler D I, et al. (2003) Blood 101:1249-1256), this being the leading cause of mortality in these patients. Due to the complex clinical manifestations of FA, management of these patients is mainly focused on improving the following clinical manifestations: bone marrow failure (BMF), myeloid leukemia, and solid tumors.

Treatment of FA and other diseases relies on efficient engraftment of genetically modified HSCs. Accordingly, there is a need in the art for methods of preparing cell populations containing gene-modified HSCs that achieve high levels of engraftment in patients, including FA patients. The present invention addresses this need and more.

SUMMARY OF THE INVENTION

The present invention relates generally to the fields of hematological malignancy and stem-cell transplant, and in particular, to manufacture and use of stem cell populations enriched for $CD34^+$ cells for use in gene therapy, including both gene delivery and gene repair. In particular, these CD34-enriched cell populations are useful in gene therapy for the treatment of mammalian, and in particular, human diseases, disorders, and dysfunctions related to Fanconi anemia complementation group A (FANCA), group C (FANCC), or group G (FANCG) gene product dysregulation. In certain embodiments, the methods of the present disclosure are performed ex vivo and not on the human body per se.

In one embodiment, the disclosure provides a method of treating Fanconi anemia in a subject in need thereof, comprising providing to the subject a combination of: (i) a high-stringency CD34-enriched cell population prepared from a first biological sample obtained from the subject by selecting for $CD34^+$ cells under high stringency conditions; and (ii) a low-stringency CD34-enriched cell population prepared from a second biological sample obtained from the subject by selecting for $CD34^+$ cells under low stringency conditions, wherein one or both of the high-stringency CD34-enriched cell population and/or the low-stringency CD34-enriched cell population has been transduced with a recombinant gene therapy vector encoding a FANC polypeptide, including functional variants or fragments or naturally-occurring FANC proteins (e.g., FANCA or FANCC or FANCG), and wherein the first biological sample and the second biological sample are optionally the same biological sample, thereby treating Fanoni anemia.

In one embodiment, the method comprises treating Fanconi anemia in a subject by preparing a CD34-enriched cell population under high-stringency conditions, preparing another CD34-enriched cell population under low-stringency conditions, contacting one or both of the CD34-enriched cell populations with a recombinant gene therapy vector, and administering the two CD34-enriched cell populations, sequentially or simultaneously, to the subject, thereby treating Fanconi anemia. In particular embodiments, the cell population(s) contacted with the gene therapy vector are transduced as a result, and thus comprise a polynucleotide encoding a therapeutic nucleic acid or polypeptide for the treatment of Fanconi anemia. In an embodiment, the recombinant gene therapy vector comprises a self-inactivated lentiviral vector encoding a therapeutic FANC (e.g., FANCA or FANCC or FANCG) gene segment or protein, such as the vector described in International Patent Application No. PCT/US2017/050837. In an embodiment, the recombinant gene therapy vector is configured to repair an endogenous FANC gene (e.g., FANCA or FANCC or FANCG), such as by delivering a CRISPR/Cas system comprising a Cas protein or nucleic acid encoding a Cas protein, a gRNA or sgRNA, and a repair template comprising a FANC gene or a fragment of a FANC gene that overlaps one or more mutations to the endogenous FANC gene.

In an embodiment, the present disclosure provides, a method for treating Fanconi anemia in a subject in need thereof, comprising: preparing a high-stringency CD34- enriched cell population from a first biological sample obtained from the subject by selecting for CD34+ cells under high stringency conditions; preparing a low-stringency CD34-enriched cell population from a second biological sample obtained from the subject by selecting for CD34+ cells under low stringency conditions, contacting one or both of the high-stringency CD34-enriched cell population or the low-stringency CD34-enriched cell population with a recombinant gene therapy vector for Fanconi anemia; and administering the high-stringency CD34-enriched cell population and the low-stringency CD34-enriched cell population to the subject, wherein one or both of the high-stringency CD34-enriched cell population or the low-stringency CD34-enriched cell population is contacted with or transduced by the recombinant gene therapy vector; thereby treating Fanconi anemia.

In one aspect of the present invention, the first biological sample and the second biological sample are each independently peripheral blood or bone marrow. In one aspect, the first biological sample and the second biological sample are peripheral blood obtained after the subject has been treated with granulocyte macrophage colony-stimulating factor (G-CSF), plerixafor, or a combination of G-CSF and plerixafor.

In an embodiment, any of the methods further comprises selecting for CD34+ cells under high stringency conditions, which may comprise applying the first biological sample to a capture matrix that binds CD34+ cells, washing the capture matrix one or more times using a wash buffer, and eluting the high-stringency CD34-enriched cell population from the capture matrix using an elution buffer. In an embodiment, the applying step is performed at 5-10 mL/min, 5-15 mL/min, 15-20 mL/min, 20-25 mL/min, or 25-30 mL/min. In an embodiment, the eluting step is performed at 5-10 mL/min, 5-15 mL/min, 15-20 mL/min, 20-25 mL/min, or 25-30 mL/min. In an embodiment, the applying step is performed at 10-20 mL/min. In an embodiment, the eluting step is performed at 20 mL/min.

In an embodiment, any of the methods further comprises selecting for CD34+ cells under low stringency conditions, which may comprise applying the second biological sample to a capture matrix that binds CD34+ cells, allowing an unbound fraction of the second biological sample to flow through the capture matrix, and eluting the low-stringency CD34-enriched cell population from the capture matrix using an elution buffer. In an embodiment, the applying step is performed at 5-10 mL/min, 5-15 mL/min, 15-20 mL/min, 20-25 mL/min, or 25-30 mL/min. In an embodiment, the eluting step is performed at 5-10 mL/min, 5-15 mL/min, 15-20 mL/min, 20-25 mL/min, or 25-30 mL/min. In an embodiment, the applying step is performed at 10-20 mL/min. In an embodiment, the eluting step is performed at 20 mL/min.

In one aspect of the present invention, the high-stringency CD34-enriched cell population and/or the low-stringency CD34-enriched cell population is contacted with the recombinant gene therapy vector. In some embodiments, the percentage of CD34+ cells in the high-stringency CD34-enriched cell population is between two and four times greater than the percentage of CD34+ cells in the low-stringency CD34-enriched cell population. In an embodiment, the percentage of CD34+ cells in the high-stringency CD34-enriched cell population is greater than or about 60%, and the percentage of CD34+ cells in the low-stringency CD34-enriched cell population is less than 60% or 15-60% or between 15-30%. In an embodiment, the percentage of CD34+ cells in the high-stringency CD34-enriched cell population is greater than or about 70%, and the percentage of CD34+ cells in the low-stringency CD34-enriched cell population is 17.5-35%. In an embodiment, the percentage of CD34+ cells in the high-stringency CD34-enriched cell population is greater than or about 80%, and the percentage of CD34+ cells in the low-stringency CD34-enriched cell population is less than 40% or 20-40%. In an embodiment, the percentage of CD34+ cells in the high-stringency CD34-enriched cell population is greater than or about 90%, and the percentage of CD34+ cells in the low-stringency CD34-enriched cell population is less than 40% or 22.5-40%.

In an embodiment of the present invention, the recombinant gene therapy vector for treatment of Fanconi anemia comprises a polynucleotide sequence comprising in the following 5' to 3' order: (a) a eukaryotically active promoter sequence; and (b) a sequence encoding a human FANC gene or polypeptide, including functional fragments and variants thereof, wherein the sequence encoding the human FANC gene or polypeptide or functional fragment or variant thereof is operably linked to the eukaryotically active promoter sequence; and wherein the FANC gene or polypeptide is selected from FANCA, FANCC, and FANCG, e.g., native human FANCA, FANCC, and FANCG or functional fragments or variants thereof. In certain embodiments, a functional fragment or functional variant of a native FANC protein has substantially similar biological activity as the native FANC protein.

In an embodiment of the present invention, the recombinant gene therapy vector for Fanconi anemia comprises a gene editing system capable of directed repair of an endogenous FANC gene, wherein the gene editing system comprises: a Cas protein or a polynucleotide encoding a Cas protein; a gRNA; and a repair template comprising a sequence comprising the FANC gene or a fragment thereof that overlaps one or more mutations in the endogenous FANC gene; wherein the sgRNA is configured to guide the repair template to the FANC gene; and wherein the FANC gene is selected from FANCA, FANCC, and FANCG.

In an embodiment, the selection methods are performed by bead-based magnetic selection.

In an embodiment, the methods disclosed herein further comprises performing apheresis on the peripheral blood one or more times.

In one aspect, the methods disclosed herein result in progressive increase in gene-modified Fanconi Anemia cells over time.

In one aspect, the treatment methods disclosed herein inhibit the development of, halt progression of, and/or reverse progression of a hematological manifestation of Fanconi anemia in the subject, for example, without limitation, one or more of bone marrow failure, thrombocytopenia, leukopenia, pancytopenia, neutropenia, and anemia.

In one aspect, the methods disclosed herein result in recovery of one or more hematopoietic lineages that had declined in the subject prior to administration of the high-stringency CD34-enriched cell population and the low-stringency CD34-enriched cell population to the subject, for example, without limitation, one or more of lymphocytes, eosinophils, neutrophils, red blood cells, and platelets. In particular embodiments, the methods result in a slowing of or reduction in the decline of one or more hematopoietic lineages, or a stabilization in the populations of one or more hematopoietic lineages, e.g., one or more of lymphocytes, eosinophils, neutrophils, red blood cells, and platelets.

In one aspect, the method results in stabilization or recovery of one or more hematological parameters that had declined in the subject prior to administration of the high-stringency CD34-enriched cell population and the low-stringency CD34-enriched cell population to the subject, such as hemoglobin.

In an embodiment, the present disclosure provides a method for preparing genetically modified cells for the treatment of Fanconi anemia, comprising: preparing a high-stringency CD34-enriched cell population from a first biological sample obtained from a subject by selecting for CD34$^+$ cells under high stringency conditions; preparing a low-stringency CD34-enriched cell population from a second biological sample obtained from a subject by selecting for CD34+ cells under low stringency conditions; and contacting one or both of the high-stringency CD34-enriched cell population or the low-stringency CD34-enriched cell population with a recombinant gene therapy vector for Fanconi anemia. In certain embodiments, the cell population(s) contacted with the gene therapy vector are transduced by the gene therapy vector, resulting in the cell populations comprising transduced cells comprising a nucleotide sequence encoding a therapeutic nucleic acid or polypeptide, e.g., a FANC polypeptide, which may be a wild type or native FANC polypeptide, or a functional fragment or variant thereof.

In one aspect, the selection of either or both low-stringency and high-stringency CD34-enriched cell populations is performed using antibodies or functional fragments thereof that specifically bind to CD34. In one aspect, selection is performed using a flow rate of 10-20 mL/min.

In an embodiment, the present invention provides a system comprising: a high-stringency CD34-enriched cell population prepared from a first biological sample by selecting for CD34$^+$ cells under high stringency conditions; and a low-stringency CD34-enriched cell population prepared from a second biological sample by selecting for CD34+ cells under low stringency conditions, wherein one or both of the high-stringency CD34-enriched cell population or the low-stringency CD34-enriched cell population is contacted with or has been transduced by a recombinant gene therapy vector for Fanconi anemia. In certain embodiments, the high-stringency CD34-enriched cell population is present in a first pharmaceutical composition comprising one or more pharmaceutically acceptable carriers, diluents, or excipients, and the low-stringency CD34-enriched cell population is present in a second pharmaceutical composition comprising one or more pharmaceutically acceptable carriers, diluents, or excipients. In some embodiment, both the high-stringency CD34-enriched cell population and the low-stringency CD34-enriched cell population are present in the same pharmaceutical composition comprising one or more pharmaceutically acceptable carriers, diluents, or excipients. In certain embodiments, both the high-stringency CD34-enriched cell population and the low-stringency CD34-enriched cell population have been transduced by the gene therapy vector for treatment of Fanconi anemia. In certain embodiments, the gene therapy vector and/or the transduced cells comprise a nucleotide sequence encoding a therapeutic nucleic acid or polypeptide, e.g., a FANC polypeptide, which may be a wild type or native FANC polypeptide, or a functional fragment or variant thereof In another embodiment, the present invention provides a pharmaceutical composition comprising: a high-stringency CD34-enriched cell population prepared from a first biological sample by selecting for CD34$^+$ cells under high stringency conditions; and a low-stringency CD34-enriched cell population prepared from a second biological sample by selecting for CD34+ cells under low stringency conditions, wherein one or both of the high-stringency CD34-enriched cell population or the low-stringency CD34-enriched cell population have been transduced with a recombinant gene therapy vector. In particular embodiments, the gene therapy vector is a lentivirus. In certain embodiments, the gene therapy vector encodes a therapeutic FANC (e.g., FANCA or FANCC or FANCG) gene segment or protein, or a functional variant or fragment thereof. The pharmaceutical composition may comprise one or more pharmaceutically acceptable excipients, diluents, or carriers.

Other features and advantages of the invention will be apparent from and encompassed by the following detailed description and claims.

BRIEF DESCRIPTION OF THE DRAWINGS

FIG. 1 shows a map of an illustrative recombinant gene therapy plasmid vector, pCCL-PGK-FANCAW-82-RO.

DETAILED DESCRIPTION

Fanconi anemia (FA) presents several unique challenges for drug product manufacturing. For FA, as with other ex vivo gene therapy applications, the target cell population for gene transfer expresses the CD34 cell surface protein. For FA patients, when CD34+ cells are analyzed by flow cytometry, a lower proportion of BM cells are CD34+ relative to healthy individuals, 0.1-1.5% compared to 1-3%, respectively. Lower absolute CD34+ cells from drug substance manufacture from FA patient's mPB starting material was not surprising given the well-established characteristic of limited CD34+ cells in FA patients that decline with age. However, lower CD34+ yields and poor purity from FA patients were concerning, because this directly impacts the potential efficacy of the manufactured drug product.

Under standard CD34+ cell enrichment, a low percentage of CD34+ cells (relative to total cells) are bound by immunomagnetic beads; therefore, the column is loaded relatively rapidly (mL/min) and washes are stringent, because purity is the primary goal. The present inventors recognized the problem that when using mPB from FA patients, this approach provides suboptimal results with low CD34 yield.

To address the limits of standard CD34+ cell enrichment protocol for FA patients, the present inventors developed new methods for preparing CD34+ cell populations from FA patients, which result in higher yield and effective drug product. These methods involve preparing two cell populations, one selected under standard CD34+ cell enrichment conditions ("high stringency" conditions) and the other selected under "low stringency" conditions. One or both of these two cell populations are transduced with a suitable gene therapy vector and administered to the FA patient. As shown herein, the new method displays advantageous therapeutic effects. Without being bound by theory, it is believed that either the higher number of CD34+ cells or presence of other cells or other factors present in preparations of cells with lower CD34+ cell purity contribute to the surprising efficacy of compositions prepared according to the methods disclosed herein.

Accordingly, the present disclosure provides systems and methods for manufacturing and using gene-modified or gene-corrected stem cells for gene therapy. In particular, herein provided are methods for treating a disease or disorder (e.g., Fanconi anemia) in which a subject's stem cells are selected by a combination of high-stringency CD34+ selection and low-stringency CD34+ selection, transduced with a vector encoding a therapeutic agent (e.g., a FANC protein), and administered to the subject. Unexpectedly, treatment with a combination of high stringency-selected CD34+ cells and low stringency-selected CD34+ cells transduced with the therapeutic vectors, which combined have a lower CD34+ cell purity than conventional high-stringency preparations, resulted in improved therapeutic efficacy.

Unless otherwise defined, all technical and scientific terms used herein have the same meaning as commonly understood by one of ordinary skill in the art to which this invention pertains. Although methods and materials similar or equivalent to those described herein can be used in the practice of the present invention, suitable methods and materials are described below. All publications, patent applications, patents, and other references mentioned herein are expressly incorporated by reference in their entirety. In cases of conflict, the present specification, including definitions, will control. In addition, the materials, methods, and examples described herein are illustrative only and are not intended to be limiting.

In one aspect, methods and systems are provided for the manufacture of high-stringency and low-stringency CD34-enriched cell populations (e.g., by bead-based magnetic selection with antibodies or functional fragments thereof that specifically bind to CD34) from biological samples under high-stringency conditions and/or under low-stringency conditions; and for the use of these CD34-enriched cell populations in the preparation of medicaments useful in targeted gene therapy of diseases, disorders, and dysfunctions in a mammal, and in humans in particular.

In another aspect, the present invention provides a HSC transplant regimen for treating Fanconia anemia and FANC gene product-related disorders based on administering high-stringency and low-stringency CD34-enriched cell populations where either or both CD34-enriched cell populations are contacted with either a gene therapy vector (e.g., transduced with a lentiviral vector harboring the FANCA, FANCC, or FANCG gene segment), or contacted with a gene therapy vector that induces site-specific repair of FANC genes (e.g. CRISP-Cas).

In some embodiments, the biological samples are peripheral blood or bone marrow obtained from a subject, e.g., the subject to be treated. In certain embodiments, the biological samples are peripheral blood obtained after the subject has been treated with G-CSF, plerixafor, or a combination of G-CSF and plerixafor. In an embodiment, one or both of the biological samples are prepared by performing apheresis on the peripheral blood one or more times. The present disclosure refers to these methods collectively as "mobilized leukopheresis."

In some embodiment, selecting for CD34$^+$ cells under high stringency conditions comprises applying a biological sample to a capture matrix that binds CD34$^+$ cells, washing the capture matrix one or more times using a wash buffer, and eluting the high-stringency CD34-enriched cell population from the capture matrix using an elution buffer. In some cases, the biological sample is re-applied to the capture matrix one or more times, such as 2, 3, 4, 5, or 6 times. In an embodiment, the applying step is performed at 5-10 mL/min, 5-15 mL/min, 15-20 mL/min, 20-25 mL/min, or 25-30 mL/min. In particular embodiments, the eluting step is performed at 5-10 mL/min, 5-15 mL/min, 15-20 mL/min, 25-25 mL/min, or 25-30 mL/min. In an embodiment, the applying step is performed at 10-20 mL/min. In an embodiment, the eluting step is performed at 20 mL/min. In some embodiments, the washing step comprises washing the capture matrix one or more times using a wash buffer. In some cases, the wash buffer comprises a volume of at least 100 mL, at least 200 mL, at least 300 mL, at least 400 mL, at least 500 mL or more. In an embodiment, the washing step is performed at 5-10 mL/min, 5-15 mL/min, 15-20 mL/min, 20-25 mL/min, or 25-30 mL/min. In an embodiment, the washing step is performed at 10-20 mL/min. In some embodiments the wash buffer is phosphate buffered saline (PBS) with, optionally, ethylenediaminetetraacetic acid (EDTA), and/or, optionally, human serum albumin at, for example, a concentration of about 2.5% w/v. In some embodiments the elution buffer is phosphate buffered saline (PBS) with, optionally, ethylenediaminetetraacetic acid (EDTA), and/or, optionally, human serum albumin at, for example, a concentration of about 2.5% w/v. In some embodiments, the wash buffer and the elution buffer are hypotonic.

In some embodiments, selecting for CD34$^+$ cells under low stringency conditions comprises applying a biological sample to a capture matrix that binds CD34$^+$ cells, allowing an unbound fraction of the biological sample to flow through the capture matrix, and eluting the low-stringency CD34-enriched cell population from the capture matrix using an elution buffer. In an embodiment, the applying step is performed at 1-2 mL/min, 2-3 mL/min, 1-2 mL/min, 1-2 mL/min, 5-10 mL/min, 5-15 mL/min, 15-20 mL/min. In an embodiment, the eluting step is performed at 5-10 mL/min, 5-15 mL/min, 15-20 mL/min, 25-25 mL/min, or 25-30 mL/min. In an embodiment, the applying step is performed at 10-20 mL/min. In some embodiments, the applying step is performed at an about 10%, about 20%, about 30%, about 40%, about 50%, about 60%, about 70%, about 80%, about 90% or lower flow rate than the flow rate under high stringency conditions, e.g., a flow rate at least 10% lower, at least 20% lower, at least 30% lower, at least 40% lower, at least 50% lower, at least 60% lower, at least 70% lower, at least 80% lower, or at least 90% lower than the flow rate used under high stringency conditions. In some embodiments, the washing step comprises washing the capture matrix one or more times using a wash buffer. In some cases, the wash buffer comprises a volume of 500 ml, 400 mL, 300 mL, 200 mL, 100 mL or less, e.g., less than 500 mL, less than 400 mL, less than 300 mL, less than 200 mL, or less than 100 mL. In some cases, the washing step is omitted. In an embodiment, the washing step is performed at 5-10 mL/min, 5-15 mL/min, 15-20 mL/min, 20-25 mL/min, or 25-30 mL/min. In an embodiment, the washing step is performed at 10-20 mL/min. In some embodiments the wash buffer is phosphate buffered saline (PBS) with, optionally, ethylenediaminetetraacetic acid (EDTA), and/or, optionally, human serum albumin at, for example, a concentration of about 2.5% w/v. In some embodiments the elution buffer is phosphate buffered saline (PBS) with, optionally, ethylenediaminetetraacetic acid (EDTA), and/or, optionally, human serum albumin at, for example, a concentration of about 2.5% w/v. In some embodiments, the wash buffer and the elution buffer are hypotonic.

In some embodiments, the selection is performed by bead-based magnetic selection. In an embodiment, antibodies or functional fragments thereof that specifically bind to CD34 are used for selection, e.g. bead-based magnetic selection. The selection is in some cases performed using a flow rate of 10-20 mL/min. In some cases, the flow rate is 1, 5, 10, 15, 20, 25, 30 or greater mL/min, or any value therebetween.

In embodiments, the high-stringency CD34-enriched cell population is contacted with the recombinant gene therapy vector; the low-stringency CD34-enriched cell population is contacted with the recombinant gene therapy vector; or both the high-stringency and low-stringency CD34-enriched cell populations are contacted with the recombinant gene therapy vector. In particular embodiments, the vector is a virus, a liposome, or a lipid or lipid-like nanoparticle. In some cases, the virus is a lentivirus, an adeno-associated virus, an adenovirus, or a foamy virus.

In some embodiments, the percentage of CD34+ cells in the high-stringency CD34-enriched cell population is between two and four times greater than the percentage of CD34+ cells in the low-stringency CD34-enriched cell population.

In embodiments of the methods or systems of the present invention, the recombinant gene therapy vector comprises a polynucleotide sequence comprising in the following 5' to 3' order: (a) a eukaryotically active promoter sequence, and (b) a sequence encoding a human FANC gene polypeptide or a functional fragment or variant thereof, and the sequence encoding the human FANC gene polypeptide or functional fragment or variant thereof is operably linked to the eukaryotically active promoter sequence. In some embodiments, the FANC gene is selected from FANCA, FANCC, and FANCG.

In an embodiment, the method inhibits the development of, halts progression of, and/or reverses progression of a hematological manifestation of a disease or disorder (e.g. Fanconi anemia) in the subject; and optionally, the hematological manifestation of Fanconi anemia is selected from one or more of bone marrow failure (BMF), thrombocytopenia, leukopenia, pancytopenia, neutropenia, and anemia. In an embodiment, the method results in progressive increase in gene-modified Franconia Anemia (or cells of a subject suffering from another disease or disorder, such as a myeloproliferative disorder or an immunodeficiency disorder) cells over time. In an embodiment, method results in recovery of one or more hematological parameters (e.g. hemoglobin) that had declined in the subject prior to administration of the high-stringency CD34-enriched cell population and the low-stringency CD34-enriched cell population to the subject.

In an embodiment, the method results in recovery of one or more hematopoietic lineages that had declined in the subject prior to administration of the high-stringency CD34-enriched cell population and the low-stringency CD34-enriched cell population to the subject; and this one or more hematopoietic lineages may comprise one or more of lymphocytes, eosinophils, neutrophils, red blood cells, and platelets. Recovery of specific cells populations is achieved in some cases. Recovery may be monitored by various methods known in the art, such as flow-assisted cell sorting, cytometry, or microscopy.

The present invention further provides compositions and systems for use in any of the embodiments of these methods. The present invention provides CD34-enriched cell populations for use in a medicament, including but not limited to CD34-enriched cell populations transduced with a gene therapy vector, e.g., a gene therapy vector comprising a polynucleotide sequence that encodes a human FANC protein, or a functional variant or fragment thereof.

As used herein, "high stringency" or "high stringency conditions" refers to a method of enriching for a cell population intended to result in substantial enrichment of cells for cells expressing a particular biological marker, e.g. CD34. For example, "high stringency" CD34 enrichment used clinically results in mean: 61.6% and median: 65.7% yield of CD34$^+$ cells and mean: 88.5% and median: 95.9% relative purity (N=166) (Clin Lab. 2016 Jul. 1; 62(7):1243-1248 (PMID: 28164638)). "High stringency" refers to a process with the goal of substantial enrichment of a relatively rare cell type, CD34+, which usually comprises between 0.2-2% of the cell product in a mobilized leukopheresis or bone marrow collection. High-stringency enrichment of CD34+ cells from a mobilized leukopheresis or bone marrow collection targets final CD34+ percentages that have increased from 0.2-2% to >80%. To accomplish this, following initial application of a biological sample to a capture matrix, repeated buffer exchanges, termed herein "washes," are carried out with the goal of removing cells weakly or non-specifically bound to the capture matrix. Generally, cells are removed from the capture matrix and reapplied for every wash cycle. Removal and reapplication can be accomplished manually by pipetting from tubes or automated using a pump and tubing system. For example, using Quad Technologies MagCloudz® coupled with Dynabeads® magnetic cell separation system, cell-magnetic particle complexes are separated in tubes on a magnetic stand and washes are done manually. Using the Miltenyi Biotec CliniMACS® System, a pre-set automated program applies the cell-magnetic particle complexes to a magnetic column in a tubing set and washes/reapplications are done using a valve pump system. In certain embodiments, selection under high stringency conditions may be performed on various instruments, including without limitation the Miltenyi Biotec MACSQuant Tyto®, Quad Technologies MagCloudz®, GE Sepax® Cell Separation System, Terumo Elutra® Cell Separation System, COBE Spectra® Cell Separator, SynGen LAB® or WASH® Systems, Fresenius-Kabi Lovo®, Miltenyi Biotec CliniMACS® System or CliniMACS Prodigy® System. Selection may be performed in a laboratory or at point-of-care. Detailed methods for preparation and enrichment of cells and cell populations, including exemplary methods for selection of CD34+ cells under high stringency conditions, are described, e.g., in Int'l Patent Pub. No. WO 2016/118780. Illustrative selection method useful for high-stringency selection are provided by U.S. Pat. No. 8,727,132.

In a high-stringency enrichment protocol, a biological sample comprising CD34+ cells is labeled with a CD34 labelling reagent, e.g. directly-conjugated immunomagnetic beads. The biological sample may be suspended in any suitable fluid, such as, without limitation, phosphate buffered saline (PBS) with, optionally, ethylenediaminetetraacetic acid (EDTA) at a buffer pH and isotonicity compatible with cell viability. In some cases, the fluid used also contain human serum albumin at a suitable concentration, such as about 2.5%. Using a magnetic activated cell sorting (MACS) technology, the biological sample, after having been labeled, is applied to a column, the column containing magnetically susceptible or ferromagnetic material. Using the MACS system, the magnetically susceptible or ferromagnetic material of the column retains the target cells without affecting the ability of non-target cells to flow through and exit the column. Such magnetically susceptible or ferromagnetic materials include iron, steel, cobalt nickel, and other ferromagnetic rare earth metals of alloys thereof. It will be appreciated by those skilled in the art that such materials may be readily magnetized and demagnetized. In some embodiments, the biological sample is recirculated over the magnetically susceptible or ferromagnetic material one or more times. Following column loading, bound cells are washed, eluted and/or re-loaded onto the column at slow speed to increase purity of the enriched fraction. Suitable wash buffers include PBS with (optionally) EDTA and (optionally) human serum albumin. Any component of the labeled biological sample which is removed during the wash steps is collected in the waste or "non-target" bag. After suitable wash steps, high-stringency enriched cells are eluted into the target cell bag.

As used herein, "low stringency" or "low-stringency conditions" refers to a method of enriching for a cell population intended to result in enrichment of cells for cells expressing a particular biological marker, e.g. CD34, in a manner that preserves a higher yield of the enriched cell population than achieved by high stringency selection at the expense of enrichment of the cells expressing the biological marker compared to other cells in the biological sample, i.e., reduced enrichment. By definition, the fold enrichment under high-stringency conditions is greater than the fold enrichment under low-stringency conditions. The fold-enrichment of cells, e.g., CD34+ cells, in the high-stringency (CD34 or other marker)-enriched cell population is, in some cases, 2, 2.25, 2.5, 2.75, 3, 3.25, 3.5, 3.75, or 4-fold the fold-enrichment of CD34+ cells in the low-stringency (CD34 or other marker)-enriched cell population. In one embodiment, the fold-enrichment of cells, e.g. CD34+ cells, in the high-stringency (CD34 or other marker)-enriched cell population is 2 to 4-fold the fold-enrichment of CD34+ cells in the low-stringency (CD34 or other marker)-enriched cell population. In certain embodiments, selection under low stringency conditions may be performed on various instruments, including without limitation the Miltenyi Biotec MACSQuant Tyto®, Quad Technologies MagCloudz®, GE Sepax® Cell Separation System, Terumo Elutra® Cell Separation System, COBE Spectra® Cell Separator, SynGen LAB® or WASH® Systems, Fresenius-Kabi Lovo®, Miltenyi Biotec CliniMACS® System or CliniMACS Prodigy® System. Selection may be performed in a laboratory or at point-of-care.

In a low-stringency enrichment protocol, a biological sample comprising CD34+ cells is labeled with a CD34 labelling reagent, e.g. directly-conjugated immunomagnetic beads. Using a magnetic activated cell sorting (MACS) technology, the biological sample, after having been labeled, is applied a column containing magnetically susceptible or ferromagnetic material at a lower flow rate than under high-stringency enrichment. As with high-stringency enrichment, the magnetically susceptible or ferromagnetic material retains the target cells without affecting the ability of non-target cells to flow through and exit the column. In some embodiments, the biological sample is recirculated over the magnetically susceptible or ferromagnetic material one or more times. Following column loading, for low-stringency enrichment, bound cells are washed at lower stringency. Bound cells are then eluted into a collection bag.

In an exemplary embodiment, low-stringency enrichment is performed by modifying the standard operating procedure of the MACS system so that a "depletion-mode" software program intended to achieve high-stringency depletion (i.e. removal of target cells) instead results in low-stringency enrichment. Operation of a MACS system in depletion mode causes target cells in the biological sample to be bound to the magnetically susceptible or ferromagnetic material in the column using slow column loading and lower stringency wash steps than operation in enrichment mode. Non-target cells are flushed by the MACS system into the wash or so-called "target" bag. The depletion-mode program then switches the output valve to direct fluid into the so-called "non-target" bag and then demagnetizes the column. Continued application of fluid over the demagnetized column results in elution of a CD34+ enriched cell population, which has been enriched under low-stringency conditions, into the so-called "non-target" bag, which using this method collects the target cells.

Those of skill in the art will recognize that this low-stringency enrichment method can be performed on various instruments, including without limitation the Miltenyi Biotec MACSQuant Tyto®, Quad Technologies MagCloudz®, GE Sepax® Cell Separation System, Terumo Elutra® Cell Separation System, COBE Spectra® Cell Separator, SynGen LAB® or WASH® Systems, Fresenius-Kabi Lovo®, Miltenyi Biotec CliniMACS® System or CliniMACS Prodigy® System. Those of skill in the art will be able, without undue experimentation, to re-program the software of such a MACs system such that the output valve directs the flow-through of the initial binding step to the waste or "non-target" bag (rather than the target bag) and directs the eluted low-stringency CD34-enriched population to the "target" bag. In effect, low-stringency enrichment is then performed in separation mode without the usual wash steps of conventional MACs programs.

A "vector" as used herein refers to a macromolecule or association of macromolecules that comprises or associates with a polynucleotide and which can be used to mediate delivery of the polynucleotide to a cell. Illustrative vectors include, for example, plasmids, viral vectors (e.g., retroviral vectors, such as lentiviral vectors), liposomes, and other gene delivery vehicles.

The term "LV" is an abbreviation for lentivirus, and may be used to refer to the virus itself or derivatives thereof. The term covers all subtypes and both naturally occurring and recombinant forms, except where required otherwise.

As used herein, the term "gene" or "coding sequence" refers to a nucleotide sequence in vitro or in vivo that encodes a gene product. In some instances, the gene consists or consists essentially of coding sequence, that is, sequence that encodes the gene product. In other instances, the gene comprises additional, non-coding, sequence. For example, the gene may or may not include regions preceding and following the coding region, e.g., 5' untranslated (5' UTR) or "leader" sequences and 3' UTR or "trailer" sequences, as well as intervening sequences (introns) between individual coding segments (exons).

As used herein, a "therapeutic gene" refers to a gene that, when expressed, confers a beneficial effect on the cell or tissue in which it is present, or on a mammal in which the gene is expressed. Examples of beneficial effects include amelioration of a sign or symptom of a condition or disease, prevention or inhibition of a condition or disease, or conferral of a desired characteristic. Therapeutic genes include genes that correct a genetic deficiency in a cell or mammal.

As used herein, a transgene is a gene that is delivered to a cell by a vector.

As used herein, the term "gene product" refers to the desired expression product of a polynucleotide sequence, such as a polypeptide, peptide, protein or interfering RNA, including short interfering RNA (siRNA), miRNA or small hairpin RNA (shRNA). In certain embodiments, the gene product is a therapeutic gene product, which when expressed, confers a beneficial effect on the cell or tissue in which it is present, or on a mammal in which the gene is expressed.

As used herein, the terms "polypeptide," "peptide," and "protein" refer to polymers of amino acids of any length. The terms also encompass an amino acid polymer that has been modified; for example, disulfide bond formation, glycosylation, lipidation, pegylation, phosphorylation, or conjugation with a labeling component.

By "comprising" it is meant that the recited elements are required in, for example, the composition, method, kit, etc., but other elements may be included to form the, for example, composition, method, kit etc. within the scope of the claim. For example, an expression cassette "comprising" a gene encoding a therapeutic polypeptide operably linked to a promoter is an expression cassette that may include other elements in addition to the gene and promoter, e.g., polyadenylation sequence, enhancer elements, other genes, linker domains, etc. For example, a method of preparing or treating "comprising" preparing a CD34-enriched cell population is a method that may include other steps in another to preparing a CD34-enriched cell population, e.g., administering an agent to mobilize stem cells, administering an induction therapy, or co-administering a drug as a combination thereby.

The term "comprising" or "comprises" as used herein in reference to low-stringency conditions should not be construed to permit an additional high-stringency selection being applied to the same sample during the same selection step. It will be understood that performing a selection under both low-stringency conditions and under high-stringency conditions will result in a high-stringency selection, whereas low-stringency selection is expressly defined herein as excluding selection under high-stringency conditions. Preparing a low-stringency CD34-enriched cell population by selection for CD34$^+$ cells under low stringency conditions may include other method steps in open-ended fashion so long as between loading the biological sample onto the column and eluting the low-stringency CD34-enriched cell population from the column, the column is not washed under high-stringency conditions.

By "consisting essentially of", it is meant a limitation of the scope of the, for example, composition, method, kit, etc., described to the specified materials or steps that do not materially affect the basic and novel characteristic(s) of the, for example, composition, method, kit, etc. For example, an expression cassette "consisting essentially of" a gene encoding a therapeutic polypeptide operably linked to a promoter and a polyadenylation sequence may include additional sequences, e.g., linker sequences, so long as they do not materially affect the transcription or translation of the gene. As another example, a variant, or mutant, polypeptide fragment "consisting essentially of" a recited sequence has the amino acid sequence of the recited sequence plus or minus about 10 amino acid residues at the boundaries of the sequence based upon the full length naïve polypeptide from which it was derived, e.g., 10, 9, 8, 7, 6, 5, 4, 3, 2 or 1 residue less than the recited bounding amino acid residue, or 1, 2, 3, 4, 5, 6, 7, 8, 9, or 10 residues more than the recited bounding amino acid residue.

By "consisting of", it is meant the exclusion from the composition, method, or kit of any element, step, or ingredient not specified in the claim. For example, an expression cassette "consisting of" a gene encoding a therapeutic polypeptide operably linked to a promoter, and a post-transcriptional regulatory element consists only of the promoter, polynucleotide sequence encoding the therapeutic polypeptide, and post-transcriptional regulatory element. As another example, a polypeptide "consisting of" a recited sequence contains only the recited sequence.

As used herein "bone marrow cells" or "bone marrow stem cells" refers herein to both cells obtained directly from bone marrow, such as by biopsy, and cells obtained from peripheral blood that originated in the bone marrow, e.g., following mobilization.

An "expression vector" as used herein encompasses a vector, e.g., plasmid, mini-circle, viral vector, liposome, and the like as discussed above or as known in the art, comprising a polynucleotide which encodes a gene product of interest, and is used for effecting the expression of a gene product in an intended target cell. An expression vector also comprises control elements operatively linked to the encoding region to facilitate expression of the gene product in the target. The combination of control elements, e.g., promoters, enhancers, UTRs, miRNA targeting sequences, etc., and a gene or genes to which they are operably linked for expression is sometimes referred to as an "expression cassette." Many such control elements are known and available in the art or can be readily constructed from components that are available in the art.

A "promoter" as used herein encompasses a DNA sequence that directs the binding of RNA polymerase and thereby promotes RNA synthesis, i.e., a minimal sequence sufficient to direct transcription. Promoters and corresponding protein or polypeptide expression may be ubiquitous, meaning strongly active in a wide range of cells, tissues and species or cell-type specific, tissue-specific, or species specific. Promoters may be "constitutive," meaning continually active, or "inducible," meaning the promoter can be activated or deactivated by the presence or absence of biotic or abiotic factors. Also included in the nucleic acid constructs or vectors of the invention are enhancer sequences that may or may not be contiguous with the promoter sequence. Enhancer sequences influence promoter-dependent gene expression and may be located in the 5' or 3' regions of the native gene.

An "enhancer" as used herein encompasses a cis-acting element that stimulates or inhibits transcription of adjacent genes. An enhancer that inhibits transcription also is termed a "silencer." Enhancers can function (i.e., can be associated with a coding sequence) in either orientation, over distances of up to several kilobase pairs (kb) from the coding sequence and from a position downstream of a transcribed region.

A "termination signal sequence" as used herein encompasses any genetic element that causes RNA polymerase to terminate transcription, such as for example a polyadenylation signal sequence.

As used herein, the terms "operatively linked" or "operably linked" refers to a juxtaposition of genetic elements, e.g., promoter, enhancer, termination signal sequence, polyadenylation sequence, etc., wherein the elements are in a relationship permitting them to operate in the expected manner. For instance, a promoter is operatively linked to a coding region if the promoter helps initiate transcription or expression of the coding sequence. There may be intervening residues between the promoter and coding region so long as this functional relationship is maintained.

As used herein, the term "heterologous" means derived from a genotypically distinct entity from that of the rest of the entity to which it is being compared. For example, a polynucleotide introduced by genetic engineering techniques into a plasmid or vector derived from a different species is a heterologous polynucleotide. As another example, a promoter removed from its native coding sequence and operatively linked to a coding sequence with which it is not naturally found linked is a heterologous promoter. Thus, for example, an LV vector that includes a heterologous nucleic acid encoding a heterologous gene product is an LV vector that includes a nucleic acid not normally included in a naturally-occurring, wild-type LV, and the encoded heterologous gene product is a gene product not normally encoded by a naturally-occurring, wild-type LV.

The term "endogenous" as used herein with reference to a nucleotide molecule or gene product refers to a nucleic acid sequence, e.g., gene or genetic element, or gene product, e.g., RNA, protein, that is naturally occurring in or associated with a host virus or cell.

The term "native" as used herein refers to a nucleotide sequence, e.g., gene, or gene product, e.g., RNA, protein, that is present in a wildtype virus or cell. The term "variant" as used herein refers to a mutant or variant of a reference polynucleotide or polypeptide sequence, for example a native polynucleotide or polypeptide sequence, i.e., having less than 100% sequence identity with the reference polynucleotide or polypeptide sequence. Put another way, a variant comprises at least one amino acid difference (e.g., amino acid substitution, amino acid insertion, amino acid deletion) relative to a reference polynucleotide sequence, e.g., a native polynucleotide or polypeptide sequence. For example, a variant may be a polynucleotide having a sequence identity of 70% or more with a full length native polynucleotide sequence, e.g., an identity of 75% or 80% or more, such as 85%, 90%, or 95% or more, for example, 98% or 99% identity with the full length native polynucleotide sequence. As another example, a variant may be a polypeptide having a sequence identity of 70% or more with a full length native polypeptide sequence, e.g., an identity of 75% or 80% or more, such as 85%, 90%, or 95% or more, for example, 98% or 99% identity with the full length native polypeptide sequence. Variants may also include variant fragments of a reference, e.g., native, sequence sharing a sequence identity of 70% or more with a fragment of the reference, e.g., native, sequence, e.g., an identity of 75% or 80% or more, such as 85%, 90%, or 95% or more, for example, 98% or 99% identity with the native sequence.

As used herein, the terms "biological activity" and "biologically active" refer to the activity attributed to a particular biological element in a cell. For example, the "biological activity" of an "immunoglobulin", "antibody" or fragment or variant thereof refers to the ability to bind an antigenic determinant and thereby facilitate immunological function. As another example, the biological activity of a polypeptide or functional fragment or variant thereof refers to the ability of the polypeptide or functional fragment or variant thereof to carry out its native functions of, e.g., binding, enzymatic activity, etc. As a third example, the biological activity of a gene regulatory element, e.g., promoter, enhancer, kozak sequence, and the like, refers to the ability of the regulatory element or functional fragment or variant thereof to regulate, i.e., promote, enhance, or activate the translation of, respectively, the expression of the gene to which it is operably linked.

The terms "administering" or "introducing", as used herein, refer to delivery of a cell population to a subject, e.g., by transfusing the cell population into the blood of the subject intraarterially or intravenously. The cell population may be administered in various solutions, such as saline. In some embodiments, the solution used will be isotonic to the blood of the subject and pH-buffered.

"Transformation" is typically used to refer to the process of introducing heterologous DNA into bacteria or another cell, or to cells which express an oncogene and have therefore been converted into a continuous growth mode such as tumor cells. A vector used to "transform" a cell may be a plasmid, virus or other vehicle.

Typically, a cell is referred to as "transduced", "infected"; "transfected" or "transformed" dependent on the means used for administration, introduction or insertion of heterologous DNA (i.e., the vector) into the cell. The terms "transduced", "transfected" and "transformed" may be used interchangeably herein regardless of the method of introduction of heterologous DNA.

The term "host cell", as used herein refers to a cell which has been transduced, infected, transfected or transformed with a vector. The vector may be a plasmid, a viral particle, a phage, etc. The culture conditions, such as temperature, pH and the like, are those previously used with the host cell selected for expression, and will be apparent to those skilled in the art. It will be appreciated that the term "host cell" refers to the original transduced, infected, transfected or transformed cell and progeny thereof.

The terms "treatment", "treating" and the like are used herein to generally mean obtaining a desired pharmacologic and/or physiologic effect. The effect may be prophylactic in terms of completely or partially preventing a disease or symptom thereof, e.g., reducing the likelihood that the disease or symptom thereof occurs in the subject, and/or may be therapeutic in terms of a partial or complete cure for a disease and/or adverse effect attributable to the disease, or slowing progression of the disease. "Treatment" as used herein covers any treatment of a disease in a mammal, and includes: (a) preventing the disease from occurring in a subject which may be predisposed to the disease but has not yet been diagnosed as having it; (b) inhibiting the disease, i.e., arresting its development; or (c) relieving the disease, i.e., causing regression of the disease. The therapeutic agent may be administered before, during or after the onset of disease or injury. The treatment of ongoing disease, where the treatment stabilizes or reduces the undesirable clinical symptoms of the patient, is of particular interest. Such treatment is desirably performed prior to complete loss of function in the affected tissues. The subject therapy may be administered during the symptomatic stage of the disease, and in some cases after the symptomatic stage of the disease. In certain embodiments, the subject is administered the treatment following a genetic test that identified the subject as having a mutation associated with or causative for the disease, e.g., FA.

The terms "individual," "host," "subject," and "patient" are used interchangeably herein, and refer to a mammal, including, but not limited to, human and non-human primates, including simians and humans; mammalian sport animals (e.g., horses); mammalian farm animals (e.g., sheep, goats, etc.); mammalian pets (dogs, cats, etc.); and rodents (e.g., mice, rats, etc.).

As used herein, "fragment," as applied to a polypeptide, will ordinarily be at least 10 amino acid residues, more typically at least 20 residues, and preferably at least 30 (e.g., 50) residues in length, but less than the entire, intact sequence. Fragments can be generated by methods known to those skilled in the art, e.g., by enzymatic digestion of naturally occurring or recombinant protein, by recombinant DNA techniques using an expression vector that encodes a defined fragment, or by chemical synthesis. The ability of a candidate fragment to bind to a particular DNA sequence can be assessed by methods described herein. Purified fragments or antigenic fragments can be used to isolate regulatory regions or to generate new regulatory enzymes (e.g., using multiple functional fragments from different enzymes), as well as to generate antibodies, all employing standard protocols known to those skilled in the art. As used herein, "functional fragment" is meant to encompass not only those peptide fragments retaining biological activity, but also those peptide fragments that retain binding specificity to a particular nucleotide sequence.

A "functional fragment" of an anti-CD34 antibody is a fragment capable of binding to CD34 molecules on the surface of cells with sufficient affinity and specificity to permit selection or enrichment for CD34+ cells.

The terms "identical" or "percent identity," in the context of two or more nucleic acids or polypeptide sequences, refer to two or more sequences or subsequences that are the same or have a specified percentage of nucleotides or amino acid residues that are the same, when compared and aligned for maximum correspondence. To determine the percent identity, the sequences are aligned for optimal comparison purposes (e.g., gaps can be introduced in the sequence of a first amino acid or nucleic acid sequence for optimal alignment with a second amino or nucleic acid sequence). The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position. The percent identity between the two sequences is a function of the number of identical positions shared by the sequences (i.e., % identity=# of identical positions/total # of positions (e.g., overlapping positions)×100). In some embodiments, the two sequences are the same length.

An illustrative computer program for carrying out optimal alignment, taking into consideration gap penalties is the GCG Wisconsin Bestfit package (University of Wisconsin, U.S.A.; Devereux et al. (1984) Nucleic Acids Res. 12: 387). Examples of other software that can perform sequence comparisons include, but are not limited to, the BLAST package (see Ausubel et al. (1999) ibid-Ch. 18), FASTA (Atschul et al. (1990) J. Mol. Biol. 403-410), the GENE-WORKS suite of comparison tools, the GCG Bestfit program can be used, and BLAST 2 Sequences (see FEMS Microbiol. Lett. (1999) 174: 247-50; FEMS Microbiol. Lett. (1999) 177: 187-8). A scaled similarity score matrix may be used that assigns scores to each pairwise comparison based on chemical similarity or evolutionary distance. An example of such a matrix is the BLOSUM62 matrix—the default matrix for the BLAST suite of programs. GCG Wisconsin programs may use either the public default values or a custom symbol comparison table if supplied (see the user manual for further details).

The term "substantially identical," in the context of two nucleic acids or polypeptides, refers to two or more sequences or subsequences that have at least 90%, at least 91%, at least 92%, at least 93%, at least 94%, at least 95%, at least 96%, at least 97%, at least 98% identity, or at least 99% identity (e.g., as determined using one of the methods set forth infra).

Unless otherwise indicated by context, a "variant" is a polypeptide or fragment thereof having one or more non-conservative or conservative amino acid substitutions relative to a second polypeptide (also referred to as a "derivative"); or a polypeptide or fragment thereof that is modified by covalent attachment of a second molecule such as, e.g., by attachment of a heterologous polypeptide, or by glycosylation, acetylation, phosphorylation, and the like. Further included within the definition of "variant" are, for example, polypeptides containing one or more analogs of an amino acid (e.g., unnatural amino acids and the like), polypeptides with unsubstituted linkages, as well as other modifications known in the art, both naturally and non-naturally occurring.

The various compositions and methods of the invention are described below. Although particular compositions and methods are exemplified herein, it is understood that any of a number of alternative compositions and methods are applicable and suitable for use in practicing the invention. It will also be understood that an evaluation of the expression constructs and methods of the invention may be carried out using procedures standard in the art.

The practice of the present invention employs, unless otherwise indicated, conventional techniques of cell biology, molecular biology (including recombinant techniques), microbiology, biochemistry and immunology, which are within the scope of those of skill in the art. Such techniques are explained fully in the literature, such as, "Molecular Cloning: A Laboratory Manual", second edition (Sambrook et al., 1989); "Oligonucleotide Synthesis" (M. J. Gait, ed., 1984); "Animal Cell Culture" (R. I. Freshney, ed., 1987); "Methods in Enzymology" (Academic Press, Inc.); "Handbook of Experimental Immunology" (D. M. Weir & C. C. Blackwell, eds.); "Gene Transfer Vectors for Mammalian Cells" (J. M. Miller & M. P. Calos, eds., 1987); "Current Protocols in Molecular Biology" (F. M. Ausubel et al., eds., 1987); "PCR: The Polymerase Chain Reaction", (Mullis et al., eds., 1994); and "Current Protocols in Immunology" (J. E. Coligan et al., eds., 1991), each of which is expressly incorporated by reference herein.

Several aspects of the invention are described below with reference to example applications for illustration. It should be understood that numerous specific details, relationships, and methods are set forth to provide a full understanding of the invention. One having ordinary skill in the relevant art, however, readily recognizes that the invention can be practiced without one or more of the specific details or with other methods. The present invention is not limited by the illustrated ordering of acts or events, as some acts may occur in different orders and/or concurrently with other acts or events. Furthermore, not all illustrated acts or events are required to implement a methodology in accordance with the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising".

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed.

All publications mentioned herein are incorporated herein by reference to disclose and describe the methods and/or materials in connection with which the publications are cited. It is understood that the present disclosure supersedes any disclosure of an incorporated publication to the extent there is a contradiction.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Further, the dates of publication provided may be different from the actual publication dates which may need to be independently confirmed.

Unless otherwise indicated, all terms used herein have the same meaning as they would to one skilled in the art and the practice of the present invention will employ conventional techniques of microbiology and recombinant DNA technology, which are within the knowledge of those of skill of the art.

Methods for Preparing, Transducing, and Using CD34+-Enriched Cell Populations

In one aspect, the disclosure provides methods of preparing populations of cells enriched for CD34+ cells, including gene-modified CD34+ cells. In certain embodiments, the methods comprise preparing two CD34-enriched cell populations, one prepared using low stringency conditions, and the other prepared using high stringency conditions. As demonstrated herein, use of a combination of the low stringency CD34-enriched cell population and the high stringency CD34-enriched cell population advantageously result in unexpectedly effective reconstitution of CD34+ stem cells in a subject.

In another aspect, the disclosure provides methods of treating a subject having a disease or disorder, by providing to the subject a therapeutically effective amount of one or more cell populations enriched for CD34+ cells, including gene-modified CD34+ cells, wherein the gene-modified C34+ cells encodes a therapeutic agent effective for treating the disease or disorder. In particular embodiments, the therapeutic agent is a polypeptide or a polynucleotide, e.g., an RNA. In particular embodiments, the CD34-enriched cell populations are prepared from CD34 cells obtained from the subject being treated.

In certain embodiments of methods disclosed herein, two cell populations enriched for CD34+ cells are produced, including a high-stringency CD34-enriched cell population and a low-stringency CD34-enriched cell population. These two cell populations may be kept separate, or they may be combined to produce a mixed cell population comprising both high-stringency CD34-enriched cells and low-stringency CD34-enriched cells. In particular embodiments, either or both of the two cell populations are transduced with a gene therapy vector, e.g., an LV vector encoding FANCA or a functional fragment or variant thereof.

In particular embodiments, the cells may be from any mammalian species, e.g., rodent (e.g., mice, rats, gerbils, squirrels), rabbit, feline, canine, goat, ovine, pig, equine, bovine, primate, human. In certain embodiments, the cells may be from established cell lines or they may be primary cells, where "primary cells", "primary cell lines", and "primary cultures" are used interchangeably herein to refer to cells and cells cultures that have been derived from a subject and allowed to grow in vitro for a limited number of passages, i.e., splittings, of the culture. For example, primary cultures are cultures that may have been passaged 0 times, 1 time, 2 times, 4 times, 5 times, 10 times, or 15 times, but not enough times go through the crisis stage. Typically, the primary cell lines of the present invention are maintained for fewer than 10 passages in vitro.

In certain embodiments, the methods comprise preparing CD34-enriched cell populations from a biological sample obtained from a subject. In one embodiment, the biological sample is a bone marrow sample. In another embodiment, the biological sample is peripheral blood.

In particular embodiments, the biological sample, e.g., peripheral blood, is obtained from the subject following mobilization of hematopoietic stem cells (HSCs). In one embodiment, HSCs and/or progenitor cells are mobilized by treating the subject with G-CSF or an analog thereof, e.g., in an amount and for a time sufficient to cause mobilization of HSCs in the patient. HSCs and progenitor cells (HSPC) in peripheral blood may be mobilized prior to collection of the biological sample. Peripheral blood HSCs and HSPC can be mobilized by any method known in the art. Peripheral blood HSCs and HSPC can be mobilized by treating the subject with any agent(s), described herein or known in the art, that increase the number of HSC and/or HSPC circulating in the peripheral blood of the subject. Reference made throughout to either HSC or HSPC are intended to encompass both HSC and HSPC unless otherwise indicated. For example, in particular embodiments, peripheral blood is mobilized by treating the subject with one or more cytokines or growth factors (e.g., G-CSF, kit ligand (KL), IL-I, IL-7, IL-8, IL-11, Flt3 ligand, SCF, thrombopoietin, or GM-CSF (such as sargramostim)). Different types of G-CSF that can be used in the methods for mobilization of peripheral blood include filgrastim and longer acting G-CSF: pegfilgrastim. In particular embodiments, peripheral blood is mobilized by treating the subject with one or more chemokines (e.g., macrophage inflammatory protein-1a (MIP1a/CCL3)), chemokine receptor ligands (e.g., chemokine receptor 2 ligands GRO13 and GR013M), chemokine receptor analogs (e.g., stromal cell derived factor-1a (SDF-1a) protein analogs such as CTCE-0021, CTCE-0214, or SDF-1a such as Met-SDF-113), or chemokine receptor antagonists (e.g., chemokine (C-X-C motif) receptor 4 (CXCR4) antagonists such as AMD3100). In particular embodiments, peripheral blood is mobilized by treating the subject with one or more anti-integrin signaling agents (e.g., function blocking anti-very late antigen 4 (VLA-4) antibody, or anti-vascular cell adhesion molecule 1 (VCAM-1)). In particular embodiments, peripheral blood is mobilized by treating the subject with one or more cytotoxic drugs such as cyclophosphamide, etoposide or paclitaxel. In particular embodiments, peripheral blood can be mobilized by administering to a subject one or more of the agents listed above for a certain period of time. For example, the subject can be treated with one or more agents (e.g., G-CSF) via injection (e.g., subcutaneous, intravenous or intraperitoneal), once daily or twice daily, for 1, 2, 3, 4, 5, 6, 7, 8, 9, 10, 11, 12, 13 or 14 days prior to collection of HSPC. In specific embodiments, HSPC are collected within 1, 2, 3, 4, 5, 6, 7, 8, 12, 14, 16, 18, 20 or 24 hours after the last dose of an agent used for mobilization of HSPC into peripheral blood. In particular embodiments, HSCs and HSPC are mobilized by treating the subject with two or more different types of agents described above or known in the art, such as a growth factor (e.g., G-CSF) and a chemokine receptor antagonist (e.g., CXCR4 receptor antagonist such as AMD3100), or a growth factor (e.g., G-CSF or KL) and an anti-integrin agent (e.g., function blocking VLA-4 antibody). In one embodiment, HSCs and/or progenitor cells are mobilized by treating the subject with G-CSF or an analog thereof. In one embodiment, the G-CSF is filgrastim. In one embodiment, HSCs and/or progenitor cells are mobilized by treating the subject with plerixafor. In a certain embodiment, HSCs and/or progenitor cells are mobilized using a combination of filgrastim and plerixafor, by filgrastim alone, or by plerixafor alone. In particular embodiments, different types of mobilizing agents are administered concurrently or sequentially. For additional information regarding methods of mobilization of peripheral blood see, e.g., Craddock et al., 1997, Blood 90(12):4779-4788; Jin et al., 2008, Journal of Translational Medicine 6:39; Pelus, 2008, Curr. Opin. Hematol. 15(4):285-292; Papayannopoulou et al., 1998, Blood 91(7):2231-2239; Tricot et al., 2008, Haematologica 93(11):1739-1742; and Weaver et al., 2001, Bone Marrow Transplantation 27(2): S23-S29).

In certain embodiments, peripheral blood is obtained through a syringe or catheter inserted into a subject's vein. For example, the peripheral blood can be collected using an apheresis machine. Blood flows from the vein through the catheter into an apheresis machine, which separates the white blood cells, including HSPC from the rest of the blood and then returns the remainder of the blood to the subject's body. Apheresis can be performed for several days (e.g., 1 to 5 days) until enough HSPC have been collected.

In certain embodiments, bone marrow is obtained from the posterior iliac crest of the subject by needle aspiration (see, e.g., Koda et al., 1984, J. Clin Invest. 73:1377-1384).

In certain embodiments, a hematocrit level of the biological sample may be determined. The hematocrit level may be determined by centrifuging the sample within a treatment chamber to separate RBCs of a sample into a layer such that the packed cell volume may be determined. It should be appreciated that the sample may be combined with an anticoagulant in order to assist with determining the hematocrit level and that such an anticoagulant may be added to the treatment chamber prior to or during centrifugation. Alternatively, the hematocrit level may be determined by measuring optical properties of the sample. For example, a spectrometer may be used to analyze the sample. It should be appreciated that any type of known spectroscopic methods of determining hematocrit level may be used such as, for example, Raman spectroscopy and/or light scattering techniques.

In certain embodiments, the biological sample is depleted of erythrocytes, e.g., before preparing the one or more cell populations enriched for CD34+ cells from the biological sample. In some embodiments, the cells remaining after depletion techniques are washed. In another embodiment, non-specific IgG is added to the washed cells. In some embodiments, the non-specific IgG is flebogamma.

Two populations of cells enriched for CD34+ cells may be produced by selecting a population of cells for CD34+ cells under high-stringency conditions and selecting another population of cells for CD34+ cells under low stringency conditions, thereby producing two cell populations, one a high-stringency CD34-enriched cell population and the other a low-stringency CD34-enriched cell population. Methods used to select for CD34+ cells may be positive selection, negative selection, or a combination thereof. In certain embodiments, the biological sample obtained from the subject is divided into two samples, where one sample is used to prepare the high-stringency CD34-enriched cell population, and the other sample is used to prepare the low-stringency CD34-enriched cell population.

In other embodiments, the biological sample obtained from the subject is first subjected to a low-stringency CD34+ selection to prepare a low-stringency CD34-enriched cell population, and then a portion of the low-stringency CD34-enriched population is subjected to a high-stringency CD34+ selection to prepare a high-stringency CD34-enriched cell population. Selection may be applied sequentially, e.g., a selection for CD34-enriched cells under low stringency conditions may be applied first followed by selection from the resulting population of further CD34-enriched cells under high stringency conditions.

In other cases, selection for CD34-enriched cells under high stringency conditions may be applied first followed by selection from the residual population of CD34-enriched cells under low stringency conditions. In some cases, the cell populations may be split such that a low stringency or a high stringency selection is applied to a fraction of the cells subjected to high stringency or low stringency selection previously. In some cases, one biological sample is split into two or more samples before selection of CD34-enriched cells under low or high stringency conditions.

In some cases, two or more biological samples are mixed together before selection, including, e.g. mobilized bone marrow samples acquired at different times, such as 1, 2, 3, 4 or more days apart, or 1, 2, or 3 weeks apart, or 1, 2, or 3 months apart, or years apart, inclusive of other time increments. In cases, biological samples from different subjects are mixed, such as, e.g., an autologous biological sample and a sample from an allogenic donor. In every case, high-stringency or low-stringency selection preceding or following mixing or splitting biological samples or enriched cell populations is contemplated, in all possible permutations. In certain embodiments, the method comprises preparing a high-stringency CD34-enriched cell population from a first biological sample obtained from the subject by selecting for CD34$^+$ cells under high stringency conditions; and preparing a low-stringency CD34-enriched cell population from a second biological sample obtained from the subject by selecting for CD34$^+$ cells under low stringency conditions.

In some embodiments, the percentage of CD34+ cells in the high-stringency CD34-enriched cell population is between 1.5-fold, 2-fold, 2.5-fold, 3-fold, 3.5-fold, 4-fold greater, or in some instances 5-fold, 6-fold, 7-fold, or 8-fold greater than the percentage of CD34+ cells in the low-stringency CD34-enriched cell population.

Various yields and purity of CD34+ cells may be achieved by the methods disclosed. In some cases, selection of CD34+ cells under high stringency conditions results in high-stringency CD34-enriched cell populations with yields of CD34+ cells compared to input biological sample of at least about 10%, 20%, 30%, 40%, 50%, 60%, 70%, 80% or greater, or any value in between; and/or in purity compared to the total number of cells in the enriched sample of at least about 20%, 30%, 40%, 50%, 60%, 70%, 80%, 90%, 95% or greater, or any value in between. In some cases, selection of CD34+ cells under high stringency conditions results in high-stringency CD34-enriched cell populations with yields of CD34+ cells compared to input biological sample of about 10% to 20%, 20% to 30%, or 30% to 40%, or any value in between; and/or in purity compared to the total number of cells in the enriched sample of at least about 20%, 30%, 40%, 50%, or any value in between. In particular embodiments, selection of CD34+ cells under high stringency conditions results in high-stringency CD34-enriched cell populations with yields of CD34+ cells compared to input biological sample of at least about 20%; and/or in purity compared to the total number of cells in the enriched sample of at least about 20% or at least about >30%.

In some cases, selection of CD34+ cells under low stringency conditions results in low-stringency CD34-enriched cell populations with yields of CD34+ cells compared to input biological sample of at least about 30%, 40%, 50%, 60%, 70%, 80%, 90%, 95% or greater, or any value in between; and in purity compared to the total number of cells in the enriched sample of at least about 5%, 10%, 15%, 25%, 40%, 50% or greater, or any value in between. In some cases, selection of CD34+ cells under low stringency conditions results in low-stringency CD34-enriched cell populations with yields of CD34+ cells compared to input biological sample of greater than 30%, about 30% to 40%, 40% to 50%, or 50% to 60%, or any value in between; and in purity compared to the total number of cells in the enriched sample of at least about 3%, 5%, 8%, 10%, or any value in between. In particular embodiments, selection of CD34+ cells under low stringency conditions results in high-stringency CD34-enriched cell populations with yields of CD34+ cells compared to input biological sample of greater than 35%; and/or in purity compared to the total number of cells in the enriched sample of less than 30%, less than 25%, less than 20%, less than 10%, or less than 5%. In particular embodiments, selection of CD34+ cells under low stringency conditions results in low-stringency CD34-enriched cell populations with purity compared to the total number of cells in the enriched sample of 1-30%, 1-20%, 1-10%, 10-30%, 10-20%, or 20-30%. In some embodiments, the low-stringency CD34-enriched cell populations further comprise at least neutrophils and B cells.

In particular embodiments, high-stringency and low-stringency selection are both performed by positive selection, e.g., using an agent that binds CD34+ cells. In particular embodiments, the agent is in solution, whereas in other embodiments, the agent is affixed to a solid surface. In certain embodiments, the agent is bound to the surface of a magnetic bead. In some embodiments, the agent is an anti-CD34 antibody or functional fragment thereof.

In certain embodiments, selection under high stringency conditions and/or low stringency conditions may be performed on various instruments, including without limitation the Miltenyi Biotec MACSQuant Tyto®, Quad Technologies MagCloudz®, GE Sepax® Cell Separation System, Terumo Elutra® Cell Separation System, COBE Spectra® Cell Separator, SynGen LAB® or WASH® Systems, Fresenius-Kabi Lovo®, Miltenyi Biotec CliniMACS® System or CliniMACS Prodigy® System. Selection may be performed in a laboratory or at point-of-care. Detailed methods for preparation and enrichment of cells and cell populations, including exemplary methods for selection of CD34+ cells under high stringency conditions, are described, e.g., in Int'l Patent Pub. No. WO 2016/118790. Illustrative selection method useful for high-stringency selection are provided by U.S. Pat. No. 8,727,132.

In an embodiment, the instrument is a closed system device that includes material inputs (e.g., sample, buffers, gas) at least one treatment chamber with centrifugation and cell incubation capabilities, a closed tubing set, a pump, and a target cell selector. Controlling software enables the device to isolate, genetically-modify, and formulate target cells ex vivo, in particular embodiments, directly from a subject sample. In particular embodiments, the selection process can be completed within 30 hours, within 25 hours or within 20 hours with minimal to no user input. In particular embodiments, the entire process is completed within 72 hours or within 64 hours. In particular embodiments, minimal user input means that between sample input into the device and recovery of genetically-modified cells formulated for administration to a subject, the user interacts with the device no more than 20, 15, 10, or 5 times and/or interacts with the device for no more than 12 hours, 10 hours, 8 hours, 5 hours, 4 hours, or 3 hours. Exemplary interactions from a user can include one or more of: connecting a sterile tubing set; verifying maintenance of a closed, sterile system; determining that a stage should be repeated (e.g., sedimentation); verifying successful completion of a stage; allowing a new stage to begin following a process quality check; providing reagents for device input; and determining and/or calculating volumes for addition or removal. Interactions can be timed by, following sample receipt, the amount of time the user is preparing for or actually interacting with the device.

In certain embodiments, one or both of the high-stringency CD34-enriched cell population and/or low-stringency CD34-enriched cell population is prepared using a CliniMACS® instrument, such as the CliniMACS®$^{plus}$ Instrument, which is a software controlled instrument that processes the HSC, apheresis. The CliniMACS®$^{plus}$ Instrument, and related equipment and reagents, are commercially available from Miltenyi Biotec GmbH, Bergisch Gladbach, Germany). Equipment or reagents used include the CliniMACS® CD34 antigen/reagent, which is a solution containing an antibody conjugate consisting of a murine IgG, monoclonal antibody directed against the Class II epitope of the human CD34 antigen, which is chemically conjugated to dextran beads having an iron oxide/hydroxide core, which is used for selection or enrichment of CD34+ cells; CliniMACS® Tubing, which are single-use, sterile, disposable tubing set with two cell separation columns for processing up to $0.6 \times 10^9$ CD34+ cells out of a total cell number not exceeding $60 \times 10^9$ white blood cells (standard-scale) or up to $1.2 \times 10^9$ CD34+ cells out of a total cell number not exceeding $120 \times 10^9$ white blood cells (large-scale); and CliniMACS® PBS/EDTA Buffer, which is a sterile, isotonic phosphate-buffered, 1 mM EDTA, saline solution, used as an external wash and transport fluid for the in vitro processing of HSC, apheresis. Washes can be performed using CliniMACS Buffer comprising PBS and 2.5% human serum albumin. Procedures for using the CliniMACS® system are provided in the CliniMACS User Manuals available at the Miltenyi website, including, e.g., the CliniMACS® User Manual for the CliniMACS® CD34 Reagent System obtained on Apr. 8, 2019 at www.miltenyibiotec.com/_Resources/Persistent/ 2c28c84939f4ce793b29c9f2e897c0bbla334c47/User %20Manual %20for %20the %20CliniMACS %20CD34%20Reagent %20System.pdf. In one embodiment, the high stringency CD34-enriched cell population is prepared by labelling the cells using the CD34 reagent, and then the CD34+ cells are selected using a standard CliniMACS® CD34 enrichment program. In one embodiment, the low stringency CD34-enriched cell population is prepared using a modified version of a CliniMACS® depletion program. According to this embodiment, the cells are labelled using the CD34 reagent, but a modified depletion program is run. After loading of the labelled cells with the magnet ON, the Cell Collection bag is removed and the collected cells not used for transplant. Instead, the magnet is turned OFF and elution buffer is applied to the instrument, resulting in elution of the CD34+ cells, which are collected. In certain embodiments, as compared to selection mode, under depletion mode, the instrument is loaded more slowly (mL/min), and the washes are lower stringency.

In certain embodiments, one or both of the high-stringency CD34-enriched cell population and/or low-stringency CD34-enriched cell population is transduced with a vector, e.g., a gene therapy vector that encodes a therapeutic agent, e.g., by contacting either or both of the high-stringency CD34-enriched cell population and/or the low-stringency CD34-enriched cell population with the vector. In certain embodiments, the cells are contacted with the vector for about 30 minutes, about 1 hour, about 1.5 hours, about 2 hours, about 2.5 hours, about 3 hours, about 3.5 hours, about 4 hours, about 5 hours, about 6 hours, about 7 hours, about 8 hours, about 12 hours, about 16 hours, about 18 hours, about 20 hours, about 24 hours, about 36 hours, about 48 hours, about 60 hours. In some embodiments, the cells are transduced for less than 60 hours, less than 48 hours, less than 36 hours, or less than 24 hours. In certain embodiments, the cells may be contacted with the vector one or more times, e.g. one time, twice, three times, or more than three times, and the cells allowed to incubate with the agent(s) for some amount of time following each contacting event e.g. 16-24 hours, after which time the media is replaced with fresh media and the cells are cultured further. Contacting the cells with the vector may occur in any culture media and under any culture conditions that promote the survival of the cells. The culture may contain growth factors to which the cells are responsive. Growth factors, as defined herein, are molecules capable of promoting survival, growth and/or differentiation of cells, either in culture or in the intact tissue, through specific effects on a transmembrane receptor. Growth factors include polypeptides and non-polypeptide factors.

In certain embodiments, cells are contacted with an effective amount of gene therapy vector sufficient to achieve detectable levels of the encoded therapeutic agent. In particular embodiments, the therapeutic agent is a polypeptide or polynucleotide useful or effective for the treatment of a disease or disorder. In particular embodiments, the therapeutic agent is a polypeptide that is deregulated or mutated in the cells obtained from the subject, e.g., a FANC polypeptide for the treatment of FA. The effective amount may be readily determined empirically, e.g. by detecting the presence or levels of the therapeutic agent, by detecting an effect on the viability or function of the cells, etc. Typically, expression of the therapeutic agent will be enhanced 2-fold or more, for example 3-fold, 4-fold, or 5-fold or more, in some instances 10-fold, 20-fold or 50-fold or more, e.g. 100-fold in transduced cells as compared to non-transduced cells.

Any convenient gene therapy vector that finds use delivering polynucleotide sequences to mammalian cells is encompassed by the gene therapy vectors of the present disclosure. For example, the vector may comprise single or double stranded nucleic acid, e.g. single stranded or double stranded DNA. For example, the gene therapy vector may be DNA, e.g., a naked DNA, e.g., a plasmid, a minicircle, etc. The vector may comprise single-stranded or double-stranded RNA, including modified forms of RNA. In another example, the gene therapy vector may be an RNA, e.g., an mRNA or modified mRNA.

In particular embodiments, the gene therapy vector may be a viral vector derived from a virus, e.g., an adenovirus, an adeno-associated virus, a lentivirus (LV), a herpes virus, an alphavirus or a retrovirus, e.g., Moloney murine leukemia virus (M-MuLV), Moloney murine sarcoma virus (MoMSV), Harvey murine sarcoma virus (HaMuSV), murine mammary tumor virus (MuMTV), gibbon ape leukemia virus (GaLV), feline leukemia virus (FLV), spumavirus, Friend murine leukemia virus, Murine Stem Cell Virus (MSCV) or Rous Sarcoma Virus (RSV). While embodiments encompassing the use of LV are described in greater detail below, it is expected that the ordinarily skilled artisan will appreciate that similar knowledge and skill in the art can be brought to bear on non-LV gene therapy vectors as well. In some embodiments, the gene therapy vector is a self-limiting LV.

In particular, certain methods disclosed herein relate to transducing one or both populations of stem cells or progenitor cells, e.g., hematopoietic stem cells (HSCs) or hematopoietic progenitor cells (also referred to herein as "hematopoietic progenitors") with a gene therapy vector encoding and/or expressing a therapeutic polypeptide, e.g., FANCA, where one population is prepared by selection under high-stringency conditions and the other population is prepared by selection under low-stringency conditions In one embodiment, the cell populations are enriched for CD34+ cells. In one embodiment, the HSCs or hematopoietic progenitors are from a subject with diminished or no protein activity from one or more FANCA encoded proteins. In one embodiment, the subject has FA-A. In one embodiment, the endogenous FANCA gene of the HSCs is deleted and/or mutated.

In one embodiment, transducing a cell with a gene therapy vector results in the integration into the cell genome of an expression cassette comprising a promoter operably linked to a polynucleotide sequence encoding a therapeutic agent within the gene therapy vector. In some embodiments, transducing a cell with a gene therapy vector results in the expression of the therapeutic agent, e.g., a biologically active FANCA protein.

For example, a biologically active FANCA protein forms part of the FA core complex. In certain embodiments, a FANCA gene is delivered via a viral vector. In one embodiment, a FANCA gene is delivered via a lentiviral vector. In certain embodiments, the lentiviral vector is PGK-FANCA.WPRE*LV. It is contemplated that after transduction of bone marrow (BM) cells or stem cells or progenitor cells from FA-A patients with a FANCA lentiviral vector (LV), the therapeutic vector is integrated in the genome of the cells. Once integrated, the therapeutic protein (e.g., human FANCA protein) is expressed by the cells. Transduced FA cells are genetically corrected, and thus able to activate the FA pathway by the mono-ubiquitination of FANCD2 and FANCI. These proteins will be then able to migrate to areas of DNA damage, and in cooperation with other DNA repair proteins, will promote the repair of the DNA in these cells, as occurs in healthy cells.

As discussed herein, the subject methods and compositions find use in expressing a transgene, e.g., FANCA, in cells of an animal. For example, the subject compositions may be used in research, e.g., to determine the effect that the gene has on cell viability and/or function. As another example, the subject compositions may be used in medicine, e.g., to treat a disorder such as FA.

Accordingly, the present disclosure provides methods of treating a disease or disorder in a subject in need thereof, comprising providing or administering to the subject a combination of a high-stringency CD34-enriched cell population and a low-stringency CD34-enriched cell population prepared as described herein, wherein one or both of the high-stringency CD34-enriched cell population or the low-stringency CD34-enriched cell population is transduced with a recombinant gene therapy vector comprising a polynucleotide sequence encoding a therapeutic agent or comprising an expression cassette that expresses the therapeutic agent, wherein the therapeutic agent is effective in treating the disease or disorder. In particular embodiments, the disease is FA, and the therapeutic agent is a Fanconi anemia complementation group A (FANCA) polypeptide, or a functional variant or fragment thereof.

In particular embodiments, the method comprises: (a) preparing a high-stringency CD34-enriched cell population from a first biological sample obtained from the subject by selecting for CD34$^+$ cells under high stringency conditions; (b) preparing a low-stringency CD34-enriched cell population from a second biological sample obtained from the subject by selecting for CD34$^+$ cells under low stringency conditions, (c) transducing one or both of the high-stringency CD34-enriched cell population or the low-stringency CD34-enriched cell population with the recombinant gene therapy vector comprising the polynucleotide sequence encoding the therapeutic agent; and (d) providing or administering the high-stringency CD34-enriched cell population and the low-stringency CD34-enriched cell population to the subject, wherein one or both of the high-stringency CD34-enriched cell population or the low-stringency CD34-enriched cell population is transduced with the recombinant gene therapy vector; wherein the therapeutic agent is effective in treating the disease or disorder. In particular embodiments, the disease is FA, and the therapeutic agent is a Fanconi anemia complementation group A (FANCA) polypeptide, or a functional variant or fragment thereof. In certain embodiments, all of the cells obtained from each of the two cell populations is administered to the patient. The cells doses of each of the two cell populations may be similar or different, e.g., with more total cells and more total CD34+ cells coming from the low stringency population. In certain embodiments, the cells originally obtained from the patient are divided into two approximately equal populations, one population being processed under high stringency CD34+ selection conditions and one under low stringency CD34+ selection condition, which may result in ~2-fold more CD34+ cells and 5-10-fold more total cells resulting from the low stringency selection process.

In particular embodiments of any of the methods of treatment described herein, the first biological sample and the second biological sample are each independently peripheral blood or bone marrow. In certain embodiments, the first biological sample and the second biological sample are peripheral blood obtained after the subject has been treated with G-CSF, plerixafor, or a combination of G-CSF and plerixafor.

In particular embodiments of the methods of treatment described herein, the selecting for CD34$^+$ cells under high stringency conditions comprises loading the first biological sample onto a column that binds CD34$^+$ cells, washing the loaded column one or more times using a wash buffer, and eluting the high-stringency CD34-enriched cell population from the column using an elution buffer. In an embodiment, the applying step is performed at 5-10 mL/min, 5-15 mL/min, 15-20 mL/min, 20-25 mL/min, or 25-30 mL/min. In an embodiment, the eluting step is performed at 5-10 mL/min, 5-15 mL/min, 15-20 mL/min, 25-25 mL/min, or 25-30 mL/min. In an embodiment, the applying step is performed at 10-20 mL/min. In an embodiment, the eluting step is performed at 20 mL/min.

In particular embodiments of the methods of treatment described herein, the selecting for CD34$^+$ cells under low stringency conditions comprises of loading the second biological sample onto a column that binds CD34$^+$ cells, allowing the second biological sample to flow through the column, and eluting the low-stringency CD34-enriched cell population from the column using an elution buffer. In an embodiment, the applying step is performed at 5-10 mL/min, 5-15 mL/min, 15-20 mL/min, 20-25 mL/min, or 25-30 mL/min. In an embodiment, the eluting step is performed at 5-10 mL/min, 5-15 mL/min, 15-20 mL/min, 25-25 mL/min, or 25-30 mL/min. In an embodiment, the applying step is performed at 10-20 mL/min. In an embodiment, the eluting step is performed at 20 mL/min.

In particular embodiments of the methods of treatment described herein, the high-stringency CD34-enriched cell population is transduced and/or the low-stringency CD34-enriched cell population is transduced.

In some embodiments, the subject methods result in a therapeutic benefit, e.g., preventing the development of a disorder, halting the progression of a disorder, reversing the progression of a disorder, etc. For example, in one embodiment, the disorder is FA. In another embodiment, the disease or disorder is BMF. In one embodiment, the disorder is thrombocytopenia. In another embodiment, the disorder is leukopenia. In one embodiment, the disorder is pancytopenia. In one embodiment, the disorder is neutropenia. In another embodiment, the disorder is anemia. In some embodiments, the subject method comprises the step of detecting that a therapeutic benefit has been achieved. The ordinarily skilled artisan will appreciate that such measures of therapeutic efficacy will be applicable to the particular disease being modified, and will recognize the appropriate detection methods to use to measure therapeutic efficacy.

As described in further detail in the Examples, clinical data with bone marrow cells mobilized into peripheral blood biological samples and administered according to methods of the present invention have demonstrated, unexpectedly, more rapid, in vivo selection engraftment kinetics relative to the other FA patients transplanted by prior art methods. In particular embodiments, methods and composition of the present disclosure are used to treat FA.

Accordingly, the present invention provides methods for treatment of FA, or one or more of the hematological manifestations of FA. In one embodiment, the hematological manifestation of FA is selected from one or more of bone marrow failure (BMF), thrombocytopenia, leukopenia, pancytopenia, neutropenia, and anemia. In a particular embodiment, the hematological manifestation is BMF, which appears in pediatric ages in most FA patients. In one embodiment, the hematological manifestation is thrombocytopenia. In another embodiment, the hematological manifestation is leukopenia. In one embodiment, the hematological manifestation is pancytopenia. In one embodiment, the hematological manifestation is neutropenia. In another embodiment, the hematological manifestation is anemia. In one embodiment, the hematological manifestation is a combination of two or more of BMF, thrombocytopenia, leukopenia, pancytopenia, neutropenia, and anemia.

It is also an object of the present invention to repair endogenous FANC genes (e.g. FANCA, FANCC, and/or FANCG) using a CRISPR/Cas gene editing system or the like. Cas9-mediated repair of genes related to Fanconi anemia has been demonstrated in vitro, e.g. Obsorn et al. Fanconi anemia gene editing by the CRISPR/Cas9 system. Hum Gene Ther. 2015 February; 26(2):114-26. The present invention provides methods for treating Fanconi anemia and method of preparing genetically modified cells that result in improved in vivo efficiency of repair and improved reconstitution of bone marrow. In some cases, the gene editing system repairs a single nucleotide polymorphism, a deletion, an insertion, an indel, or another genetic defect. The repair is in some cases directed to a coding region of a gene, an intron, or an upstream or downstream region, such as a gene-regulatory region of the genome proximal or distant from a gene associated with a disease or disorder.

In one embodiment of the methods of the present invention, the disclosure provides a method for treating Fanconi anemia in a subject in need thereof that comprises preparing a high-stringency CD34-enriched cell population from a first biological sample obtained from the subject by selecting for CD34⁺ cells under high stringency conditions; preparing a low-stringency CD34-enriched cell population from a second biological sample obtained from the subject by selecting for CD34⁺ cells under low stringency conditions, contacting one or both of the high-stringency CD34-enriched cell population or the low-stringency CD34-enriched cell population with a recombinant gene therapy vector for Fanconi anemia; and administering the high-stringency CD34-enriched cell population and the low-stringency CD34-enriched cell population to the subject, wherein one or both of the high-stringency CD34-enriched cell population or the low-stringency CD34-enriched cell population is contacted with the recombinant gene therapy vector; and wherein the gene therapy vector comprises a gene editing system capable of directed repair of an endogenous gene, thereby treating the Fanconi anemia. In some cases, the gene editing system is a CRISPR-Cas system (e.g. CRISPR-Cas9).

In some embodiments, the gene editing system comprises a nucleic acid encoding a Cas, Cas9, or spCas gene product (such as an mRNA, cDNA, plasmid, or the like) operatively linked to a promoter. In some embodiments, the gene editing system comprises a nucleic acid encoding a Cas, Cas9, or spCas protein. In some cases, the gene therapy vector is liposome or lipid nanoparticle or other lipid-based or lipid-like delivery system. In some cases, the gene therapy vector is a virus, such as a lentivirus, adenovirus, or adeno-associated virus. In some embodiments, the gene editing system comprises a guide RNA, e.g. a single-guide RNA (sgRNA), and optionally, a repair template. The repair template and the guide RNA are in some cases distinct molecules or in some cases the same molecule. The repair template and the guide RNA can be covalently or non-covalently linked. The guide RNA is in some cases pre-loaded into a Cas, Cas9, or spCas protein. The components of the gene editing system are in some cases delivered in a single gene therapy vector. In some cases, the gene editing system is delivered in distinct gene therapy vectors. Multiple gene therapy vectors can be used. For example, and without limitation, multiple genetic lesions can be repaired with the same or with different gene therapy vectors. In some cases, two or more FANC genes are repaired simultaneously. In some cases, one gene therapy vector is contacted with the high-stringency CD34-enriched cell populations and another gene therapy vector is contacted with the low-stringency CD34-enriched cell populations. In some cases, the two gene therapy vectors are the same. In some cases, one gene therapy vector comprises a transgene for a disorder associated with a given gene (e.g. FANCA) and the other gene therapy vector comprises a gene editing system.

In some cases, the gene therapy vector provides a transgene for, or repairs, a gene other than a gene associated with a disease or disorder. For example, without limitation, the gene therapy vector may up or down regulate immune effector genes, may alter cell surface markers, may provide alternate MHC molecules or may encode immunoglobulin genes. It is particularly contemplated that in some cases the gene therapy vector or vectors provide for use of allogenic or unmatch donor transplant, such as by altering immune markers (e.g HLA or MHC genes) or causing expression of immune effector genes.

In some embodiments, the disclosure provides a method of treating a disease or disorder in a subject in need thereof, comprising providing to the subject a combination of a high-stringency CD34-enriched cell population and a low-stringency CD34-enriched cell population, both prepared from one or more biological sample obtained from a subject wherein the CD34 cells obtained from the subject comprise one or more gene mutation associated with or causative of the disease or disorder, and wherein one or both of the high-stringency CD34-enriched cell population or the low-stringency CD34-enriched cell population is subjected to gene editing to repair the one or more gene mutation prior to providing the cell populations to the subject. In certain embodiments, the gene editing is performed by contacting the one or both CD34-enriched cell population with a Cas (e.g. Cas9 or spCas) protein; a guide RNA (e.g., single guide RNA, sgRNA); and a repair template. In particular embodiments, the disease is FA, and the gene mutation that is repaired is a mutation in a Fanconi anemia complementation group A (FANCA) gene.

In certain embodiments, gene therapy vector disclosed herein comprise a polynucleotide comprising a promoter operably linked to a sequence encoding a therapeutic agent, i.e., a coding sequence. As used here, the term "operably linked" means that the promoter is capable of driving expression of the sequence encoding the therapeutic agent.

In some embodiments, the polynucleotide comprises one or more enhancers. Enhancers are nucleic acid elements known in the art to enhance transcription, and can be located anywhere in association with the gene they regulate, e.g. upstream, downstream, within an intron, etc. Any enhancer element can be used in the polynucleotide cassettes and gene therapy vectors of the present disclosure, so long as it enhances expression of the gene when used in combination with the promoter.

The coding sequence to be expressed in the cells can be any polynucleotide sequence, e.g. gene or cDNA that encodes a gene product, e.g. a polypeptide or RNA-based therapeutic (siRNA, antisense, ribozyme, shRNA, etc.). The coding sequence may be heterologous to the promoter sequence to which it is operably linked, i.e. not naturally operably associated with it. Alternatively, the coding sequence may be endogenous to the promoter sequence to which it is operably linked, i.e. is associated in nature with that promoter. The gene product may act intrinsically in the mammalian cell, or it may act extrinsically, e.g., it may be secreted. For example, when the transgene is a therapeutic gene, the coding sequence may be any gene that encodes a desired gene product or functional fragment or variant thereof that can be used as a therapeutic for treating a disease or disorder. In various embodiments, the transgene encodes human FANCA.

In one embodiment of the invention, the transgene coding sequence is modified, or "codon optimized" to enhance expression by replacing infrequently represented codons with more frequently represented codons. The coding sequence is the portion of the mRNA sequence that encodes the amino acids for translation. During translation, each of 61 trinucleotide codons are translated to one of 20 amino acids, leading to a degeneracy, or redundancy, in the genetic code. However, different cell types, and different animal species, utilize tRNAs (each bearing an anticodon) coding for the same amino acids at different frequencies. When a gene sequence contains codons that are infrequently represented by the corresponding tRNA, the ribosome translation machinery may slow, impeding efficient translation. Expression can be improved via "codon optimization" for a particular species, where the coding sequence is altered to encode the same protein sequence, but utilizing codons that are highly represented, and/or utilized by highly expressed human proteins (Cid-Arregui et al., 2003; J. Virol. 77: 4928). In one aspect of the present invention, the coding sequence of the transgene is modified to replace codons infrequently expressed in mammal or in primates with codons frequently expressed in primates. For example, in some embodiments, the coding sequence encoded by the transgene encodes a polypeptide having at least 85% sequence identity to a polypeptide encoded by a sequence disclosed above or herein, for example at least 90% sequence identity, e.g. at least 95% sequence identity, at least 98% identity, at least 99% identity, wherein at least one codon of the coding sequence has a higher tRNA frequency in humans than the corresponding codon in the sequence disclosed above or herein.

In an additional embodiment of the invention, the transgene coding sequence is modified to enhance expression by termination or removal of open reading frames (ORFs) that do not encode the desired transgene. An open reading frame (ORF) is the nucleic acid sequence that follows a start codon and does not contain a stop codon. ORFs may be in the forward or reverse orientation, and may be "in frame" or "out of frame" compared with the gene of interest. Such open reading frames have the potential to be expressed in an expression cassette alongside the gene of interest, and could lead to undesired adverse effects. In one aspect of the present invention, the coding sequence of the transgene has been modified to remove open reading frames by further altering codon usage. This may be done by eliminating start codons (ATG) and introducing stop codons (TAG, TAA, or TGA) in reverse orientation or out-of-frame ORFs, while preserving the amino acid sequence and maintaining highly utilized codons in the gene of interest (i.e., avoiding codons with frequency <20%). In the present disclosure, the transgene coding sequence may be optimized by either of codon optimization and removal of non-transgene ORFs or using both techniques. As will be apparent to one of ordinary skill in the art, it is preferable to remove or minimize non-transgene ORFs after codon optimization in order to remove ORFs introduced during codon optimization.

The present disclosure includes plasmids comprising an expression cassette or transfer cassette described herein. In particular embodiments, the plasmid is pCCL-PGK-FANCA-WPRE* (SEQ ID NO: 24) and/or the plasmid comprises the expression cassette from pCCL-PGK-FANCA-WPRE (SEQ ID NO: 25).

In certain embodiments, a gene therapy vector or gene transfer cassette therein comprises one or more additional elements, e.g., one or more elements selected from the following: 5' LTR, 3'LTR, cPPT, CTS, RRE, enhancer sequences, and packaging signals. In some embodiments, the gene therapy vector or gene transfer cassette is any vector or cassette disclosed in Int'l Pat. Pub. No. WO 2018/049273 A1, the disclosure of which is incorporated herein in its entirety for all purposes. Polynucleotide sequences encoding a Fanconi anemia complementation group (FANC) polypeptide include those disclosed in U.S. Pat. No. 5,952,190, the disclosure of which is incorporated herein in its entirety for all purposes.

The RRE sequence improves the efficiency of gene transfer. In particular embodiments of any of the expression cassettes and gene therapy vectors described herein, the RRE sequence comprises or consists of any of the following sequences, or sequences having at least 80%, at least 85%, at least 90%, at least 95%, at least 98%, or at least 99% identity to the following sequences (all displayed in the 5' to 3' orientation):

(SEQ ID NO: 1)
AGGAGCTTTGTTCCTTGGGTTCTTGGGAGCAGCAGGAAGCACTATGGGCG

CAGCGTCAATGACGCTGACGGTACAGGCCAGACAATTATTGTCTGGTATA

GTGCAGCAGCAGAACAATTTGCTGAGGGCTATTGAGGCGCAACAGCATCT

GTTGCACTCACAGTCTGGGGCATCAAGCAGCTCCAGGCAAGAATCCTGGC

TGTGGAAAGATACCTAAAGGATCAACAGCTCCT;

(SEQ ID NO: 26)
GATCTTCAGACCTGGAGGAGGAGATATGAGGGACAATTGGAGAAGTGAAT

TATATAAATATAAAGTAGTAAAAATTGAACCATTAGGAGTAGCACCCACC

AAGGCAAAGAGAAGAGTGGTGCAGAGAGAAAAAAGAGCAGTGGGAATAGG

AGCTTTGTTCCTTGGGTTCTTGGGAGCAGCAGGAAGCACTATGGGCGCAG

CGTCAATGACGCTGACGGTACAGGCCAGACAATTATTGTCTGGTATAGTG

CAGCAGCAGAACAATTTGCTGAGGGCTATTGAGGCGCAACAGCATCTGTT

GCAACTCACAGTCTGGGGCATCAAGCAGCTCCAGGCAAGAATCCTGGCTG

TGGAAAGATACCTAAAGGATCAACAGCTCCTGGGGATTTGGGGTTGCTCT

GGAAAACTCATTTGCACCACTGCTGTGCCTTGGAATGCTAGTTGGAGTAA

TAAATCTCTGGAACAGATTTGGAATCACACGACCTGGATGGAGTGGGACA

GAGAAATTAACAATTACACAAGCTTAATACACTCCTTAATTGAAGAATCG

CAAAACCAGCAAGAAAAGAATGAACAAGAATTATTGGAATTAGATAAATG

GGCAAGTTTGTGGAATTGGTTTAACATAACAAATTGGCTGTGGTATATAA

AATTATTCATAATGATAGTAGGAGGCTTGGTAGGTTTAAGAATAGTTTTT

GCTGTACTTTCTATAGTGAATAGAGTTAGGCAGGGATATTCACCATTATC

GTTTCAGACCCACCTCCCAACCCCGAGGGGACCCGACAGGCCCGAAGGAA

TAGAAGAAGAAGGTGGAGAGAGAGACAGAGACAGATCCATTCGATTAGTG

AACGGATC;

or a sequence comprising or consisting of nucleotides 2649-2882 of SEQ ID NO:24.

The retroviral leader region contains the packaging signal (Ψ), which is involved in packaging the retroviral genome into the viral capsid. LV vectors were thought to require approximately 300 bp of the Gag gene in this region. Currently, this Gag sequence has been reduced to just 40 bp (FIG. 1). In particular embodiments of any of the expression cassettes and gene therapy vectors described herein, the ψ sequence is an HIV-1 ψ sequence or the ψ sequence comprises or consists of any of the following sequences, or sequences having at least 80%, at least 85%, at least 90%, at least 95%, at least 98%, or at least 99% identity to the following sequences:

(SEQ ID NO: 2)
CTCTCTCGACGCAGGACTCGGCTTGCTGAAGCGCGCACGGCAAGAGGCGA

GGGGCGGCGACTGGTGAGTACGCCAAAAATTTTGACTAGCGGAGGCTAGA

AGGAGAGAGATGGGTGCGAGAGCGTC;

(SEQ ID NO: 27)
TGAGTACGCCAAAAATTTTGACTAGCGGAGGCTAGAAGGAGAGA;

or a sequence comprising or consisting of polynucleotides 2031-2156 of SEQ ID NO:24.

In particular embodiments of any of the expression cassettes and gene therapy vectors described herein, the truncated HIV-1 5' LTR comprises or consists of any of the following sequences, or sequences having at least 80%, at least 85%, at least 90%, at least 95%, at least 98%, or at least 99% identity to any of the following sequences:

(SEQ ID NO: 3)
GGGTCTCTCTGGTTAGACCAGATCTGAGCCTGGGAGCTCTCTGGCTAAC

TAGGGAACCCACTGCTTAAGCCTCAATAAAGCTTGCCTTGAGTGCTTCA

AGTAGTGTGTGCCCGTCTGTTGTGTGACTCTGGTAACTAGAGATCCCTC

AGACCCTTTTAGTCAGTGTGGAAAATCTCTAGCA;

(SEQ ID NO: 28)
GTCTCTCTGGTTAGACCAGATCTGAGCCTGGGAGCTCTCTGGCTAACTA

GGGAACCCACTGCTTAAGCCTCAATAAAGCTTGCCTTGAGTGCTTCAAG

TAGTGTGTGCCCGTCTGTTGTGTGACTCTGGTAACTAGAGATCCCTCAG

ACCCTTTTAGTCAGTGTGGAAAATCTCTAGCAGTGGCGCCC;

or a sequence comprising or consisting of polynucleotides 1804-1984 of SEQ ID NO:24.

In particular embodiments of any of the expression cassettes and gene therapy vectors described herein, the HIV-1 self-inactivating 3' LTR comprises or consists of any of the following sequences, or sequences having at least 80%, at least 85%, at least 90%, at least 95%, at least 98%, or at least 99% identity to the following sequences:

(SEQ ID NO: 4)
TGGAAGGGCTAATTCACTCCCAACGAAGACAAGATCTGCTTTTTGCTTG

TACTGGGTCTCTCTGGTTAGACCAGATCTGAGCCTGGGAGCTCTCTGGC

TAACTAGGGAACCCACTGCTTAAGCCTCAATAAAGCTTGCCTTGAGTGC

TTCAAGTAGTGTGTGCCCGTCTGTTGTGTGACTCTGGTAACTAGAGATC

CCTCAGACCCTTTTAGTCAGTGTGGAAAATCTCTAGCA;

(SEQ ID NO: 29)
TGGAAGGGCTAATTCACTCCCAACGAAGACAAGATCTGCTTTTTGCTTG

TACTGGGTCTCTCTGGTTAGACCAGATCTGAGCCTGGGAGCTCTCTGGC

TAACTAGGGAACCCACTGCTTAAGCCTCAATAAAGCTTGCCTTGAGTGC

TTCAAGTAGTGTGTGCCCGTCTGTTGTGTGACTCTGGTAACTAGAGATC

CCTCAGACCCTTTTAGTCAGTGTGGAAAATCTCTAGCA;

or a sequence comprising or consisting of polynucleotides 9262-9495 of SEQ ID NO:24.

In particular embodiments of any of the expression cassettes and gene therapy vectors described herein, the human cytomegalovirus (CMV) immediate early promoter comprises or consists of any of the following sequences, a functional fragment thereof, or a sequence having at least 80%, at least 85%, at least 90%, at least 95%, at least 98%, or at least 99% identity to any of the following sequences:

(SEQ ID NO: 5)
GTGATGCGGTTTTGGCAGTACATCAATGGGCGTGGATAGCGGTTTGACT

CACGGGGATTTCCAAGTCTCCACCCCATTGACGTCAATGGGAGTTTGTT

TTGGCACCAAAATCAACGGGACTTTCCAAAATGTCGTAACAACTCCGCC

CCATTGACGCAAATGGGCGGTAGGCGTGTACGGTGGGAGGTCTATATAA

GCAGAGCT;

(SEQ ID NO: 30)
ACATTGATTATTGACTAGTTATTAATAGTAATCAATTACGGGGTCATTA

GTTCATAGCCCATATATGGAGTTCCGCGTTACATAACTTACGGTAAATG

GCCCGCCTGGCTGACCGCCCAACGACCCCCGCCCATTGACGTCAATAAT

GACGTATGTTCCCATAGTAACGCCAATAGGGACTTTCCATTGACGTCAA

TGGGTGGAGTATTTACGGTAAACTGCCCACTTGGCAGTACATCAAGTGT

ATCATATGCCAAGTACGCCCCCTATTGACGTCAATGACGGTAAATGGCC

CGCCTGGCATTATGCCCAGTACATGACCTTATGGGACTTTCCTACTTGG

CAGTACATCTACGTATTAGTCATCGCTATTACCATGGTGATGCGGTTTT

GGCAGTACATCAATGGGCGTGGATAGCGGTTTGACTCACGGGGATTTCC

AAGTCTCCACCCCATTGACGTCAATGGGAGTTTGTTTTGGCACCAAAAT

CAACGGGACTTTCCAAAATGTCGTAACAACTCCGCCCCATTGACGCAAA

TGGGCGGTAGGCGTGTACGGTGGGAGGTCTATATAAGC or a sequence comprising or consisting of polynucleotides 1586-1789 of SEQ ID NO:24.

In particular embodiments of any of the expression cassettes and gene therapy vectors described herein, the Rous sarcoma virus (RSV) promoter comprises or consists of any of the following sequences, a functional fragment thereof, or a sequence having at least 80%, at least 85%, at least 90%, at least 95%, at least 98%, or at least 99% identity to any of the following sequences:

(SEQ ID NO: 31)
TTAATGTAGTCTTATGCAATACTCTTGTAGTCTTGCAACATGGTAACGA

TGAGTTAGCAACATGCCTTACAAGGAGAGAAAAAGCACCGTGCATGCCG

ATTGGTGGAAGTAAGGTGGTACGATCGTGCCTTATTAGGAAGGCAACAG

ACGGGTCTGACATGGATTGGACGAACCACTGAATTGCCGCATTGCAGAG

ATATTGTATTTAAGTGCCTAGCTCGATACAATAAACG.

The cPPT, which facilitates nuclear translocation of the pre-integration complexes, together with the CTS involved in the separation of reverse transcriptase, has been seen to improve viral titer (Zennou, et al. 2000; Follenzi et al. 2000). In particular embodiments of any of the expression cassettes and gene therapy vectors described herein, the central polypurine tract and central termination sequence of HIV-1 (cPPT/CTS) comprises or consists of any of the following sequences, a functional fragment thereof, or a sequence having at least 80%, at least 85%, at least 90%, at least 95%, at least 98%, or at least 99% identity to any of the following sequences:

(SEQ ID NO: 6)
TTTTAAAAGAAAAGGGGGATTGGGGGGTACAGTGCAGGGGAAAGAATA

GTAGACATAATAGCAACAGACATACAAACTAAAGAATTACAAAAACAAA

TTACAAAAATTCAAAATTTT;

(SEQ ID NO: 12)
TTTAAAAGAAAAGGGGGGATTGGGGGGT;

(SEQ ID NO: 32)
AAAAGAAAAGGGGGGA;

```
                                    (SEQ ID NO: 33)
TTGGGGGGTACAGTGCAGGGGAAAGAATAGTAGACATAATAGCAACAGA

CATACAAACTAAAGAATTACAAAAACAAATTACAAAAATTCAAAATTTT

ATCGATCACGAGACTAGCCTCGA
``` or a sequence comprising or consisting of nucleotides 3378-3495 of SEQ ID NO:24.

In particular embodiments of any of the expression cassettes and gene therapy vectors described herein, the human phosphoglycerate kinase 1 (hPGK) promoter comprises or consists of any of the following sequences, a functional fragment thereof, or a sequence having at least 80%, at least 85%, at least 90%, at least 95%, at least 98%, or at least 99% identity to any of the following sequences:

```
                                    (SEQ ID NO: 7)
GGGGTTGGGGTTGCGCCTTTTCCAAGGCAGCCCTGGGTTTGCGCAGGGA

CGCGGCTGCTCTGGGCGTGGTTCCGGGAAACGCAGCGGCGCCGACCCTG

GGTCTCGCACATTCTTCACGTCCGTTCGCAGCGTCACCCGGATCTTCGC

CGCTACCCTTGTGGGCCCCCGGCGACGCTTCCTGCTCCGCCCCTAAGT

CGGGAAGGTTCCTTGCGGTTCGCGGCGTGCCGGACGTGACAAACGGAAG

CCGCACGTCTCACTAGTACCCTCGCAGACGGACAGCGCCAGGGAGCAAT

GGCAGCGCGCCGACCGCGATGGGCTGTGGCCAATAGCGGCTGCTCAGCA

GGGCGCGCCGAGAGCAGCGGCCGGGAAGGGGCGGTGCGGGAGGCGGGGT

GTGGGCGGTAGTGTGGGCCCTGTTCCTGCCCGCGCGGTGTTCCGCATT

CTGCAAGCCTCCGGAGCGCACGTCGGCAGTCGGCTCCCTCGTTGACCGA

ATCACCGACCTCTCTCCCCAG;
``` or a sequence comprising or consisting of nucleotides 3541-4051 of SEQ ID NO:24 or nucleotides 1-511 of SEQ ID NO:25.

In certain embodiments, expression cassettes and gene therapy vectors disclosed herein further comprises one or more additional elements, e.g., a CMV promoter and/or enhancer, an SV40 polyA sequence, an origin of replication, e.g., an SV40 on sequence, or any of the elements disclosed herein.

In particular embodiments of expression cassettes and gene therapy vectors described herein, the human CMV enhancer comprises or consists of the following sequence, a functional fragment thereof, or a sequence having at least 80%, at least 85%, at least 90%, at least 95%, at least 98%, or at least 99% identity to the following sequence:

```
                                    (SEQ ID NO: 9)
GACATTGATTATTGACTAGTTATTAATAGTAATCAATTACGGGGTCATTA

GTTCATAGCCCATATATGGAGTTCCGCGTTACATAACTTACGGTAAATGG

CCCGCCTGGCTGACCGCCCAACGACCCCCGCCCATTGACGTCAATAATGA

CGTATGTTCCCATAGTAACGCCAATAGGGACTTTCCATTGACGTCAATGG

GTGGAGTATTTACGGTAAACTGCCCACTTGGCAGTACATCAAGTGTATCA

TATGCCAAGTACGCCCCCTATTGACGTCAATGACGGTAAATGGCCCGCCT

GGCATTATGCCCAGTACATGACCTTATGGGACTTTCCTACTTGGCAGTAC

ATCTACGTATTAGTCATCGCTATTACCATG.
```

In particular embodiments of any of the expression cassettes and gene therapy vectors described herein described herein, the simian virus 40 (SV40) poly(A) signal comprises or consists of the following sequence, a functional fragment thereof, or a sequence having at least 80%, at least 85%, at least 90%, at least 95%, at least 98%, or at least 99% identity to the following sequence:

```
                                    (SEQ ID NO: 10)
AACTTGTTTATTGCAGCTTATAATGGTTACAAATAAAGCAATAGCATCAC

AAATTTCACAAATAAAGCATTTTTTTCACTGCATTCTAGTTGTGGTTTGT

CCAAACTCATCAATGTATCTTA.
```

In particular embodiments of any of the expression cassettes and gene therapy vectors described herein described herein, the SV40 origin of replication comprises or consists of the following sequence, a functional fragment thereof, or a sequence having at least 80%, at least 85%, at least 90%, at least 95%, at least 98%, or at least 99% identity to the following sequence:

```
                                    (SEQ ID NO: 11)
ATCCCGCCCCTAACTCCGCCCAGTTCCGCCCATTCTCCGCCCCATGGCTG

ACTAATTTTTTTTATTTATGCAGAGGCCGAGGCCGCCTCGGCCTCTGAGC

TATTCCAGAAGTAGTGAGGAGGCTTTTTTGGAGGCC;

(SEQ ID NO: 34)
GGCCTCCAAAAAAGCCTCCTCACTACTTCTGGAATAGCTCAGAGGCCGAG

GCGGCCTCGGCCTCTGCATAAATAAAAAAAATTAGTCAGCCATGGGGCGG

AGAATGGGCGGAACTGGGCGGAGTTAGGGGCGGGATGGGCGGAGTTAGGG

GCGGGA.
```

In some embodiments of any of the expression cassettes and gene therapy vectors described herein described herein, the dNEF signal present in any of the expression cassettes or gene therapy vectors described herein comprises or consists of the following sequence, a functional fragment thereof, or a sequence having at least 80%, at least 85%, at least 90%, at least 95%, at least 98%, or at least 99% identity to the following sequence:

```
                                    (SEQ ID NO: 13)
GAATTCGAGCTCGGTACCTTTAAGACCAATGACTTACAAGGCAGCTGTAG

ATCTTAGCCACTTTTTAAAAGAAAAGGGGGAC.
```

In particular embodiments of any of the expression cassettes and gene therapy vectors described herein described herein, the KanR sequence present in any of the expression cassettes or gene therapy vectors described herein comprises or consists of the following sequence:

```
                                    (SEQ ID NO: 14)
ATGATTGAACAAGATGGATTGCACGCAGGTTCTCCGGCGGCTTGGGTGGA

GAGGCTATTCGGCTATGACTGGGCACAACAGACAATCGGCTGCTCTGATG

CCGCCGTGTTCCGGCTGTCAGCGCAGGGGCGTCCGGTTCTTTTTGTCAAG

ACCGACCTGTCCGGTGCCCTGAATGAACTGCAAGACGAGGCAGCGCGGCT
```

```
ATCGTGGCTGGCGACGACGGGCGTTCCTTGCGCGGCTGTGCTCGACGTTG

TCACTGAAGCGGGAAGGGACTGGCTGCTATTGGGCGAAGTGCCGGGGCAG

GATCTCCTGTCATCTCACCTTGCTCCTGCCGAGAAAGTATCCATCATGGC

TGATGCAATGCGGCGGCTGCATACGCTTGATCCGGCTACCTGCCCATTCG

ACCACCAAGCGAAACATCGCATCGAGCGAGCACGTACTCGGATGGAAGCC

GGTCTTGTCGATCAGGATGATCTGGACGAAGAGCATCAGGGGCTCGCGCC

AGCCGAACTGTTCGCCAGGCTCAAGGCGTCTATGCCCGACGGCGAGGATC

TCGTCGTGACCCACGGCGATGCCTGCTTGCCGAATATCATGGTGGAAAAT

GGCCGCTTTTCTGGATTCATCGACTGTGGCCGTCTGGGTGTGGCGGACCG

CTATCAGGACATAGCGTTGGCTACCCGTGATATTGCTGAAGAGCTTGGCG

GCGAATGGGCTGACCGCTTCCTTGTGCTTTACGGTATCGCCGCGCCCGAT

TCGCAGCGCATCGCCTTCTATCGCCTTCTTGACGAGTTCTTCTGA.
```

In particular embodiments of any of the expression cassettes and gene therapy vectors described herein described herein, the RNA-OUT sequence present in any of the expression cassettes or gene therapy vectors described herein comprises or consists of the following sequence:

```
                                    (SEQ ID NO: 35)
GTAGAATTGGTAAAGAGAGTCGTGTAAAATATCGAGTTCGCACATCTTGT

TGTCTGATTATTGATTTTTGGCGAAACCATTTGATCATATGACAAGATGT

GTATCTACCTTAACTTAATGATTTTGATAAAAATCATTAGG.
```

In some embodiments of any of the expression cassettes and gene therapy vectors described herein described herein, the rrnG terminator (transcription terminator from the E. coli ribosomal RNA rrnG operon (Albrechtsen et al., 1991) present in any of the expression cassettes or gene therapy vectors described herein comprises or consists of the following sequence:

```
                                    (SEQ ID NO: 15)
GCATTGGCGCAGAAAAAAATGCCTGATGCGACGCTGCGCGTCTTATACTC

CCACATATGCCAGATTCAGCAACGGATACGGCTTCCCCAACTTGCCCACT

TCCATACGTGTCCTCCTTACCAGAAATTTATCCTTAA
```

In some embodiments of any of the expression cassettes and gene therapy vectors described herein, the ori (high-copy-number ColE1/pMB1/pBR322/pUC origin of replication) present in any of the expression cassettes or gene therapy vectors described herein comprises or consists of the following sequence, a functional fragment thereof, or a sequence having at least 80%, at least 85%, at least 90%, at least 95%, at least 98%, or at least 99% identity to the following sequence:

```
                                    (SEQ ID NO: 16)
TTGAGATCCTTTTTTTCTGCGCGTAATCTGCTGCTTGCAAACAAAAAAAC

CACCGCTACCAGCGGTGGTTTGTTTGCCGGATCAAGAGCTACCAACTCTT

TTTCCGAAGGTAACTGGCTTCAGCAGAGCGCAGATACCAAATACTGTTCT

TCTAGTGTAGCCGTAGTTAGGCCACCACTTCAAGAACTCTGTAGCACCGC

CTACATACCTCGCTCTGCTAATCCTGTTACCAGTGGCTGCTGCCAGTGGC

GATAAGTCGTGTCTTACCGGGTTGGACTCAAGACGATAGTTACCGGATAA

GGCGCAGCGGTCGGGCTGAACGGGGGGTTCGTGCACACAGCCCAGCTTGG

AGCGAACGACCTACACCGAACTGAGATACCTACAGCGTGAGCTATGAGAA

AGCGCCACGCTTCCCGAAGGGAGAAAGGCGGACAGGTATCCGGTAAGCGG

CAGGGTCGGAACAGGAGAGCGCACGAGGGAGCTTCCAGGGGGAAACGCCT

GGTATCTTTATAGTCCTGTCGGGTTTCGCCACCTCTGACTTGAGCGTCGA

TTTTTGTGATGCTCGTCAGGGGGCGGAGCCTATGGAAA (SEQ ID NO: 37)
GGAGTCAGGCAACTATGGATGAACGAAATAGACAGATCGCTGAGATAGGT

GCCTCACTGATTAAGCATTGGTAACTGTCAGACCAAGTTTACTCATATAT

ACTTTAGATTGATTTAAAACTTCATTTTTAATTTAAAAGGATCTAGGTGA

AGATCCTTTTTGATAATCTCATGACCAAAATCCCTTAACGTGAGTTTTCG

TTCCACTGAGCGTCAGACCCCGTAGAAAAGATCAAAGGATCTTCTTGAGA

TCCTTTTTTTCTGCGCGTAATCTGCTGCTTGCAAACAAAAAAACCACCGC

TACCAGCGGTGGTTTGTTTGCCGGATCAAGAGCTACCAACTCTTTTTCCG

AAGGTAACTGGCTTCAGCAGAGCGCAGATACCAAATACTGTTCTTCTAGT

GTAGCCGTAGTTAGGCCACCACTTCAAGAACTCTGTAGCACCGCCTACAT

ACCTCGCTCTGCTAATCCTGTTACCAGTGGCTGCTGCCAGTGGCGATAAG

TCGTGTCTTACCGGGTTGGACTCAAGACGATAGTTACCGGATAAGGCGCA

GCGGTCGGGCTGAACGGGGGGTTCGTGCACACAGCCCAGCTTGGAGCGAA

CGACCTACACCGAACTGAGATACCTACAGCGTGAGCTATGAGAAAGCGCC

ACGCTTCCCGAAGGGAGAAAGGCGGACAGGTATCCGGTAAGCGGCAGGGT

CGGAACAGGAGAGCGCACGAGGGAGCTTCCAGGGGGAAACGCCTGGTATC

TTTATAGTCCTGTCGGGTTTCGCCACCTCTGACTTGAGCGTCGATTTTTG

TGATGCTCGTCAGGGGGCGGAGCCTATGGAAAAACGCCAGCAACGCGGC

CTTTTTACGGTTCCTGGCCTTTTGCTGGCCTTTTGCTCACATGTTCTTTC

CTGCGTTATCCCCTGATTCTGTGGATAACCGTATTACCGCCTTTGAGTGA

GCTGATACCGCTCGCCGCAGCCGAACGACCGAGCGCAGCGAGTCAGTGAG

CGAGGAAGCGGAAGA;
``` or a sequence comprising or consisting of nucleotides 9731-9871 of SEQ ID NO: 24.

In some embodiments of any of the expression cassettes and gene therapy vectors described herein described herein, the CAP binding site present in any of the expression cassettes or gene therapy vectors described herein comprises or consists of the following sequence, a functional fragment thereof, or a sequence having at least 80%, at least 85%, at least 90%, at least 95%, at least 98%, or at least 99% identity to the following sequence:

```
                                    (SEQ ID NO: 17)
TAATGTGAGTTAGCTCACTCAT.
```

In some embodiments of any of the expression cassettes and gene therapy vectors described herein described herein, the E. coli lac promoter present in any of the expression cassettes or gene therapy vectors described herein comprises or consists of the following sequence, a functional fragment thereof, or a sequence having at least 80%, at least 85%, at least 90%, at least 95%, at least 98%, or at least 99% identity to the following sequence:

(SEQ ID NO: 18)
TTTACACTTTATGCTTCCGGCTCGTATGTTG.

In some embodiments of any of the expression cassettes and gene therapy vectors described herein described herein, the lac operator present in any of the expression cassettes or gene therapy vectors described herein comprises or consists of the following sequence, a functional fragment thereof, or a sequence having at least 80%, at least 85%, at least 90%, at least 95%, at least 98%, or at least 99% identity to the following sequence:

(SEQ ID NO: 19)
TTGTGAGCGGATAACAA.

In some embodiments of any of the expression cassettes and gene therapy vectors described herein described herein, the T3 promoter (promoter for bacteriophage T3 RNA polymerase) present in any of the expression cassettes or gene therapy vectors described herein comprises or consists of the following sequence, a functional fragment thereof, or a sequence having at least 80%, at least 85%, at least 90%, at least 95%, at least 98%, or at least 99% identity to the following sequence:

(SEQ ID NO: 20)
AATTAACCCTCACTAAAGG.

In some embodiments of any of the expression cassettes and gene therapy vectors described herein described herein, the T7 promoter (promoter for bacteriophage T7 RNA polymerase) present in any of the expression cassettes or gene therapy vectors described herein comprises or consists of the following sequence, a functional fragment thereof, or a sequence having at least 80%, at least 85%, at least 90%, at least 95%, at least 98%, or at least 99% identity to the following sequence: CCTATAGTGAGTCGTATTA (SEQ ID NO: 21).

In some embodiments of any of the expression cassettes and gene therapy vectors described herein described herein, the f1 ori (f1 bacteriophage origin of replication) present in any of the expression cassettes or gene therapy vectors described herein comprises or consists of the following sequence, a functional fragment thereof, or a sequence having at least 80%, at least 85%, at least 90%, at least 95%, at least 98%, or at least 99% identity to the following sequence:

(SEQ ID NO: 22)
ACGCGCCCTGTAGCGGCGCATTAAGCGCGGCGGGTGTGGTGGTTACGCGC

AGCGTGACCGCTACACTTGCCAGCGCCCTAGCGCCCGCTCCTTTCGCTTT

CTTCCCTTCCTTTCTCGCCACGTTCGCCGGCTTTCCCCGTCAAGCTCTAA

ATCGGGGGCTCCCTTTAGGGTTCCGATTTAGTGCTTTACGGCACCTCGAC

CCCAAAAAACTTGATTAGGGTGATGGTTCACGTAGTGGGCCATCGCCCTG

ATAGACGGTTTTTCGCCCTTTGACGTTGGAGTCCACGTTCTTTAATAGTG

GACTCTTGTTCCAAACTGGAACAACACTCAACCCTATCTCGGTCTATTCT

-continued

TTTGATTTATAAGGGATTTTGCCGATTTCGGCCTATTGGTTAAAAAATGA

GCTGATTTAACAAAAATTTAACGCGAATT.

As discussed herein, the expression cassettes and gene therapy vectors of the present invention may comprise an RNA export signal. Exemplary RNA export sequences include but are not limited to WPRE. The WPRE significantly increases transgene expression in target cells, by increasing RNA stability in a transgene, promoter and vector-independent manner (Zuffrey et al, 1999). However, it can express a truncated 60-amino acid protein derived from the WHV X gene involved in liver cancer (Kingsman et al, 2005). Therefore, most pre-clinical protocols and clinical trials include a mutated version of the WPRE element (Zanta-Boussif et al, 2009). On the other hand, the use of two SV40-USE elements in SIN-LV vectors has been seen to be more efficient than the WPRE sequence in suppressing transcriptional read through (Schambach et al, 2007). More precisely, the WPRE disclosed herein is a chimeric WPRE that carries 589 nucleotides from the modified WPRE performed by Axel Schambach (nucleotides 1-589) (WO 2008136670 A2) and 88 from a former WPRE (nucleotide 590-677) (Zuffrey et al, 1999). Data disclosed herein shows this chimeric WPRE works better than the former WPRE. The chimeric WPRE sequence comprises the following sequence, a functional fragment thereof, or a sequence having at least 80%, at least 85%, at least 90%, at least 95%, at least 98%, or at least 99% identity to the following sequence:

(SEQ ID NO: 23)
CGAGCATCTTACCGCCATTTATTCCCATATTTGTTCTGTTTTTCTTGATT

TGGGTATACATTTAAATGTTAATAAAACAAAATGGTGGGGCAATCATTTA

CATTTTTAGGGATATGTAATTACTAGTTCAGGTGTATTGCCACAAGACAA

ACATGTTAAGAAACTTTCCCGTTATTTACGCTCTGTTCCTGTTAATCAAC

CTCTGGATTACAAAATTTGTGAAAGATTGACTGATATTCTTAACTATGTT

GCTCCTTTTACGCTGTGTGGATATGCTGCTTTAATGCCTCTGTATCATGC

TATTGCTTCCCGTACGGCTTTCGTTTTCTCCTCCTTGTATAAATCCTGGT

TGCTGTCTCTTTATGAGGAGTTGTGGCCCGTTGTCCGTCAACGTGGCGTG

GTGTGCTCTGTGTTTGCTGACGCAACCCCCACTGGCTGGGGCATTGCCAC

CACCTGTCAACTCCTTTCTGGGACTTTCGCTTTCCCCCTCCCGATCGCCA

CGGCAGAACTCATCGCCGCCTGCCTTGCCCGCTGCTGGACAGGGGCTAGG

TTGCTGGGCACTGATAATTCCGTGGTGTTGTCGGGGAAGGGCCTGCTGCC

GGCTCTGCGGCCTCTTCCGCGTCTTCGCCTTCGCCCTCAGACGAGTCGGA

TCTCCCTTTGGGCCGCCTCCCCGCCTG.

In particular embodiments, the mutated WPRE sequence comprises or consists of WPRE*, which corresponds to nucleotides 8502-9178 of SEQ ID NO: 24, or has at least 80%, at least 85%, at least 90%, at least 95%, at least 98%, or at least 99% identity to this region of SEQ ID NO: 24.

Other combinations of elements both as disclosed herein or as known in the art will be readily appreciated by the ordinarily skilled artisan.

Additionally, as will be recognized by one of ordinary skill in the art, the expression cassettes and gene therapy vectors may optionally contain other elements including, but not limited to restriction sites to facilitate cloning and regulatory elements for a particular gene therapy vector.

In some aspects of the present invention, the subject polynucleotide cassettes are used to deliver a gene to cells, e.g. to determine the effect that the gene has on cell viability and/or function, to treat a cell disorder, etc. In various embodiments, delivery of a viral vector to cells by transduction may occur in vitro, ex vivo, or in vitro. Accordingly, in some aspects of the invention, the composition that provides for the expression of a transgene in mammalian cells is a gene therapy vector, wherein the gene therapy vector comprises a polynucleotide cassette, e.g., a gene transfer cassette, of the present disclosure.

The genetic correction of HSCs from FA patients, followed by the autologous transplantation of these cells (hematopoietic gene therapy), is a good alternative for FA patients, particularly those lacking an HLA-identical sibling. In one embodiment, hematopoietic gene therapy is the preferred treatment regimen for a patient lacking an HLA-identical sibling. In another embodiment, hematopoietic gene therapy is a treatment regimen for a patient that has an HLA-identical sibling.

In particular embodiments of any of the methods disclosed herein, the gene therapy vector comprises a polynucleotide sequence encoding a FAC protein, and cells transduced with the vector are provided to a subject to treat FA.

Since most FA patients belong to the FA-A complementation group (Casado et al., 2007, Levitus et al., 2004, Taniguchi et al., 2006), a vector harboring the functional FANCA gene has been developed. The inclusion of a mutated post-transcriptional regulatory element of the woodchuck hepatitis virus (WPRE*), which lacks any residual open reading frame (Schambach A et al. Gene Ther. 2006; 13:641-645) will be used to improve the level of expression and stability of the therapeutic gene.

In some embodiments, a polynucleotide cassette comprises:
(i) a phosphoglycerate kinase (PGK) promoter sequence or a functional variant or fragment thereof;
(ii) a sequence encoding a human FANCA protein or a functional fragment or variant thereof; and:
(iii) a post-transcriptional regulatory element of the woodchuck hepatitis virus (WPRE) sequence.

In some embodiments, a polynucleotide cassette comprises:
(i) a human phosphoglycerate kinase (PGK) promoter sequence;
(ii) a sequence encoding a human FANCA protein; and:
(iii) a mutant WPRE sequence.

In some embodiments, a polynucleotide cassette comprises:
a) a 5' LTR, optionally a modified 5' LTR;
b) a cPPT sequence;
c) PGK promoter sequence, optionally a human PGK promoter sequence;
d) a sequence encoding a human FANCA protein, optionally a cDNA sequence or a codon optimized sequence;
e) a mutant WPRE sequence; and
f) a 3' LTR, optionally a modified 3' LTR.

In one embodiment, the modified WPRE is referred to as WPRE*. WPRE* is a modified WPRE that lacks an open reading frame (see, e.g., Schambach et al, 2006 Gene Ther. 13:641-645).

Since most FA patients belong to the FA-A complementation group (Casado et al., 2007, Levitus et al., 2004, Taniguchi et al., 2006), in particular embodiments, the encoded therapeutic gene product is FANCA, although the disclosure contemplates that FA proteins of other complementation groups may also be delivered, and thus encoded in the expression cassettes disclosed herein, e.g., instead of FANCA.

In particular embodiments of any of the expression cassettes and gene therapy vectors described herein, the polynucleotide sequence encoding a codon optimized FANCA is a human FANCA cDNA sequence that comprises or consists of the following sequence, or a functional fragment thereof, or a sequence having at least 80%, at least 85%, at least 90%, at least 95%, at least 98%, or at least 99% identity to the following sequence:

(SEQ ID NO: 8)
ATGTCCGACTCGTGGGTCCCGAACTCCGCCTCGGGCCAGGACCCAGGGGGCCGCCGGAGGGCCTGGGCCGAGCTG

CTGGCGGGAAGGGTCAAGAGGGAAAAATATAATCCTGAAAGGGCACAGAAATTAAAGGAATCAGCTGTGCGCCTC

CTGCGAAGCCATCAGGACCTGAATGCCCTTTTGCTTGAGGTAGAAGGTCCACTGTGTAAAAAATTGTCTCTCAGC

AAAGTGATTGACTGTGACAGTTCTGAGGCCTATGCTAATCATTCTAGTTCATTTATAGGCTCTGCTTTGCAGGAT

CAAGCCTCAAGGCTGGGGGTTCCCGTGGGTATTCTCTCAGCCGGGATGGTTGCCTCTAGCGTGGGACAGATCTGC

ACGGCTCCAGCGGAGACCAGTCACCCTGTGCTGCTGACTGTGGAGCAGAGAAAGAAGCTGTCTTCCCTGTTAGAG

TTTGCTCAGTATTTATTGGCACACAGTATGTTCTCCCGTCTTTCCTTCTGTCAAGAATTATGGAAAATACAGAGT

TCTTTGTTGCTTGAAGCGGTGTGGCATCTTCACGTACAAGGCATTGTGAGCCTGCAAGAGCTGCTGGAAAGCCAT

CCCGACATGCATGCTGTGGGATCGTGGCTCTTCAGGAATCTGTGCTGCCTTTGTGAACAGATGGAAGCATCCTGC

CAGCATGCTGACGTCGCCAGGGCCATGCTTTCTGATTTTGTTCAAATGTTTGTTTTGAGGGGATTTCAGAAAAAC

TCAGATCTGAGAAGAACTGTGGAGCCTGAAAAAAATGCCGCAGGTCACGGTTGATGTACTGCAGAGAATGCTGATT

TTTGCACTTGACGCTTTGGCTGCTGGAGTACAGGAGGAGTCCTCCACTCACAAGATCGTGAGGTGCTGGTTCGGA

GTGTTCAGTGGACACACGCTTGGCAGTGTAATTTCCACAGATCCTCTGAAGAGGTTCTTCAGTCATACCCTGACT

CAGATACTCACTCACAGCCCTGTGCTGAAAGCATCTGATGCTGTTCAGATGCAGAGAGAGTGGAGCTTTGCGCGG

ACACACCCTCTGCTCACCTCACTGTACCGCAGGCTCTTTGTGATGCTGAGTGCAGAGGAGTTGGTTGGCCATTTG

-continued

```
CAAGAAGTTCTGGAAACGCAGGAGGTTCACTGGCAGAGAGTGCTCTCCTTTGTGTCTGCCCTGGTTGTCTGCTTT

CCAGAAGCGCAGCAGCTGCTTGAAGACTGGGTGGCGCGTTTGATGGCCCAGGCATTCGAGAGCTGCCAGCTGGAC

AGCATGGTCACTGCGTTCCTGGTTGTGCGCCAGGCAGCACTGGAGGGCCCCTCTGCGTTCCTGTCATATGCAGAC

TGGTTCAAGGCCTCCTTTGGGAGCACACGAGGCTACCATGGCTGCAGCAAGAAGGCCCTGGTCTTCCTGTTTACG

TTCTTGTCAGAACTCGTGCCTTTTGAGTCTCCCCGGTACCTGCAGGTGCACATTCTCCACCCACCCCTGGTTCCC

AGCAAGTACCGCTCCCTCCTCACAGACTACATCTCATTGGCCAAGACACGGCTGGCCGACCTCAAGGTTTCTATA

GAAAACATGGGACTCTACGAGGATTTGTCATCAGCTGGGGACATTACTGAGCCCCACAGCCAAGCTCTTCAGGAT

GTTGAAAAGGCCATCATGGTGTTTGAGCATACGGGGAACATCCCAGTCACCGTCATGGAGGCCAGCATATTCAGG

AGGCCTTACTACGTGTCCCACTTCCTCCCCGCCCTGCTCACACCTCGAGTGCTCCCCAAAGTCCCTGACTCCCGT

GTGGCGTTTATAGAGTCTCTGAAGAGAGCAGATAAAATCCCCCCATCTCTGTACTCCACCTACTGCCAGGCCTGC

TCTGCTGCTGAAGAGAAGCCAGAAGATGCAGCCCTGGGAGTGAGGGCAGAACCCAACTCTGCTGAGGAGCCCCTG

GGACAGCTCACAGCTGCACTGGGAGAGCTGAGAGCCTCCATGACAGACCCCAGCCAGCGTGATGTTATATCGGCA

CAGGTGGCAGTGATTTCTGAAAGACTGAGGGCTGTCCTGGGCCACAATGAGGATGACAGCAGCGTTGAGATATCA

AAGATTCAGCTCAGCATCAACACGCCGAGACTGGAGCCACGGGAACACATTGCTGTGGACCTCCTGCTGACGTCT

TTCTGTCAGAACCTGATGGCTGCCTCCAGTGTCGCTCCCCCGGAGAGGCAGGGTCCCTGGGCTGCCCTCTTCGTG

AGGACCATGTGTGGACGTGTGCTCCCTGCAGTGCTCACCCGGCTCTGCCAGCTGCTCCGTCACCAGGGCCCGAGC

CTGAGTGCCCCACATGTGCTGGGGTTGGCTGCCCTGGCCGTGCACCTGGGTGAGTCCAGGTCTGCGCTCCCAGAG

GTGGATGTGGGTCCTCCTGCACCTGGTGCTGGCCTTCCTGTCCCTGCGCTCTTTGACAGCCTCCTGACCTGTAGG

ACGAGGGATTCCTTGTTCTTCTGCCTGAAATTTTGTACAGCAGCAATTTCTTACTCTCTCTGCAAGTTTTCTTCC

CAGTCACGAGATACTTTGTGCAGCTGCTTATCTCCAGGCCTTATTAAAAAGTTTCAGTTCCTCATGTTCAGATTG

TTCTCAGAGGCCCGACAGCCTCTTTCTGAGGAGGACGTAGCCAGCCTTTCCTGGAGACCCTTGCACCTTCCTTCT

GCAGACTGGCAGAGAGCTGCCCTCTCTCTGGACACACAGAACCTTCCGAGAGGTGTTGAAAGAGGAAGATGTT

CACTTAACTTACCAAGACTGGTTACACCTGGAGCTGGAAATTCAACCTGAAGCTGATGCTCTTTCAGATACTGAA

CGGCAGGACTTCCACCAGTGGGCGATCCATGAGCACTTTCTCCCTGAGTCCTCGGCTTCAGGGGCTGTGACGGA

GACCTGCAGGCTGCGTGTACCATTCTTGTCAACGCACTGATGGATTTCCACCAAAGCTCAAGGAGTTATGACCAC

TCAGAAAATTCTGATTTGGTCTTTGGTGGCCGCACAGGAAATGAGGATATTATTTCCAGATTGCAGGAGATGGTA

GCTGACCTGGAGCTGCAGCAAGACCTCATAGTGCCTCTCGGCCACACCCCTTCCCAGGAGCACTTCCTCTTTGAG

ATTTTCCGCAGACGGCTCCAGGCTCTGACAAGCGGGTGGAGCGTGGCTGCCAGCCTTCAGAGACAGAGGGAGCTG

CTAATGTACAAACGGATCCTCCTCCGCCTGCCTTCGTCTGTCCTCTGCGGCAGCAGCTTCCAGGCAGAACAGCCC

ATCACTGCCAGATGCGAGCAGTTCTTCCACTTGGTCAACTCTGAGATGAGAAACTTCTGCTCCCACGGAGGTGCC

CTGACACAGGACATCACTGCCCACTTCTTCAGGGGCCTCCTGAACGCCTGTCTGCGGAGCAGAGACCCCTCCCTG

ATGGTCGACTTCATACTGGCCAAGTGCCAGACGAAATGCCCCTTAATTTTGACCTCTGCTCTGGTGTGGTGGCCG

AGCCTGGAGCCTGTGCTGCTCTGCCGGTGGAGGAGACACTGCCAGAGCCCGCTGCCCCGGGAACTGCAGAAGCTA

CAAGAAGGCCGGCAGTTTGCCAGCGATTTCCTCTCCCCTGAGGCTGCCTCCCCAGCACCCAACCCGGACTGGCTC

TCAGCTGCTGCACTGCACTTTGCGATTCAACAAGTCAGGGAAGAAAACATCAGGAAGCAGCTAAAGAAGCTGGAC

TGCGAGAGAGGAGCTATTGGTTTTCCTTTTCTTCTTCCTTGATGGGCCTGCTGTCGTCACATCTGACCTCA

AATAGCACCACAGACCTGCCAAAGGCTTTCCACGTTTGTGCAGCAATCCTCGAGTGTTTAGAGAAGAGGAAGATA

TCCTGGCTGGCACTCTTTCAGTTGACAGAGAGTGACCTCAGGCTGGGGCGGCTCCTCCTCCGTGTGGCCCCGGAT

CAGCACACCAGGCTGCTGCCTTTCGCTTTTTACAGTCTTCTCTCCTACTTCCATGAAGACGCGGCCATCAGGGAA

GAGGCCTTCCTGCATGTTGCTGTGGACATGTACTTGAAGCTGGTCCAGCTCTTCGTGGCTGGGGATACAAGCACA
```

-continued

GTTTCACCTCCAGCTGGCAGGAGCCTGGAGCTCAAGGGTCAGGGCAACCCCGTGGAACTGATAACAAAAGCTCGT

CTTTTTCTGCTGCAGTTAATACCTCGGTGCCCGAAAAAGAGCTTCTCACACGTGGCAGAGCTGCTGGCTGATCGT

GGGGACTGCGACCCAGAGGTGAGCGCCGCCCTCCAGAGCAGACAGCAGGCTGCCCCTGACGCTGACCTGTCCCAG

GAGCCTCATCTCTTCTGA;
or (SEQ ID NO: 36)
ATGTCCGACTCGTGGGTCCCGAACTCCGCCTCGGGCCAGGACCCAGGGGGCCGCCGGAGGGCCTGGGCCGAGCTG

CTGGCGGGAAGGGTCAAGAGGGAAAAATATAATCCTGAAAGGGCACAGAAATTAAAGGAATCAGCTGTGCGCCTC

CTGCGAAGCCATCAGGACCTGAATGCCCTTTTGCTTGAGGTAGAAGGTCCACTGTGTAAAAAATTGTCTCTCAGC

AAAGTGATTGACTGTGACAGTTCTGAGGCCTATGCTAATCATTCTAGTTCATTTATAGGCTCTGCTTTGCAGGAT

CAAGCCTCAAGGCTGGGGGTTCCCGTGGGTATTCTCTCAGCCGGGATGGTTGCCTCTAGCGTGGGACAGATCTGC

ACGGCTCCAGCGGAGACCAGTCACCCTGTGCTGCTGACTGTGGAGCAGAGAAAGAAGCTGTCTTCCCTGTTAGAG

TTTGCTCAGTATTTATTGGCACACAGTATGTTCTCCCGTCTTTCCTTCTGTCAAGAATTATGGAAAATACAGAGT

TCTTTGTTGCTTGAAGCGGTGTGGCATCTTCACGTACAAGGCATTGTGAGCCTGCAAGAGCTGCTGGAAAGCCAT

CCCGACATGCATGCTGTGGGATCGTGGCTCTTCAGGAATCTGTGCTGCCTTTGTGAACAGATGGAAGCATCCTGC

CAGCATGCTGACGTCGCCAGGGCCATGCTTTCTGATTTTGTTCAAATGTTTGTTTTGAGGGGATTTCAGAAAAAC

TCAGATCTGAGAAGAACTGTGGAGCCTGAAAAAATGCCGCAGGTCACGGTTGATGTACTGCAGAGAATGCTGATT

TTTGCACTTGACGCTTTGGCTGCTGGAGTACAGGAGGAGTCCTCCACTCACAAGATCGTGAGGTGCTGGTTCGGA

GTGTTCAGTGGACACACGCTTGGCAGTGTAATTTCCACAGATCCTCTGAAGAGGTTCTTCAGTCATACCCTGACT

CAGATACTCACTCACAGCCCTGTGCTGAAAGCATCTGATGCTGTTCAGATGCAGAGAGAGTGGAGCTTTGCGCGG

ACACACCCTCTGCTCACCTCACTGTACCGCAGGCTCTTTGTGATGCTGAGTGCAGAGGAGTTGGTTGGCCATTTG

CAAGAAGTTCTGGAAACGCAGGAGGTTCACTGGCAGAGAGTGCTCTCCTTTGTGTCTGCCCTGGTTGTCTGCTTT

CCAGAAGCGCAGCAGCTGCTTGAAGACTGGGTGGCGCGTTTGATGGCCCAGGCATTCGAGAGCTGCCAGCTGGAC

AGCATGGTCACTGCGTTCCTGGTTGTGCGCCAGGCAGCACTGGAGGGCCCCTCTGCGTTCCTGTCATATGCAGAC

TGGTTCAAGGCCTCCTTTGGGAGCACACGAGGCTACCATGGCTGCAGCAAGAAGGCCCTGGTCTTCCTGTTTACG

TTCTTGTCAGAACTCGTGCCTTTTGAGTCTCCCCGGTACCTGCAGGTGCACATTCTCCACCCACCCCTGGTTCCC

AGCAAGTACCGCTCCCTCCTCACAGACTACATCTCATTGGCCAAGACACGGCTGGCCGACCTCAAGGTTTCTATA

GAAAACATGGGACTCTACGAGGATTTGTCATCAGCTGGGGACATTACTGAGCCCCACAGCCAAGCTCTTCAGGAT

GTTGAAAAGGCCATCATGGTGTTTGAGCATACGGGGAACATCCCAGTCACCGTCATGGAGGCCAGCATATTCAGG

AGGCCTTACTACGTGTCCCACTTCCTCCCCGCCCTGCTCACACCTCGAGTGCTCCCCAAAGTCCCTGACTCCCGT

GTGGCGTTTATAGAGTCTCTGAAGAGAGCAGATAAAATCCCCCCATCTCTGTACTCCACCTACTGCCAGGCCTGC

TCTGCTGCTGAAGAGAAGCCAGAAGATGCAGCCCTGGGAGTGAGGGCAGAACCCAACTCTGCTGAGGAGCCCCTG

GGACAGCTCACAGCTGCACTGGGAGAGCTGAGAGCCTCCATGACAGACCCCAGCCAGCGTGATGTTATATCGGCA

CAGGTGGCAGTGATTTCTGAAAGACTGAGGGCTGTCCTGGGCCACAATGAGGATGACAGCAGCGTTGAGATATCA

AAGATTCAGCTCAGCATCAACACGCCGAGACTGGAGCCACGGGAACACATTGCTGTGGACCTCCTGCTGACGTCT

TTCTGTCAGAACCTGATGGCTGCCTCCAGTGTCGCTCCCCCGGAGAGGCAGGGTCCCTGGGCTGCCCTCTTCGTG

AGGACCATGTGTGGACGTGTGCTCCCTGCAGTGCTCACCCGGCTCTGCCAGCTGCTCCGTCACCAGGGCCCGAGC

CTGAGTGCCCCACATGTGCTGGGGTTGGCTGCCCTGGCCGTGCACCTGGGTGAGTCCAGGTCTGCGCTCCCAGAG

GTGGATGTGGGTCCTCCTGCACCTGGTGCTGGCCTTCCTGTCCCTGCGCTCTTTGACAGCCTCCTGACCTGTAGG

ACGAGGGATTCCTTGTTCTTCTGCCTGAAATTTTGTACAGCAGCAATTTCTTACTCTCTCTGCAAGTTTTCTTCC

CAGTCACGAGATACTTTGTGCAGCTGCTTATCTCCAGGCCTTATTAAAAAGTTTCAGTTCCTCATGTTCAGATTG

TTCTCAGAGGCCCGACAGCCTCTTTCTGAGGAGGACGTAGCCAGCCTTTCCTGGAGACCCTTGCACCTTCCTTCT

-continued

```
GCAGACTGGCAGAGAGCTGCCCTCTCTCTCTGGACACACAGAACCTTCCGAGAGGTGTTGAAAGAGGAAGATGTT

CACTTAACTTACCAAGACTGGTTACACCTGGAGCTGGAAATTCAACCTGAAGCTGATGCTCTTTCAGATACTGAA

CGGCAGGACTTCCACCAGTGGGCGATCCATGAGCACTTTCTCCCTGAGTCCTCGGCTTCAGGGGGCTGTGACGGA

GACCTGCAGGCTGCGTGTACCATTCTTGTCAACGCACTGATGGATTTCCACCAAAGCTCAAGGAGTTATGACCAC

TCAGAAAATTCTGATTTGGTCTTTGGTGGCCGCACAGGAAATGAGGATATTATTTCCAGATTGCAGGAGATGGTA

GCTGACCTGGAGCTGCAGCAAGACCTCATAGTGCCTCTCGGCCACACCCCTTCCCAGGAGCACTTCCTCTTTGAG

ATTTTCCGCAGACGGCTCCAGGCTCTGACAAGCGGGTGGAGCGTGGCTGCCAGCCTTCAGAGACAGAGGGAGCTG

CTAATGTACAAACGGATCCTCCTCCGCCTGCCTTCGTCTGTCCTCTGCGGCAGCAGCTTCCAGGCAGAACAGCCC

ATCACTGCCAGATGCGAGCAGTTCTTCCACTTGGTCAACTCTGAGATGAGAAACTTCTGCTCCCACGGAGGTGCC

CTGACACAGGACATCACTGCCCACTTCTTCAGGGGCCTCCTGAACGCCTGTCTGCGGAGCAGAGACCCCTCCCTG

ATGGTCGACTTCATACTGGCCAAGTGCCAGACGAAATGCCCCTTAATTTTGACCTCTGCTCTGGTGTGGTGGCCG

AGCCTGGAGCCTGTGCTGCTCTGCCGGTGGAGGAGACACTGCCAGAGCCCGTGCCCCGGGAACTGCAGAAGCTA

CAAGAAGGCCGGCAGTTTGCCAGCGATTTCCTCTCCCCTGAGGCTGCCTCCCCAGCACCCAACCCGGACTGGCTC

TCAGCTGCTGCACTGCACTTTGCGATTCAACAAGTCAGGGAAGAAAACATCAGGAAGCAGCTAAAGAAGCTGGAC

TGCGAGAGAGGAGCTATTGGTTTTCCTTTTCTTCTTCTCCTTGATGGGCCTGCTGTCGTCACATCTGACCTCA

AATAGCACCACAGACCTGCCAAAGGCTTTCCACGTTTGTGCAGCAATCCTCGAGTGTTTAGAGAAGAGGAAGATA

TCCTGGCTGGCACTCTTTCAGTTGACAGAGAGTGACCTCAGGCTGGGCGGCTCCTCCTCCGTGTGGCCCCGGAT

CAGCACACCAGGCTGCTGCCTTTCGCTTTTTACAGTCTTCTCTCCTACTTCCATGAAGACGCGGCCATCAGGGAA

GAGGCCTTCCTGCATGTTGCTGTGGACATGTACTTGAAGCTGGTCCAGCTCTTCGTGGCTGGGGATACAAGCACA

GTTTCACCTCCAGCTGGCAGGAGCCTGGAGCTCAAGGGTCAGGGCAACCCCGTGGAACTGATAACAAAAGCTCGT

CTTTTTCTGCTGCAGTTAATACCTCGGTGCCCGAAAAAGAGCTTCTCACACGTGGCAGAGCTGCTGGCTGATCGT

GGGGACTGCGACCCAGAGGTGAGCGCCGCCCTCCAGAGCAGACAGCAGGCTGCCCCTGACGCTGACCTGTCCCAG

GAGCCTCATCTCTTCTGATGA.
```

The present disclosure includes plasmids comprising an expression cassette or transfer cassette described herein. In particular embodiments, the plasmid is pCCL-PGK-FANCA-WPRE* or pCCL-PGK-FANCAW-82-RO (SEQ ID NO: 25).

In some embodiments, the gene therapy vector is a self-limiting LV. In a specific embodiment of any of the expression cassettes and gene therapy vectors described herein, the transfer cassette is a pCCL-SIN-cPPT/CTS-hPGK-hFANCA-WPRE of the disclosure comprises or consists of the following sequence, or a sequence having at least 80%, at least 85%, at least 90%, at least 95%, at least 98%, or at least 99% identity to SEQ ID NO: 24. SEQ ID NO: 24 corresponds to the pCCL-PGK-FANCA-WPRE* plasmid. SEQ ID NO: 25 corresponds to the pCCL-PGK-FANCAW-82-RO plasmid.

In one embodiment, a FANCA gene is delivered via a lentiviral vector (LV). The FANCA LVs described herein utilize a self-inactivating lentiviral vector (LV). In one embodiment, the FANCA LV comprises a promoter of the human phosphoglycerate (PGK) gene. The safety properties of this vector have been markedly improved, compared to the gamma-retroviral vectors already used in the clinics, which harbored strong viral promoters.

In certain embodiments, the lentiviral vector is PGK-FANCA.WPRE*LV, which comprises the gene transfer cassette, comprising sequences disclosed in SEQ ID NO: 24. The PGK-FANCA-WPRE*LV gene expression cassette portion comprises the human PGK promoter, the coding sequence for FANCA cDNA, and the WPRE*; and corresponds to nucleotides 3541 to 9178 of SEQ ID NO: 24. The PGK-FANCA-WPRE*LV transfer cassette portion comprises from about the 5' LTR (U5) to about the 3' LTR (U5) of the sequence. With respect to SEQ ID NO: 24, nucleotides 1586-1789 of SEQ ID NO: 24 comprise human CMV immediate early promoter. Nucleotides 2031-2156 of SEQ ID NO: 24 comprise HIV1 psi packaging signal. Nucleotides 2649-2882 of SEQ ID NO: 24 comprise HIV1 RRE element. Nucleotides 3378-3495 of SEQ ID NO: 24 comprise HIV cPPT/CTS element. Nucleotides 3541-4051 of SEQ ID NO: 24 comprise the hPGK promoter. Nucleotides 4078-8445 of SEQ ID NO: 24 comprise human FANCA-A cDNA. Nucleotides 8502-9178 of SEQ ID NO: 24 comprise mutated WPRE element. Nucleotides 9262-9495 of SEQ ID NO: 24 comprise the HIV delta U 3' LTR.

In certain embodiments, the lentiviral vector is pCCL-PGK-FANCAW-82-RO, which comprises the gene transfer cassette, comprising sequences disclosed in SEQ ID NO: 25. The pCCL-PGK-FANCAW-82-RO gene expression cassette portion comprises the human PGK promoter, the coding sequence for FANCA cDNA, and the WPRE*. The pCCL-PGK-FANCAW-82-RO transfer cassette portion comprises from about the 5' LTR (U5) to about the 3' LTR (U5) of the sequence. Nucleotides 1-511 of SEQ ID NO: 25 comprise the hPGK promoter. Nucleotides 538-4905 of SEQ ID NO: 25 comprise human FANCA-A cDNA.

In yet another embodiment, the lentiviral vector contains the following elements: (i) the backbone of the lentiviral vector derived from the initial pCCLsin-cppt-hPGK-eGFP-WPRE (Dull et al, 1998; J. Virol 72 (11), 9873-9880). The pCCL backbone utilizes a heterologous CMV-HIV 5' LTR to obtain high levels of viral RNA transcription in the producer cells. Such heterologous LTR renders the construct independent from the need to use the HIV Tat protein for the production of the rHIV particles and it is therefore a safety feature. The U3 region of the 3' LTR contains a 400 bp deletion as described in (Zufferey et al J Virol, 1998) which confers self-inactivating properties to the vector; (ii) the cDNA of the human codon optimized FANCA gene (4368 bp GenBank accession number: X_99226 or as disclosed herein) encoding the FANCA protein (1455 AA) under control of the human PGK promoter. The promoter has already been characterized by its stable activity in vivo and by improved safety properties, compared to other promoters already used in gene therapy; and (iii) a mutated version of the woodchuck hepatitis virus post-transcriptional regulatory element (WPRE) that is deleted in the 3' region of a sequence coding for the X protein and any residual ORF of the described by Schambach et al (Gene therapy, 2006; 13, 641-645) or WPRE*.

In certain embodiments, the FANCA LVs described herein utilize a self-inactivating lentiviral vector (LV). In one embodiment, the FANCA LV comprises a promoter of the human phosphoglycerate (PGK) gene. The safety properties of this vector have been markedly improved, compared to the gamma-retroviral vectors already used in the clinics, which harbored strong viral promoters. In one embodiment, a FANCA gene is delivered via a lentiviral vector. In certain embodiments, the lentiviral vector is PGK-FANCA.WPRE*LV.

Gene therapy vectors encapsulating the polynucleotide cassettes of the present disclosure may be produced using standard methodology. For example, in the case of LV virions, an LV expression vector according to the invention may be introduced into a producer cell, followed by introduction of an LV helper construct, where the helper construct includes LV coding regions capable of being expressed in the producer cell and which complement LV helper functions absent in the LV vector. This is followed by introduction of helper virus and/or additional vectors into the producer cell, wherein the helper virus and/or additional vectors provide accessory functions capable of supporting efficient LV virus production. The producer cells are then cultured to produce LV. These steps are carried out using standard methodology. In particular embodiments, the plasmids depicted in FIG. 1 is used to produce the gene therapy vectors.

Any suitable method for producing viral vector particles for delivery of the subject polynucleotide cassettes can be used, including but not limited to those described in the examples that follow. Any concentration of infective viral vector particles suitable to effectively transduce mammalian cells can be prepared for contacting mammalian cells in vitro or in vivo. For example, the viral particles may be formulated at a concentration of $10^8$ infectious units per ml or more, for example, $5\times10^8$ infectious units per mL; $10^9$ infectious units per mL; $5\times10^9$ infectious units per mL, $10^{10}$ infectious units per mL, $5\times10^{10}$ infectious units per mL; $10^{11}$ infectious units per mL; $5\times10^{11}$ infectious units per mL; $10^{12}$ infectious units per mL; $5\times10^{12}$ infectious units per mL; $10^{13}$ infectious units per mL; $1.5\times10^{13}$ infectious units per mL; $3\times10^{13}$ infectious units per mL; $5\times10^{13}$ infectious units per mL; $7.5\times10^{13}$ infectious units per mL; $9\times10^{13}$ infectious units per mL; $1\times10^{14}$ infectious units per mL, $5\times10^{14}$ infectious units per mL or more, but typically not more than $1\times10^{15}$ infectious units per mL.

In preparing the subject LV gene therapy vectors, any host cells for producing LV virions may be employed, including, for example, mammalian cells (e.g. 293 cells), insect cells (e.g. SF9 cells), microorganisms and yeast. Host cells can also be packaging cells in which the LV rep and cap genes are stably maintained in the host cell or producer cells in which the LV vector genome is stably maintained and packaged. Exemplary packaging and producer cells are derived from SF-9, 293, A549 or HeLa cells. LV vectors are purified and formulated using standard techniques known in the art.

In certain embodiments, the present invention includes a cell comprising a gene expression cassette, gene transfer cassette, or gene therapy vector disclosed herein. In related embodiments, the cell is transduced with a gene therapy vector comprising an expression cassette disclosed herein or has an expression cassette disclosed herein integrated into the cell's genome. In certain embodiments, the cell is a cell used to produce a viral gene therapy vector, e.g., a packaging cell.

In other embodiments, the cell is a cell to be delivered to a subject in order to provide to the subject the gene product encoded by the expression cassette. Thus, in certain embodiments, the cell is autologous to the subject to be treated or was obtained from the subject to be treated. In other embodiments, the cell is allogeneic to the subject to be treated or was obtained from a donor other than the subject to be treated. In particular embodiments, the cell is a mammalian cell, e.g., a human cell. In certain embodiments, the cell is a blood cell, an erythrocyte, a hematopoietic progenitor cell, a bone marrow cell, e.g., a lineage depleted bone marrow cell, a hematopoietic stem cell (e.g., CD34+) or a committed hematopoietic erythroid progenitor cell. In particular embodiments, the cell is a CD34+ cell obtained from a subject to be treated with the cell after it is transduced by a gene therapy vector disclosed herein. In particular embodiment, the cell is a CD34+FA cell obtained from a subject diagnosed with FA.

In some embodiments, the methods disclosed herein result in a therapeutic benefit, e.g., preventing the development of a disorder, halting the progression of a disorder, reversing the progression of a disorder, etc. For example, in one embodiment, the disorder is BMF. In one embodiment, the disorder is thrombocytopenia. In another embodiment, the disorder is leukopenia. In one embodiment, the disorder is pancytopenia. In one embodiment, the disorder is neutropenia. In another embodiment, the disorder is anemia. In some embodiments, the subject method comprises the step of detecting that a therapeutic benefit has been achieved. The ordinarily skilled artisan will appreciate that such measures of therapeutic efficacy will be applicable to the particular disease being modified, and will recognize the appropriate detection methods to use to measure therapeutic efficacy.

In another embodiment, the present invention includes a method of treating a disease in a subject in need thereof comprising providing to the subject an effective amount of either or both of a high-stringency CD34-enriched cell population and a low-stringency CD34-enriched cell population, either or both of which have been contacted with a gene therapy vector, e.g., a viral vector, that expresses a therapeutic gene product in the cells. In particular embodiments, the either or both of a high-stringency CD34-enriched cell population and a low-stringency CD34-enriched cell population are autologous to the subject. In certain embodiments, the cells are erythroid cells, e.g., hematopoietic stem cells or committed hematopoietic erythroid progenitor cells. In some embodiments, the cell is a bone marrow cell, e.g., a lineage depleted bone marrow cell. In particular embodiments, the method is used to treat FA, and the viral vector is a LV comprising an expression construct disclosed herein comprising a human PGK promoter operably linked to a FANCA gene cDNA or coding sequence, and a mutated WPRE disclosed herein. In particular embodiments, the cells are provided to the subject parenterally, e.g., via intravenous injection.

In another embodiment, the present invention includes a method of treating FA in a subject in need thereof, comprising providing to the subject an effective amount of autologous high-stringency CD34-enriched cell population and/or a low-stringency CD34-enriched cell populations of stem cells transduced with a LV vector that expresses a FANCA cDNA in the cells, wherein the LV vector comprises a human PGK promoter operably linked to the FANCA cDNA or coding sequence, and a mutated WPRE sequence disclosed herein. In particular embodiments, the cells are hematopoietic stem cells or committed hematopoietic erythroid progenitor cells, e.g., bone marrow cells. In particular embodiments, the cells are provided to the subject parenterally, e.g., via intravenous injection.

Expression of the transgene using the subject transgene is expected to be robust. Accordingly, in some instances, the expression of the transgene, e.g. as detected by measuring levels of gene product, by measuring therapeutic efficacy, etc. may be observed two months or less after administration, e.g. 4, 3 or 2 weeks or less after administration, for example, 1 week after administration of the subject composition. Expression of the transgene is also expected to persist over time. Accordingly, in some instances, the expression of the transgene, e.g. as detected by measuring levels of gene product, by measuring therapeutic efficacy, etc., may be observed 2 months or more after administration of the subject composition, e.g., 4, 6, 8, or 10 months or more, in some instances 1 year or more, for example 2, 3, 4, or 5 years, in certain instances, more than 5 years.

In certain embodiments, the method comprises the step of detecting expression of the transgene in the cells or in the subject, wherein expression is enhanced relative to expression from a polynucleotide cassette not comprising the one or more improved elements of the present disclosure. Typically, expression will be enhanced 2-fold or more relative to the expression from a reference, i.e. a control polynucleotide cassette, e.g. as known in the art, for example 3-fold, 4-fold, or 5-fold or more, in some instances 10-fold, 20-fold or 50-fold or more, e.g. 100-fold, as evidenced by, e.g. earlier detection, higher levels of gene product, a stronger functional impact on the cells, etc.

In some embodiments, the dose of cells patients receive by infusion will be that which is obtained from the transduction process. In various preferred embodiments, at least about $1\times10^1$, $1\times10^2$, $1\times10^3$, $1\times10^4$, $1\times10^5$, $1\times10^6$, $1\times10^7$, $1\times10^8$, or more high-stringency CD34-enriched cells/KG of patient weight are infused into the patient. In various preferred embodiments, at least at least about $1\times10^1$, $1\times10^2$, $1\times10^3$, $1\times10^4$, $1\times10^5$, $1\times10^6$, $1\times10^7$, $1\times10^8$, or more low-stringency CD34-enriched cells/KG of patient weight are infused into the patient. In some embodiments, between $1\times10^6$ and $4\times10^6$ high-stringency CD34-enriched cells/Kg of patient weight are infused into the patient. In other embodiments, $3\times10^5$ and $4\times10^6$ high-stringency CD34-en-riched cells/Kg of patient weight are infused into the patient. In some embodiments, between $1\times10^6$ and $4\times10^6$ high-stringency CD34-enriched cells/Kg of patient weight are infused into the patient. In other embodiments, $3\times10^5$ and $4\times10^6$ high-stringency CD34-enriched cells/Kg of patient weight are infused into the patient. In some embodiments, cells will be infused into the patient a single dose. In other embodiments, cells will be infused into the patient in multiple doses (e.g, the high-stringency and low-stringency CD34-enriched cell populations are administered sequentially once or multiple times). Transduced cells may be infused immediately after the transduction process is completed. In particular embodiments, the transduced cells are stored or frozen before use, whereas in certain embodiments, they are provided to the subject immediately or shortly after they are transduced, e.g., within one hour, two hours, four hours, or eight hours.

Once integrated, the therapeutic protein (e.g., human FANCA protein) is expressed by the cells. Transduced FA cells are genetically corrected, and thus able to activate the FA pathway by the mono-ubiquitination of FANCD2 and FANCI. These proteins migrate to areas of DNA damage, and in cooperation with other DNA repair proteins, promote the repair of the DNA in these cells, as occurs in healthy cells As described in further detail in the Examples, preclinical in vitro data with BM samples from human FA patients has already shown the efficacy of an FANCA LV to correct the phenotype of these cells.

In one embodiment, at least 1 to $4\times10^6$ CD34$^+$ corrected cells (e.g., FANCA transduced HSCs) per kilogram of patient weight are administered, e.g., to restore hematopoiesis in a non-conditioned FA patient. In some embodiments, the transduced cells are infused or administered into the patient immediately after transduction. In other embodiments, the transduced cells are frozen prior to infusing or administering into the patient The genetic correction of HSCs from FA patients, followed by the autologous transplantation of these cells (hematopoietic gene therapy), is a good alternative for FA patients, particularly those lacking an HLA-identical sibling. In one embodiment, hematopoietic gene therapy is the preferred treatment regimen for a patient lacking an HLA-identical sibling. In another embodiment, hematopoietic gene therapy is the preferred treatment regimen for a patient that has an HLA-identical sibling.

Compositions and Formulations

Certain aspects of the disclosure relate to a system or combination of a high-stringency CD34-enriched cell population and a low-stringency CD34-enriched cell population, either or both of which have been transduced with a gene therapy vector. Some embodiments comprise a combination of high-stringency CD34-enriched and low-stringency CD34-enriched cell populations, either or both of which have been transduced with a lentiviral vector containing a human FANC gene, e.g. FANCA, FANCC, or FANCG, or a nucleic acid sequence encoding a FANC protein, including functional variants and fragments thereof. Some embodiments comprise a combination of high-stringency CD34-enriched and low-stringency CD34-enriched cell populations either or both of which have been subjected to gene editing or gene repair, such as with a CRISPR, TALEN, zinc-finger, or meganuclease gene editing system. Some embodiments comprises a combination of high-stringency CD34-enriched and low-stringency CD34-enriched cell populations that has been transduced with a lentiviral (or other viral) vector containing a transgene associated with a disease or condition, such as an immunodeficiency disorder.

In some aspects of the disclosure, formulations are provided for the treatment of a disease or condition. The formulations may comprise high-stringency CD34-enriched cell population(s) or low-stringency CD34-enriched cell population(s) or both, along with a physiologically acceptable carrier or pharmaceutically acceptable carrier as described herein. The formulations may comprise high-stringency CD34-enriched cell population(s) or low-stringency CD34-enriched cell population(s) or both, wherein one or both cell populations were transduced with a gene therapy vector and express or are capable of expressing a therapeutic agent, along with a physiologically acceptable carrier or pharmaceutically acceptable carrier as described herein.

The present invention includes pharmaceutical compositions and formulations comprising either or both of a high-stringency CD34-enriched cell population and a low-stringency CD34-enriched cell population gene therapy vector as described herein and a pharmaceutically-acceptable carrier, diluent or excipient. The subject high-stringency CD34-enriched cell population and/or a low-stringency CD34-enriched cell population can be combined with pharmaceutically-acceptable carriers, diluents and reagents useful in preparing a formulation that is generally safe, non-toxic, and desirable, and includes excipients that are acceptable for primate use. Examples of such excipients, carriers or diluents include, but are not limited to, water, saline, Ringer's solutions, dextrose solution, and 5% human serum albumin. Supplementary active compounds can also be incorporated into the formulations. Solutions or suspensions used for the formulations can include a sterile diluent such as water for injection, saline solution, dimethyl sulfoxide (DMSO), fixed oils, polyethylene glycols, glycerine, propylene glycol or other synthetic solvents; antibacterial compounds such as benzyl alcohol or methyl parabens; antioxidants such as ascorbic acid or sodium bisulfite; chelating compounds such as ethylenediaminetetraacetic acid (EDTA); buffers such as acetates, citrates or phosphates; detergents such as Tween 20 to prevent aggregation; and compounds for the adjustment of tonicity such as sodium chloride or dextrose. The pH can be adjusted with acids or bases, such as hydrochloric acid or sodium hydroxide. In particular embodiments, the formulations are sterile.

In some embodiments, the CD34-enriched cell populations are manufactured in accordance with Current Good Manufacturing Practices. Manufactured in accordance with Current Good Manufacturing Practices means that the formulation prepared for administration is sufficiently safe to permit administration to a human subject under controlling regulations and government authorizations. Generally, the controlling regulations and authorizations will dictate that the formulation meet pre-approved acceptance criteria regarding identity, strength, quality and purity. Acceptance criteria include numerical limits, ranges, or other suitable measures of test results used to determine whether a formulation meets the Current Good Manufacturing Practices. A specification sets forth the analytical procedures that are used to test conformance with the acceptance criteria. Formulations can be assessed in batches. A batch is a specific quantity of a formulation tested to ensure compliance with acceptance criteria.

The formulations can be included in a container, pack, or dispenser, e.g. syringe, e.g. a prefilled syringe, together with instructions for administration.

Where necessary or beneficial, formulations can include a local anesthetic such as lidocaine to ease pain at a site of injection.

Therapeutically effective amounts of cells within formulations can be greater than $10^2$ cells, greater than $10^3$ cells, greater than $10^4$ cells, greater than $10^5$ cells, greater than $10^6$ cells, greater than $10^7$ cells, greater than $10^8$ cells, greater than $10^9$ cells, greater than $10^{10}$ cells, or greater than $10^{11}$.

In formulations disclosed herein, cells are generally in a volume of a liter or less, 500 ml or less, 250 ml or less or 100 ml or less. Hence the density of administered cells is typically greater than $10^4$ cells/ml, $10^7$ cells/ml or $10^8$ cells/ml.

The formulations disclosed herein can be prepared for administration by, for example, injection, infusion, perfusion, or lavage. Therapeutically effective amounts to administer can include greater than $10^2$ cells, greater than $10^3$ cells, greater than $10^4$ cells, greater than $10^5$ cells, greater than $10^6$ cells, greater than $10^7$ cells, greater than $10^8$ cells, greater than $10^9$ cells, greater than $10^{10}$ cells, or greater than $10^{11}$. In particular embodiments, a minimum dose is $2\times10^6$ cells/kg subject body weight.

In some embodiments, the pharmaceutical composition provided herein comprise a therapeutically effective amount of either or both of a high-stringency CD34-enriched cell population and a low-stringency CD34-enriched cell populations disclosed herein in admixture with a pharmaceutically acceptable carrier and/or excipient, for example saline, phosphate buffered saline, phosphate and amino acids, polymers, polyols, sugar, buffers, preservatives and other proteins. Exemplary amino acids, polymers and sugars and the like are octylphenoxy polyethoxy ethanol compounds, polyethylene glycol monostearate compounds, polyoxyethylene sorbitan fatty acid esters, sucrose, fructose, dextrose, maltose, glucose, mannitol, dextran, sorbitol, inositol, galactitol, xylitol, lactose, trehalose, bovine or human serum albumin, citrate, acetate, Ringer's and Hank's solutions, cysteine, arginine, carnitine, alanine, glycine, lysine, valine, leucine, polyvinylpyrrolidone, polyethylene and glycol. Preferably, this formulation is stable for at least six months at 4° C.

In some embodiments, the pharmaceutical composition provided herein comprises a buffer, such as phosphate buffered saline (PBS) or sodium phosphate/sodium sulfate, tris buffer, glycine buffer, sterile water and other buffers known to the ordinarily skilled artisan such as those described by Good et al. (1966) *Biochemistry* 5:467. The pH of the buffer in which the pharmaceutical composition comprising the tumor suppressor gene contained in the adenoviral vector delivery system, may be in the range of 6.5 to 7.75, preferably 7 to 7.5, and most preferably 7.2 to 7.4.

All publications mentioned herein are incorporated herein by reference to disclose and describe the methods and/or materials in connection with which the publications are cited. It is understood that the present disclosure supersedes any disclosure of an incorporated publication to the extent there is a contradiction.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Further, the dates of publication provided may be different from the actual publication dates which may need to be independently confirmed.

Because FA-A is the most frequent complementation group in FA patients (Casado et al., 2007, Taniguchi et al., 2006), vectors expressing the FANCA gene and/or the EGFP marker gene are the focus of the Examples; however, other FANCA genes may be utilized to similarly treat other complementation groups The disclosure is further described in the following Examples, which do not limit the scope of the disclosure described in the claims

EXAMPLES

Example 1

Treatment of Patient with High- and Low-Stringency CD34-Enriched Cell Populations Patient 1 presented with Fanconi anemia. Patient 1 thereafter underwent mobilization using G-CSF and plerixafor followed by two apheresis collections on successive days. Relative to other FA patients on the same clinical trial, Patient 1 had moderate mobilization of CD34 cells, indicated by peripheral blood analysis of circulating CD34 cells, with similar mobilization kinetics to other patients. Following two apheresis collections, collected HSPCs were divided into two peripheral-blood biological samples.

High-stringency CD34 selection: The first biological sample was enriched by selection for CD34+ cells under high-stringency conditions using Miltenyi Biotec CliniMACS® system in enrichment mode with Miltenyi Biotec CD34 Reagent for enrichment, as described in U.S. Pat. No. 8,727,132. High-stringency CD34 selection resulted in 29.0% yield of CD34$^+$ cells and 36% relative purity.

Low-stringency CD34 selection: The second biological sample was enriched by selection for CD34+ cells under low-stringency conditions using a modification of depletion mode use of the Miltenyi Biotec CliniMACS® system. Briefly, the second biological sample was labelled using Miltenyi Biotec CD34 Reagant. The sample was then loaded on the column using the depletion mode program for the instrument. After bulk loading of the sample with the magnet "ON," the Cell Collection Bag (used in normal operation of the instrument to collect target cells) was removed and not used for stem-cell transplant. The "Non-Target Cell Bag" was attached, then the magnet was turned "OFF," and then elution buffer was applied to the instrument resulting in elution of CD34* cells into the Non-Target Cell Bag. The cell population collected in the Non-Target Cell Bag was kept and designated as the low-stringency CD34-enriched cell population. Low-stringency CD34 selection resulted in 54.5% yield of CD34$^+$ cells at 5.8% relative purity. The low purity is due to other hematopoietic cell types that were not purified away from the CD34$^+$ cells during the selection process. Results are summarized in Tables 1A and 1B.

TABLE 1A

| | | Before CD34 Enrichment | | | |
|---|---|---|---|---|---|
| FA | Aph | TNC | CD34% | Total CD34 | CD34/kg |
| Pt #1 | 1 | 1.36E+10 | 0.15 | 2.04E+07 | 1.46E+06 |
| | 2 | 2.30E+10 | 0.1 | 2.30E+07 | 1.64E+06 |

TABLE 1B

| | | After CD34 Enrichment | | | | |
|---|---|---|---|---|---|---|
| FA | Aph | CD34-Enrich. | TNC | CD34% | Total CD34 | CD34/kg | CD34 Yield |
| Pt #1 | 1 | Low | 1.92E+08 | 5.8 | 1.11E+07 | 7.95E+05 | 54.5 |
| | 2 | High | 1.85E+07 | 36 | 6.66E+06 | 4.76E+05 | 29.0 |

Starting cell numbers and CD34+ cell purity and resulting cell populations from a Fanconi Anemia-A patient
Aph: Apheresis
TNC: Total Nucleated Cell Count
Low: Modified CliniMACS depletion program
High: Standard CliniMACS CD34 enrichment program Subsequently, both high-stringency CD34-enriched cell population and low-stringency CD34-enriched cell population were each individually transduced with a recombinant gene therapy vector (PGK-FANCA-WPRE*) (SEQ ID NO: 25) encoding the FANCA gene product, and the resulting genetically modified cells were designated as Product 1.1 and Product 1.2, respectively.

Product 1.1 and Product 1.2 were mixed together and thereafter administered to Patient 1 by continuous intravenous infusion over 10-30 minutes while monitoring clinical indicators.

Patient 1 has shown the most rapid, or nearly the most rapid, in vivo selection engraftment kinetics of all FA patients transplanted at participating institutions. Early trends of stabilization of hematopoietic lineages that had declined in this FA patient prior to transplantation is a convincing endpoint for clinical success, which was unexpectedly achieved by this treatment method. Five other FA patients have been transplanted with standard CD34 selection approaches and none have shown comparable engraftment kinetics to Patient 1.

Without being bound by theory, it is believed that the mixture of high-stringency (Product 1.1) and low-stringency (Product 1.2) CD34-enriched cell populations confers an in vivo selective advantage to gene-modified FA hematopoietic cells and results in a progressive increase in gene-modified cells over time. Product 1.1 (high-stringency CD34-enriched cell population) is thought to be providing the majority of the gene-modified cells contributing to hematopoiesis and Product 1.2 (low-stringency CD34-enriched cell population) is thought to have facilitated robust engraftment and hematopoietic repopulation by Product 1.1.

Example 2

Comparative Efficacy of Treatment with Lineage-Depletion Cell Population

Patient 2 presented with Fanconi anemia. Peripheral blood biological sample were obtained from Patient 2 by mobilized apheresis using equivalent procedures to those of Example 1. A lineage-depletion cell population was prepared by labelling the biological sample with CD3/CD14/CD16/CD19 reagent and depleting the sample of labelled cells using the Miltenyi Biotec CliniMACS® system in depletion mode. Lineage-depletion CD34 selection results in 56% yield of CD34$^+$ cells at 1.6% relative purity. The low purity is due to other hematopoietic cell types that were not purified away from the CD34$^+$ cells during the selection process. CD34 cell yield and purity were comparable to those achieved with Patient 1 in the low-stringency CD34- enriched cell population. No high-stringency CD34-enriched cell population was prepared. The lineage-depleted cell population was transduced with a recombinant gene therapy vector encoding the FANCA gene product, and designated as Product 2.1.

Product 2.1 administered to Patient 2 by continuous intravenous infusion over 10-30 minutes while monitoring clinical indicators in cell numbers comparable to those used with Patient 1. In contrast to Patient 1, no gene-modified cells could be detected in the blood of Patient 2 six months after transplantation. Thus, Product 2.1, believed to be similar to Product 1.2 alone, results in no detectable hematopoietic recovery.

Example 3

Modification of Low Stringency Conditions for Higher Yield and Treatment with Resulting Cell Populations Patient 3 presents with Fanconi anemia. Peripheral blood biological sample are obtained from Patient 3 by mobilized apheresis using equivalent procedures to those of Example 1. Following apheresis collection, collected HSPCs are divided into two peripheral-blood biological samples.

High-stringency CD34 selection: A first biological sample is enriched by selection for CD34+ cells under high-stringency conditions using Miltenyi Biotec CliniMACS® system in enrichment mode with Miltenyi Biotec CD34 Reagent for enrichment, as described in Example 1. High-stringency CD34 selection results in greater than 20% yield of $CD34^+$ cells and greater than 20% relative purity. The CD34 Selection Program on a CliniMACS® system is run using the sample as described above with the parameters as indicated in Table 2. The process lasts approximately 20-30 minutes. The "target cell bag" of the CliniMACS® system contains the high-stringency CD34-enriched cell population.

TABLE 2

Input Program and Sample Parameters

| | |
|---|---|
| Separation Program | ENRICHMENT 1.1 |
| Tubing Set (select from list) | CliniMACS LS Tubing Set REF 162-01 |
| Cell Concentration [*10°/mL] | 180 \| Min: 20, Max: 400 |
| Frequency of Labelled Cells [%] | 1 \| Min: 1, Max: 80 |
| Sample Loading Volume [mL] | 150 \| Min: 60, Max: 400 |
| Calculated Process Parameters | |
| Max. Processing Time [min] | 29 |
| Labelled Cells to be Processed [—] | 2.7E+08 |
| Number of Stages [—] | 1 |
| Process Specifications | Inside Specifications |
| Calculated Process Parameters - Screen Output | |
| Buffer needed for Process [mL] | 1000 |
| Bag Size; Cell Collection Bag [mL] | 150 |
| Bag Size: Negative Fraction Bag [mL] or Non-Target Cell Bag [mL] | 500 |
| Bag Size: Buffer Waste Bag [mL] | 500 |
| Bag Size: Priming Waste Bag [mL] or Re-Application Bag [mL] | unchanged |
| Additional Process Parameters | |
| Stage length in seconds | 511 |
| Stage length in mL | 85 |

Low-stringency CD34 selection: A second biological sample is enriched by selection for CD34+ cells under low-stringency conditions using a modification of depletion mode use of the Miltenyi Biotec CliniMACSO system as described in Example 1 with modification to intended to provide higher yield of $CD34^+$ cells relative to the low-stringency enrichment applied to Patient 1.

Apheresis product from peripheral blood, anticoagulated with Anticoagulant Citrate Dextrose Solution (ACD-A), is provided at either $60\times10^9$ to $6\times10^8$ total cells (when using one vial of CD34 labeling reagent) or $120\times10^9$ to $12\times10^8$ total cells (when using two vials of CD34 labeling reagent). In a laminar flow hood under sterile conditions, cell count, cell viability, and count for subpopulations of CD3+, CD19+, or CD34+ cells are measured. The apheresis product is transferred to a transfer bag which is filled to 600 ml total volume with phosphate buffered saline (PBS). The contents are centrifuged at 230 G for 15 minutes and the supernatant is removed, leaving 90 ml to which 5 ml of immunoglobulin is added, followed by mixing at room temperature for 10 minutes. One or two 7.5 ml vials of CliniMACS® CD34 Reagent is injected into the bag, which is mixed and incubated under stirring for 30 minutes at room temperature. The cells are centrifuged at 230 G for 15 minutes and resuspended in in 150 ml of PBS.

The CD34 Selection Program on a CliniMACS® system is run using the sample as described above with the parameters as indicated in Table 2. The process lasts approximately 20-30 minutes. The program is aborted before any of the wash steps take place and the CD34-enriched cells and other non-specific cells are flushed into the "target cell bag". The "target cell bag" of the CliniMACS® system contains the low-stringency CD34-enriched cell population. The "non-target cell bag" of the CliniMACS® system contains non-target cells.

Low-stringency CD34 selection results in about 35% to 60% yield of $CD34^+$ cells and about 10% to 30% relative purity.

Subsequently, both high-stringency CD34-enriched cell population and low-stringency CD34-enriched cell population are each individually transduced or combined and transduced with a recombinant gene therapy vector encoding the FANCA gene product as described in Example 1, and the resulting genetically modified cells are designated as Product 3.1 and Product 3.2, respectively.

If individually transduced product 3.1 and Product 3.2 are mixed together and thereafter administered to Patient 3 by intravenous bolus.

Patient 3 shows rapid in vivo selection engraftment kinetics. This treatment protocol results in multilineage stabilization in hematopoiesis, neutrophils, red blood cells, and platelets. Stabilization of hematopoietic lineages that had declined in Patient 3 prior to transplantation is a convincing endpoint for clinical success.

Example 4

Gene Therapy Using Crispr-Cas with High- and Low-Stringency CD34-Enriched Cell Populations Biological samples are taken from additional patients and high-stringency and low-stringency CD34-enriched cell populations are prepared as described in Example 3. A recombinant gene therapy is created, which is designed to deliver gene editing system capable of directed repair of an endogenous FANC gene. The gene editing system includes a Cas protein or a polynucleotide encoding a Cas protein; a gRNA; and a repair template. The repair template comprises a sequence fragment overlapping known mutation(s) to a FANC gene (e.g. FANCA) in the additional patients. One or both of the high-stringency and low-stringency CD34-enrichment populations are contacted with the recombinant gene therapy vector, and then mixtures of the two CD34-enriched cell populations are autologously transplanted into each of the patients. The patients show rapid in vivo selection engraftment kinetics. This treatment protocol results in multilineage increases in hematopoiesis, neutrophils, red blood cells, and platelets. Recovery of hematopoietic lineages that had declined in the patients prior to transplantation is a convincing endpoint for clinical success.

What is claimed:

1. A method of treating Fanconi anemia in a subject in need thereof, comprising providing to the subject a genetically modified CD34-enriched cell population prepared from a biological sample obtained from the subject by selecting for CD34+ cells by:
 (a) applying the biological sample to a capture matrix that binds CD34+ cells;
 (b) allowing an unbound fraction of the biological sample to flow through the capture matrix; and
 (c) eluting the CD34-enriched cell population from the capture matrix using an elution buffer, wherein the bound fraction is not washed prior to elution, wherein the CD34-enriched cell population comprises CD34+ cells at a purity of about 1% to 30%, and wherein the selection results in a yield of about 35% to 60% of CD34+ cells; and
 wherein the CD34-enriched cell population was genetically modified by contacting the CD34-enriched cell population with:
 (i) a recombinant gene therapy vector comprising a polynucleotide sequence encoding a Fanconi anemia complementation group (FANC) polypeptide, or a functional variant or fragment thereof; or
 (ii) a gene editing system targeting direct repair of an endogenous mutated FANC gene.

2. The method of claim 1, wherein the biological sample is peripheral blood or bone marrow.

3. The method of claim 1, wherein the biological sample is peripheral blood obtained after the subject has been treated with G-CSF, plerixafor, or a combination of G-CSF and plerixafor.

4. The method of claim 1, wherein the CD34-enriched cell population comprises CD34+ cells at a purity of 10% to 30%.

5. The method of claim 1, wherein the selection results in a yield of 35% to 60% of CD34+ cells.

6. The method of claim 1, wherein the CD34-enriched cell population was genetically modified by contacting the CD34-enriched cell population with the recombinant gene therapy vector, wherein the recombinant gene therapy vector comprises a polynucleotide sequence comprising in the following 5' to 3' order:

(a) a eukaryotically active promoter sequence; and
 (b) a sequence encoding a human FANC polypeptide, or a functional fragment or variant thereof;
 wherein the sequence encoding the human FANC polypeptide or functional fragment or variant thereof is operably linked to the eukaryotically active promoter sequence; and wherein the FANC polypeptide is selected from FANCA, FANCC, and FANCG.

7. The method of claim 6, wherein the FANC polypeptide is FANCA.

8. The method of claim 6, wherein the promoter is a human phosphoglycerate kinase 1 (hPGK) promoter.

9. The method of claim 8, wherein the hPGK promoter has at least 90% identity to SEQ ID NO:7, or nucleotides 3541-4051 of SEQ ID NO:24, or nucleotides 1-511 of SEQ ID NO:25.

10. The method of claim 6, wherein the recombinant gene therapy vector comprises a polynucleotide sequence comprising in the following 5' to 3' order:
 (a) the eukaryotically active promoter sequence;
 (b) the sequence encoding the human FANC polypeptide, or functional fragment or variant thereof; and
 (c) a mutated woodchuck hepatitis virus post-transcriptional regulatory element (WPRE).

11. The method of claim 10, wherein the mutated WPRE has at least 90% identity to SEQ ID NO:23, or nucleotides 8502-9178 of SEQ ID NO: 24.

12. The method of claim 1, wherein the recombinant gene therapy vector is a lentiviral gene therapy vector.

13. The method of claim 12, wherein the lentiviral gene therapy vector comprises an expression cassette comprising:
 a) a 5' LTR or a modified 5' LTR;
 b) a cPPT sequence;
 c) a human phosphoglycerate kinase 1 (hPGK) promoter;
 d) a sequence encoding a human FANCA protein;
 e) a mutated woodchuck hepatitis virus post-transcriptional regulatory element (WPRE); and
 f) a 3' LTR or a modified 3' LTR.

14. The method of claim 13, wherein the expression cassette comprises the sequence corresponding to nucleotides 3541 to 9178 of SEQ ID NO: 24.

* * * * *